(12) United States Patent
Hotta et al.

(10) Patent No.: US 9,505,894 B2
(45) Date of Patent: *Nov. 29, 2016

(54) POLYPROPYLENE-BASED RESIN COMPOSITION AND FOAM SHEET

(71) Applicant: JAPAN POLYPROPYLENE CORPORATION, Chiyoda-ku (JP)

(72) Inventors: Sachio Hotta, Mie (JP); Kazuo Asuka, Mie (JP); Shinichi Kitade, Mie (JP); Kuninori Takahashi, Mie (JP); Iku Kouzai, Mie (JP); Takao Tayano, Mie (JP)

(73) Assignee: JAPAN POLYPROPYLENE CORPORATION, Chiyoda-ku (JP)

( * ) Notice: Subject to any disclaimer, the term of this patent is extended or adjusted under 35 U.S.C. 154(b) by 49 days.

This patent is subject to a terminal disclaimer.

(21) Appl. No.: 14/373,040

(22) PCT Filed: Feb. 22, 2013

(86) PCT No.: PCT/JP2013/054593
§ 371 (c)(1),
(2) Date: Jul. 18, 2014

(87) PCT Pub. No.: WO2013/125702
PCT Pub. Date: Aug. 29, 2013

(65) Prior Publication Data
US 2015/0004394 A1    Jan. 1, 2015

(30) Foreign Application Priority Data

Feb. 23, 2012 (JP) ................. 2012-036956

(51) Int. Cl.
| | |
|---|---|
| C08J 5/18 | (2006.01) |
| B29C 51/00 | (2006.01) |
| B32B 5/18 | (2006.01) |
| C08L 23/12 | (2006.01) |
| C08L 53/00 | (2006.01) |
| B32B 27/32 | (2006.01) |
| C08F 297/08 | (2006.01) |
| C08L 23/16 | (2006.01) |
| B29C 47/04 | (2006.01) |
| C08J 9/00 | (2006.01) |
| B29C 45/00 | (2006.01) |
| B29C 47/06 | (2006.01) |
| B32B 27/06 | (2006.01) |
| B32B 27/20 | (2006.01) |
| B29C 47/00 | (2006.01) |
| B29C 49/00 | (2006.01) |
| B29K 23/00 | (2006.01) |
| B29K 105/00 | (2006.01) |
| B29K 105/04 | (2006.01) |

(52) U.S. Cl.
CPC ............. *C08J 5/18* (2013.01); *B29C 45/0001* (2013.01); *B29C 47/0054* (2013.01); *B29C 47/04* (2013.01); *B29C 47/065* (2013.01); *B32B 5/18* (2013.01); *B32B 27/065* (2013.01); *B32B 27/20* (2013.01); *B32B 27/32* (2013.01); *C08F 297/08* (2013.01); *C08J 9/0061* (2013.01); *C08L 23/12* (2013.01); *C08L 23/16* (2013.01); *C08L 53/00* (2013.01); *B29C 47/0042* (2013.01); *B29C 49/0005* (2013.01); *B29C 51/002* (2013.01); *B29K 2023/12* (2013.01); *B29K 2023/14* (2013.01); *B29K 2105/0085* (2013.01); *B29K 2105/04* (2013.01); *B32B 2250/02* (2013.01); *B32B 2305/022* (2013.01); *B32B 2307/304* (2013.01); *B32B 2307/306* (2013.01); *B32B 2307/558* (2013.01); *B32B 2439/00* (2013.01); *B32B 2605/00* (2013.01); *C08J 2201/03* (2013.01); *C08J 2323/12* (2013.01); *C08J 2323/14* (2013.01); *C08J 2353/00* (2013.01); *C08J 2423/12* (2013.01); *C08J 2453/00* (2013.01); *C08L 2203/14* (2013.01); *C08L 2203/30* (2013.01); *C08L 2205/03* (2013.01); *Y10T 428/249992* (2015.04)

(58) Field of Classification Search
None
See application file for complete search history.

(56) References Cited

U.S. PATENT DOCUMENTS

| | | | |
|---|---|---|---|
| 4,916,198 A | 4/1990 | Scheve et al. | |
| 6,306,973 B1 | 10/2001 | Takaoka et al. | |
| 9,284,427 B2 * | 3/2016 | Hotta | B32B 5/18 |

(Continued)

FOREIGN PATENT DOCUMENTS

| | | |
|---|---|---|
| CN | 100349940 C | 11/2007 |
| CN | 101405341 A | 4/2009 |

(Continued)

OTHER PUBLICATIONS

Shigenobu et al., electronic translation of JP 2009-275073, Nov. 2009.*

(Continued)

*Primary Examiner* — Jeffrey Mullis
(74) *Attorney, Agent, or Firm* — Oblon, McClelland, Maier & Neustadt, L.L.P.

(57) ABSTRACT

Provided is a polypropylene-based resin composition which gives uniform and fine cells and from which a foamed sheet and thermoform excellent in appearance, thermoformability, impact resistance, lightness, stiffness, heat resistance, heat insulating properties, oil resistance and the like can be produced and includes (X) 5 to 99% by weight of a polypropylene resin having a structure with long chain branches, and (Y) 1 to 95% by weight of a propylene-based block copolymer produced by sequential polymerization, which block copolymer comprises (Y-1) a propylene (co)polymer and (Y-2) a propylene-ethylene copolymer.

12 Claims, 4 Drawing Sheets

(56) References Cited

U.S. PATENT DOCUMENTS

| | | |
|---|---|---|
| 2009/0131576 A1 | 5/2009 | Zanka et al. |
| 2009/0326136 A1 | 12/2009 | Masuda et al. |
| 2010/0063212 A1 | 3/2010 | Oysaed et al. |
| 2010/0137466 A1 | 6/2010 | Sasaki et al. |
| 2011/0127688 A1 | 6/2011 | Onodera et al. |

FOREIGN PATENT DOCUMENTS

| | | |
|---|---|---|
| CN | 101472982 A | 7/2009 |
| CN | 101679662 A | 3/2010 |
| JP | 59-149907 | 8/1984 |
| JP | 62-121704 | 6/1987 |
| JP | 06-157666 | 6/1994 |
| JP | 10-338717 | 12/1998 |
| JP | 2000-063552 | 2/2000 |
| JP | 2001-226510 | 8/2001 |
| JP | 2001-335666 | 12/2001 |
| JP | 2001-525460 | 12/2001 |
| JP | 2002-523575 | 7/2002 |
| JP | 2004-149688 | 5/2004 |
| JP | 2004-339365 | 12/2004 |
| JP | 2009-057542 | 3/2009 |
| JP | 2009-275073 | 11/2009 |
| JP | 2009-275081 | 11/2009 |
| JP | 2009-275147 | 11/2009 |
| JP | 2009-275151 A | 11/2009 |
| JP | 2009-275207 | 11/2009 |
| JP | 2009-275210 | 11/2009 |
| JP | 2009-293020 | 12/2009 |
| JP | 2009-298139 | 12/2009 |
| JP | 2009-298140 | 12/2009 |
| JP | 2009-299017 | 12/2009 |
| JP | 2009-299018 | 12/2009 |
| JP | 2009-299029 | 12/2009 |
| JP | 2010-150322 | 7/2010 |
| JP | 2011-068819 | 4/2011 |
| JP | 2011-088955 | 5/2011 |
| JP | 2011-116804 | 6/2011 |
| JP | 2013-199643 | 10/2013 |
| WO | 95/20622 | 8/1995 |
| WO | 97/14725 | 4/1997 |
| WO | 99/07752 | 2/1999 |
| WO | 99/27007 | 6/1999 |

OTHER PUBLICATIONS

Extended European Search Report issued Dec. 8, 2014 in Patent Application No. 13752077.1.

Combined Chinese Office Action and Search Report issued Aug. 18, 2015 in Patent Application No. 201380010435.8 (with English translation and English translation of categories of cited documents).

U.S. Appl. No. 14/372,936, filed Jul. 17, 2014, Hotta, et al.

International Search Report Issued Mar. 19, 2013 in PCT/JP13/054593 filed Feb. 22, 2013.

Office Action as received in the corresponding Japanese Patent Application No. 2013-033694 dated Jun. 7, 2016 w/English Translation.

Decision of Refusal as received in the corresponding Japanese Patent Application No. 2013-033694 dated Aug. 23, 2016 w/English translation.

\* cited by examiner

Fig.1
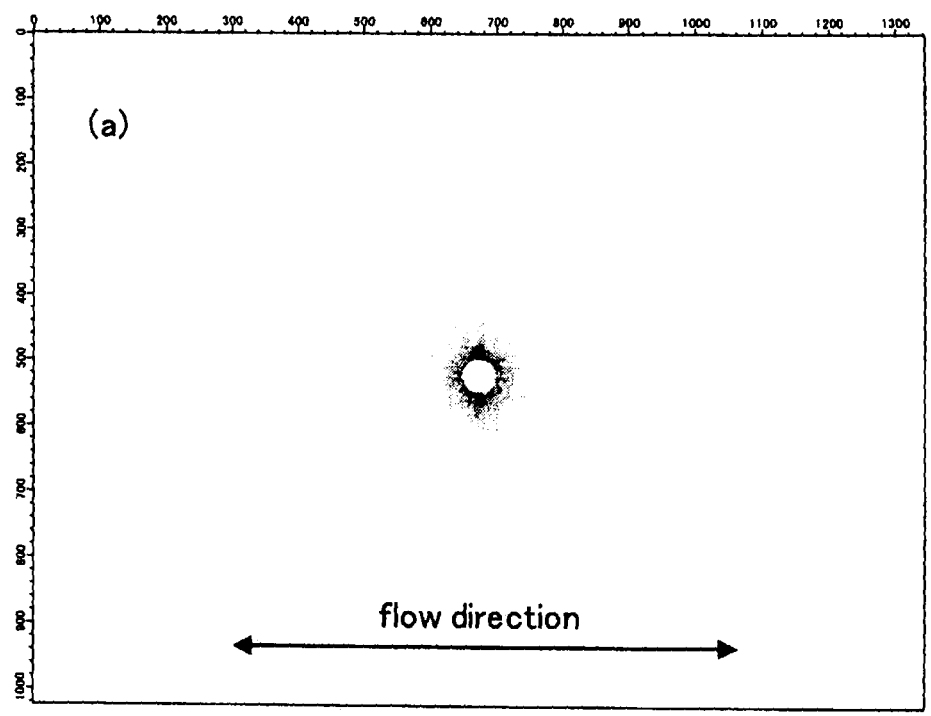
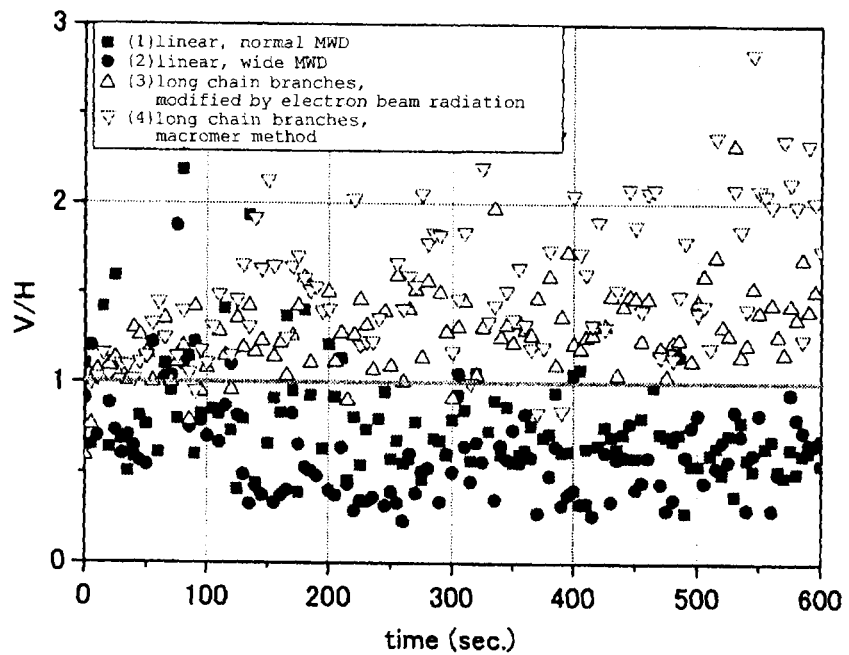

Fig.3

a  Polarizing optical microscope image of PP having long chain branches
   (obtained by macromer method)
   (immediately after the start of flowing)
b  Polarizing optical microscope image of PP having long chain branches
   (obtained by macromer method)
   (4 minutes after the start of flowing)
c  Relationship of the light polarizer (P) / analyzer (A) and
   the flow direction

Fig.4

Conceptual diagram of CFC-FT-IR

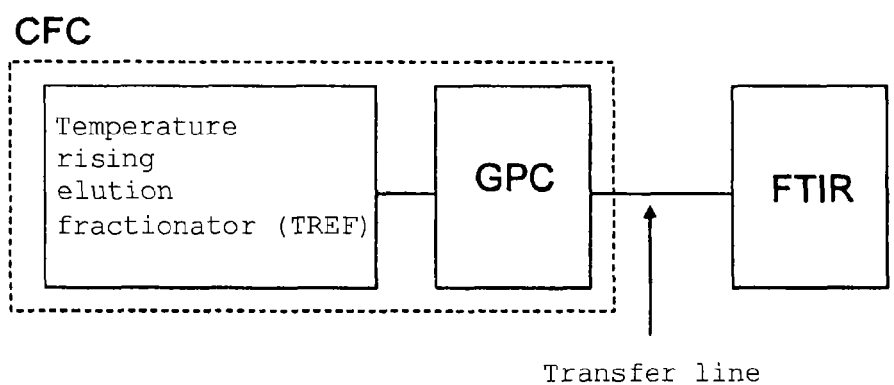

Transfer line

POLYPROPYLENE-BASED RESIN COMPOSITION AND FOAM SHEET

TECHNICAL FIELD

The present invention relates to a polypropylene-based resin composition having high melt tension. More particularly, the present invention is concerned with a polypropylene-based resin composition suitable for producing a foamed sheet having high closed cell content formed by expansion molding, the cells being fine and relatively uniform in size. The present invention also relates to such a foamed sheet and a molded article obtained by subjecting such a foamed sheet to thermoforming.

BACKGROUND ART

Expansion molding is one of important methods for molding and/or processing a polypropylene-based resin. Various kinds of molded articles obtained by extrusion foaming or injection foam molding are widely and effectively used for various purposes, taking advantage of excellent properties of them, such as heat insulating properties, sound insulating properties, cushioning properties, energy absorbing properties and the like. Especially in recent years, in view of environmental concerns, weight reduction of materials and reduction of environmental burdens become important problems of technical development. The technical area in which a molded foam is used tends to become wide, and demand for a resin with high expandability becomes high.

A commonly-used polypropylene-based resin has low melt tension, which an important index of foaming properties, because the molecules of this resin have linear structure and the molecular weight of this resin is not so high. For this reason, this resin is not suitable for expansion molding. In order to compensate for this drawback, various techniques have been developed in the past (for example, see PATENT LITERATURES 1 to 6).

For example, PATENT LITERATURE 1 discloses a technique in which long chain branches are introduced into polypropylene by high-energy ionization radiation to increase its melt tension. In general, the term "long chain branch" used herein means a branched structure with branches of molecular chains each having a main chain with several tens or more of carbon atoms (several hundreds or more of the molecular weight). In contrast, other kinds of branched structures, for example, a branched structure obtained by copolymerization of a-olefins each having a carbon number around 4 to 20 (each of which is frequently used as a comonomer), usually have no great effect on melt tension and the like. Such a branched structure is referred to as a "short chain branch" to distinguish it from the above-mentioned "long chain branch". Similarly, as methods for introducing long chain branches into a polypropylene resin using an organic peroxide, many techniques are disclose in PATENT LITERATURE 2, PATENT LITERATURE 3, PATENT LITERATURE 4 and the like. In a technique frequently carried out by a person skilled in the art, a polypropylene having produced therein long chain branches by the above-mentioned methods is blended with another polypropylene-based resin. This blending is carried out considering the fact that in general, such a polypropylene is expensive because of particularity of the production method and in view of improvement in fluidity during various kinds of moldings and improvement in physical properties and appearance of molded articles. For example, PATENT LITERATURE 5 discloses a technique in which a composition comprising a polypropylene resin having long chain branches produced using electron beam radiation and a normal homopolypropylene or propylene-ethylene copolymer having no long chain branch gives a polypropylene-based resin foam which is inexpensive and excellent in heat resistance, heat insulating properties and heat insulating properties. PATENT LITERATURE 6 discloses a technique in which a polyolefin-based resin composition which is excellent in extrusion foamability and gives an extruded foam with improved brittleness is obtained by combination of a high-melt tension polypropylene with a natural logarithm of the melt tension and that of the melt flow rate satisfying a specific relationship and a low-melt tension polypropylene-based resin with a melting point 3 to 30° C. lower than that of the high-melt tension polypropylene.

However, in the technique in which long chain branches are introduced into polypropylene by high-energy ionization radiation or the use of an organic peroxide, there are some problems. In the former, there are problems of high production cost, yellowing, change in physical properties over time and the like. In the latter, there are problems of contamination with a decomposition product derived from the organic peroxide, odor, yellowing, safety during the production and the like. For this reason, there are many conventional techniques for increasing melt tension of polypropylene by another method. As one of such techniques, a technique for increasing melt tension by broadening the molecular weight distribution is disclosed.

For example, PATENT LITERATURE 7 discloses a method for producing polypropylene with high melt tension, high stiffness and excellent moldability by 2-step polymerization. In this method, a polypropylene with an intrinsic viscosity [η] of 0.5 to 3.0 dl/g is produced in the first step polymerization in an amount of 50 to 85 wt. % relative to the total amount of the final polymerization product. Then, a polypropylene with an intrinsic viscosity [η] of 9 dl/g or more is produced in the second step polymerization, in an amount of 50 to 15 wt. % relative to the total amount of the final polymerization product. As a result, a crystalline polypropylene with an intrinsic viscosity [η] of 2 to 6 dl/g, a melt flow rate (MFR) of 0.01 to 5 g/10 minutes and an isotactic pentad fraction of 0.940 or more, as a whole polypropylene, is obtained The polypropylene-based resin composition obtained by the above-mentioned method has broad molecular weight distribution. However, this composition has problems in that it has poor moldability and gives a molded article with poor appearance. Based on this fact, PATENT LITERATURE 8 discloses that a polypropylene-based resin composition having a melt flow rate of 0.01 to 5 g/10 minutes, an intrinsic viscosity [η] measured at 135° C. in decalin of 8 to 13 dl/g, a gel number of 3000/450 $cm^2$ or less, molecular weight distribution Mw/Mn of 6 to 20 and Mz/Mw of 3.5 or more can solve these problems since this composition has high melt tension, excellent moldability and high stiffness and makes it possible to produce a molded article with good appearance.

PATENT LITERATURE 9 discloses that a polypropylene with a specific value of biaxial elongational viscosity is a technique for obtaining a foam with high ratio of closed pores. However, close study of this document shows that this document contains the following 2 descriptions.

"It is noted that in the method disclosed in WO 91/13933 for producing the above-mentioned "specific propylene polymer resin comprising a major moiety of a linear propylene polymer and a minor moiety of side chains highly branched from the linear propylene polymer", the side chains highly branched from the linear propylene polymer are formed using electron beams or radiation. Therefore, it is believed that during the linking of side chains to the main chain (i.e., branching), a cleavage of the main chain is likely to occur, so that the viscosity of the resin as a whole cannot be raised and, therefore, it is impossible for the resin to have an ultrahigh molecular weight which contributes to the high biaxial extensional viscosity of the resin to be used for producing the foam of the present invention."

"The preparation of a propylene polymer resin to be used as the base resin for producing the foam of the present invention can be conducted by, for example, a two-stage polymerization method in which the polymerization reaction is conducted in the presence of Ziegler-Natta catalyst in a polymerization vessel having a fixed bed provided with a stirrer (see, for example, Unexamined Japanese Patent Application Laid-Open Specification No. 4-226109 corresponding to EP 0 463 406 A2)."

From these descriptions, the essence of this technique is regarded as being based on broadening of the molecular weight distribution with ultrahigh molecular weight components. Close study of Examples disclosed in the above-mentioned PATENT LITERATURES 7 to 9 shows that each of the ultrahigh molecular weight components is constructed with polypropylene.

In these techniques using ultrahigh molecular weight components, the effect for improving melt tension is limited. PATENT LITERATURE 10 mentions that a polypropylene-based resin composition satisfying some specific physical properties can improve the melt tension of a polypropylene-based resin with no deterioration of its good properties, such as mechanical properties and chemical resistance, and achieve uniform and fine cells, the composition comprising:

50 to 90 wt. %, relative to the total weight of the composition, of a propylene homopolymer or propylene copolymer with a content of an olefin other than propylene of 1 wt. % or less having a melt flow rate of 10 to 1000 g/10 minutes, and 10 to 50 wt. %, relative to the total weight of the composition, of a propylene copolymer with a content of an olefin other than propylene of 1 to 15 wt. % having a weight-average molecular weight of 500000 to 10000000.

However, in the technique for improving melt tension using ultrahigh molecular weight propylene homopolymer or copolymer or a technique in which, as disclosed in PATENT LITERATURE 11, melt tension is improved by finely dispersing an ultrahigh molecular weight ethylene-α-olefin copolymer in another olefin (co)polymer, there is a problem in that the resultant melt tension is generally lower than that of a polypropylene having long chain branches. Also in the field of expansion molding with high expansion ratio or blow molding for producing large molded articles (which requires especially high melt tension), a polypropylene having long chain branches tends to be widely used. Problems of such a polypropylene are described above.

In recent years, there are proposals of methods with copolymerization of a macromer using a metallocene catalyst (hereinbelow, such a method is referred to as a "macromer copolymerization method"). For example, there is a proposal of a method (macromer copolymerization method) in which a propylene macromer having a terminal vinyl group is produced in the first polymerization step (step of macromer synthesis) using a specific complex under specific polymerization conditions and the resultant product is subjected to copolymerization with propylene in the second polymerization step (step of copolymerization of macromer) using a specific catalyst under specific polymerization conditions, the method giving a product with no higher cross-linking, no loss of chemical stability as a natural property of polypropylene, excellent in recyclability and no concern of gel generation in return for improvement of melt tension (see PATENT LITERATURES 12 and 13).

However, in this method, in order to effectively obtain the terminal vinyl group (which must be present in a macromer) in the former step, the polymerization must be must be conducted using a specific complex under relatively high temperature and low pressure. For this reason, the molecular weight and stereoregularity of the resultant macromer become disadvantageously low.

In contrast to the above-mentioned multi-step polymerization method, there is a proposal of a method for single-step polymerization (in situ macromer-producing copolymerization method) in which the step of macromer synthesis and step of macromer copolymerization are simultaneously conducted using a specific complex (see PATENT LITERATURE 14). However, in this method, the amount of each of the macromer and copolymerized macromer is not satisfactory, and the level of improvement of melt tension is not satisfactory.

By the techniques disclosed in PATENT LITERATURES 15 and 16, various problems in conventional techniques related to macromer copolymerization methods can be solved and a polypropylene having long chain branches with extremely high melt tension and good elongation viscosity can be obtained. Further, PATENT LITERATURES 17 and 18 propose a method in which a good foamed sheet can be obtained using these techniques.

By blending the polypropylene-based resin having long chain branches obtained by the macromer copolymerization method with another polypropylene-based resin with other specific properties, various kinds of resin compositions suitable for various purposes can be obtained. These are disclosed in PATENT LITERATURES 19 to 27.

Especially, PATENT LITERATURE 27 discloses a polypropylene-based molded foam obtained by subjecting, to injection foam molding, a resin composition comprising (a) the polypropylene having long chain branches produced by the macromer copolymerization method of PATENT LITERATURE 15 or 16, (b) a polypropylene-based resin having a weight-average molecular weight of 50000 to 800000 and (c) a blowing agent.

As described above, there are many proposals of molded articles or compositions using a polypropylene-based resin having long chain branches, the molded articles or compositions showing excellent properties by the use of various molding methods. However, according to the present inventors, it is becoming apparent that some inherent, practical problems are still present in these resins. For example, in the extrusion foaming of a polypropylene-based resin having long chain branches to a foamed sheet as described in PATENT LITERATURE 18, there are actually some problems to be solved. For example, poor fluidity of this resin in an extruder frequently causes high load so that it is difficult to increase the extrusion rate. Further, insufficient extensibility of this resin during the withdrawal brings insufficient appearance of the resultant foamed sheet.

CITATION LIST

Patent Literature

PATENT LITERATURE 1: JP-A-62-121704
PATENT LITERATURE 2: JP-A-6-157666

PATENT LITERATURE 3: WO99/27007
PATENT LITERATURE 4: JP-A-2004-339365
PATENT LITERATURE 5: JP-A-2001-226510
PATENT LITERATURE 6: JP-A-2000-063552
PATENT LITERATURE 7: JP-A-59-149907
PATENT LITERATURE 8: WO99/07752
PATENT LITERATURE 9: WO95/20622
PATENT LITERATURE 10: JP-A-2001-335666
PATENT LITERATURE 11: WO97/14725
PATENT LITERATURE 12: JP-A-2001-525460
PATENT LITERATURE 13: JP-A-10-338717
PATENT LITERATURE 14: JP-A-2002-523575
PATENT LITERATURE 15: JP-A-2009-057542
PATENT LITERATURE 16: JP-A-2009-275207
PATENT LITERATURE 17: JP-A-2009-293020
PATENT LITERATURE 18: JP-A-2009-299029
PATENT LITERATURE 19: JP-A-2009-299018
PATENT LITERATURE 20: JP-A-2009-298139
PATENT LITERATURE 21: JP-A-2009-299017
PATENT LITERATURE 22: JP-A-2009-298140
PATENT LITERATURE 23: JP-A-2009-275210
PATENT LITERATURE 24: JP-A-2009-275073
PATENT LITERATURE 25: JP-A-2009-275081
PATENT LITERATURE 26: JP-A-2009-275147
PATENT LITERATURE 27: JP-A-2011-068819

SUMMARY OF INVENTION

Problem to be Solved

The object of the present invention is to provide, considering current situation of conventional techniques, a polypropylene-based resin composition with high melt tension which can be used for various kinds of moldings and excellent in physical properties of the resultant molded articles. Another object of the present invention is to provide a resin composition with improved extensibility for obtaining, in the field of extrusion foaming, a polypropylene-based (multi-layer) foam with cells which are fine and relatively uniform in size, the foam giving a molded article with good appearance. Further object of the present invention is to provide a polypropylene-based (multi-layer) foamed sheet obtained using such a resin composition and a thermoformed molded article obtained using such a (multi-layer) foamed sheet.

Means to Solve the Problem

In order to solve the above-mentioned problem, the present inventors have made extensive and intensive studies. As a result, it has been found out first that in the shear flow field, a polypropylene having long chain branches forms characteristic shear-induced crystalline structure which is completely different from the structure formed by linear polypropylene and that this crystalline structure causes deterioration of physical properties, such as expandability and moldability into a sheet.

Specific method for finding out this fact was direct observation of the structure formed by a polypropylene resin having long chain branches in the shear flow field by simultaneous measurement of X-ray small-angle scattering and X-ray diffraction [see S. Kitade, K. Asuka, I. Akiba, K. Sakurai, Polymer Preprints, Japan, 59, 3206(2010)] (conducted under the proposal number 2010A7231).

More specifically, experiments were conducted as follows.

In the beamline BL03XU of SPring-8 (a synchrotron X-ray radiation facility), Linkam CSS-450 heat-shearing stage was installed and the sample (thickness: 500 μm) was held in this heat-shearing stage. Small-angle X-ray scattering and wide-angle X-ray diffraction were simultaneously measured for 10 minutes under shear flow (shear rate: $2\ s^{-1}$) at 170° C. under the conditions including the X-ray wavelength of 0.1 nm, camera lengths of 1.5 m for small-angle X-ray scattering and 0.076 m for wide-angle X-ray diffraction. The detector for small-angle scattering was an image intensifier in combination with CCD and that for wide-angle diffraction was a flat panel detector. The thermal history of the sample was erased by heating at 215° C. for 5 minutes just before the measurement.

The following 4 materials were used as samples.
(i) a linear polypropylene with a molecular weight distribution Mw/Mn of 4.7 obtained by polymerization using a usual Ziegler-Natta catalyst
(ii) a linear polypropylene with wide molecular weight distribution (Mw/Mn of 10.7)
(iii) a polypropylene having long chain branches produced using electron beam radiation
(iv) a polypropylene having long chain branches produced by the macromer copolymerization methods of the above-mentioned PATENT LITERATURES 15 and 16

Typical profile of small-angle scattering is shown in FIG. 1 (a). FIG. 1 (b) shows the ratio (calculated in the detector for small-angle scattering after the subtraction of background and correction of transmission) of (V) to (H) explained below plotted against the time of shear flow application.
(H) integrated value (across the whole measured range of scattering vector) of average small-angle scattering intensity of the sector within ±10 degree with respect to the direction parallel to the flow direction
(V) integrated value (across the whole measured range of scattering vector) of average small-angle scattering intensity of the sector within ±10 degree with respect to the direction perpendicular to the flow direction According to these experiments, it is clearly shown that the observed tendency of a polypropylene having long chain branches is the opposite of that of a linear polypropylene. That is, it is apparent that in the former, the intensity of the scattering observed in the direction perpendicular to the flow direction is relatively high. The scattering observed in the direction perpendicular to the flow direction shows the presence of some structure arranged in the direction parallel to the flow direction. Absence of a high-order diffraction peak in the scattering experiments (as in FIG. 1 (a)) (i.e., so-called streak scattering) shows formation of a relatively disordered structure. Convenient observation of these unusual structures can be achieved using a polarizing optical microscope. Specifically, the Linkam heat-shearing stage (which was the same as that used in the X-ray scattering and diffraction measurements) was used as a sample holder. The sample was appropriately adjusted for this observation. The light polarizer and analyzer were set at the angle of −45 degree and 45 degree with respect to the flow direction, respectively, and the observation of image was conducted using a CCD microscope under transmitted light. Conceptual diagram of the device used for the observation using a polarizing optical microscope is shown in FIG. 2. Typical results of this observation are shown in FIG. 3. Birefringence caused by the structure oriented in the direction parallel to the flow direction brings bright portions and dark portions in the resultant image. This fact enables direct observation of rough structure. Also this method shows the presence of considerable unevenness in the structure oriented in the direction parallel to the flow direction. Unevenness in structure can be judged by quantification of brightness of the field of view observed by image analysis. This structure with unevenness is analogous to the shish-kebab structure which is generally observed in a test peace of a polypropylene-based resin produced by injection molding or the like. However, in these experiments, this shish-kebab structure was clearly observed even under the condition including the temperature of as high as 170° C. and shear flow with relatively low shear rate of 2 s$^{-1}$. Further, the formed structure was so large that the structure was observed even by a polarizing microscope. These are novel findings. It is though that this phenomenon remarkably occurs especially during extrusion in which a resin receives flow history for relatively a long time. Once this uneven structure is formed in the sample, the sample has both of a portion with high crystallinity and another portion with low crystallinity. This fact causes various problems, such as inhibition of expression of extensibility, deterioration of appearance of the sheet and the like during the forming of sheets.

Next, based on the understanding that formation of the uneven structure (which is formed specifically when the above-mentioned polypropylene resin having long chain branches is used) analogous to the shish-kebab structure causes deterioration of moldability, appearance and the like, the present inventors have made extensive and intensive studies as to how the formation of this structure should be prevented. As a result, it has been found that blending of such a polypropylene resin with a propylene-ethylene block copolymer having certain specific physical properties is effective for this purpose. This effect is specific to this block copolymer and no found in a usual homopolypropylene or a polypropylene with wide molecular weight distribution. The present invention has been completed, based on this novel finding. That is, it has been unexpectedly found that by the combination of a specific polypropylene resin having long chain branches with a specific propylene-ethylene block copolymer, excellent moldability and physical properties are achieved while high melt tension of the polypropylene resin having long chain branches is kept retained, and the product of this combination has extensibility which is more excellent as compared to that of conventional resin and gives, when it is subjected to expansion molding, a polypropylene-based foamed sheet having fine and uniform cells and beautiful appearance. The present invention has been completed, based on this novel finding.

In other words, as mentioned above, the present inventors have made extensive and intensive studies for solving the above-mentioned problems. As a result, it has been unexpectedly found that (i) in the shear flow field, a polypropylene having long chain branches forms characteristic shear-induced crystalline structure which is completely different from the structure formed by linear polypropylene and that this crystalline structure causes deterioration of physical properties, such as expandability and moldability into a sheet, and that (ii) a specific propylene-ethylene block copolymer specifically has effect for preventing formation of this shear-induced crystalline structure. The present invention has been completed, based on this novel finding. That is, it has been unexpectedly found that by the combination of a specific polypropylene resin having long chain branches with a specific propylene-ethylene block copolymer, the combination disclosed in the present invention, excellent moldability and physical properties are achieved while high melt tension of the polypropylene resin having long chain branches is kept retained, and the product of this combination has extensibility which is more excellent as compared to that of conventional resin and gives, when it is subjected to expansion molding, a polypropylene-based foamed sheet having fine and uniform cells and beautiful appearance. The present invention has been completed, based on this novel finding.

That is, according to the first aspect of the present invention, there is provided a polypropylene-based resin composition comprising:

(X) 5 to 99% by weight of a polypropylene resin having a structure with long chain branches, and (Y) 1 to 95% by weight of a propylene-based block copolymer produced by sequential polymerization, which comprises:

(Y-1) a propylene (co)polymer, and
(Y-2) a propylene-ethylene copolymer,
the resin (X) having the following properties (X-i) to (X-iv):
  (X-i): MFR of 0.1 to 30.0 g/10 minutes
  (X-ii): molecular weight distribution Mw/Mn of 3.0 to 10.0 measured by GPC and Mz/Mw of 2.5 to 10.0
  (X-iii): melt tension (MT) (unit: g) satisfying the relationship:

$$\log(MT) \geq -0.9 \times \log(MFR) + 0.7, \text{ or}$$

$$MT \geq 15$$

(X-iv): content of p-xylene soluble components (CXS) at 25° C. of less than 5% by weight based on the total amount of the resin (X), and
the block copolymer (Y) having the following properties (Y-i) to (Y-v):
  (Y-i): ratios of the amounts of the (Y-1) and (Y-2) of 50 to 99% by weight and 1 to 50% by weight, respectively, with the proviso that each ratio is calculated based on the total weight of the block copolymer (Y) regarded as 100% by weight
  (Y-ii): MFR of the block copolymer (Y) of 0.1 to 200.0 g/10 minutes
  (Y-iii): melting point of the block copolymer (Y) of more than 155° C.
  (Y-iv): the ethylene content of the (Y-2) of 11.0 or more and less than 60.0% by weight, with the proviso that the ethylene content is calculated based on the total weight of monomers constructing the (Y-2) regarded as 100% by weight
  (Y-v): the intrinsic viscosity [η] (unit: dl/g) of the (Y-2) measured at 135° C. in decalin of 5.3 or more if the ethylene content of the (Y-2) is 11.0 or more and 38.0% or less by weight and 7.3 or more if the ethylene content of the (Y-2) is more than 38.0% and less than 60.0% by weight.

According to the second aspect of the present invention, there is provided the composition of the first aspect of the present invention, wherein the resin (X) further has the following property (X-v):

(X-v): branching index g' of 0.30 or more and less than 1.00 at the absolute molecular weight $M_{abs}$ of 1,000,000.

According to the third aspect of the present invention, there is provided the composition of the second aspect of the present invention, wherein the resin (X) further has the following property (X-vi):

(X-vi): mm fraction of 95% or more in the propylene unit triads measured by $^{13}$C-NMR.

According to the fourth aspect of the present invention, there is provided a polypropylene-based resin composition for foam molding, which comprises:

100 parts by weight of the composition of any one of the first to third aspects of the present invention, and 0.05 to 6.0 parts by weight of a blowing agent.

According to the fifth aspect of the present invention, there is provided a polypropylene-based resin foamed sheet obtained by subjecting the composition for foam molding of the fourth aspect of the present invention to extrusion.

According to the sixth aspect of the present invention, there is provided a polypropylene-based resin multi-layer foamed sheet obtained by subjecting the foamed sheet of the fifth aspect of the present invention and a non-foamed layer comprising a thermoplastic resin composition to co-extrusion.

According to the seventh aspect of the present invention, there is provided the multi-layer foamed sheet according to the sixth aspect of the present invention, wherein the thermoplastic resin composition comprises:

100 parts by weight of a thermoplastic resin, and 50 parts by weight or less of an inorganic filler.

According to the eighth aspect of the present invention, there is provided a molded article obtained by subjecting the foamed sheet or multi-layer foamed sheet of any one of the fifth to seventh aspects of the present invention to thermoforming.

According to the ninth aspect of the present invention, there is provided a molded article obtained by subjecting the composition or composition for foam molding of any one of the first to fourth aspects of the present invention to injection molding, thermoforming, extrusion, blow molding or bead expansion molding.

According to the tenth aspect of the present invention, there is provided a propylene-based resin composition comprising:

100 parts by weight of the composition of the first aspect of the present invention, and (Z) more than 0 part by weight and 1000 parts by weight or less of another resin having none of the properties (X-i) to (X-iv) and (Y-i) to (Y-v).

According to the eleventh aspect of the present invention, there is provided the composition according to the tenth aspect of the present invention, wherein the resin (Z) is a polypropylene-based resin.

As mentioned above, the present invention relates to a polypropylene-based resin composition and the like. Preferred embodiments of the present invention include the following ones.

(1) The composition of the first aspect of the present invention, wherein the MFR as the property (Y-ii) of the block copolymer (Y) is 0.2 to 190 g/10 minutes, preferably 0.5 to 180 g/10 minutes, more preferably 2.1 to 170 g/10 minutes.

(2) The composition of any one of the first to third aspects of the present invention, which further comprises a blowing agent selected from the group consisting of (i) physical blowing agents, (ii) decomposing (chemical) blowing agents and (iii) microcapsules each having contained therein a heat expanding agent.

Effects of Invention

The polypropylene-based resin composition of the present invention has high extensibility and gives a foamed sheet with remarkably improved appearance. The cells present in the foamed sheet obtained from this composition are fine and uniform in size. This is also effective for improving the appearance of the foamed sheet. The foamed sheet of the present invention has good appearance and is excellent in drawdown resistance. Therefore, this foamed sheet is excellent in thermoformability.

The cells present in the polypropylene-based (multi-layer) foamed sheet obtained from this composition or thermoform obtained using this foamed sheet are fine and uniform in size. Further, each of the foamed sheet and thermoform is excellent in appearance, thermoformability impact resistance, lightness, stiffness, heat resistance, heat insulating properties, oil resistance and the like. Therefore, the foamed sheet and thermoform can be suitably used as a material for food containers (such as trays, dishes and cups), automobile interiors (such as door trims and trunk mats for automobile), packagings, stationery, buildings and the like.

BRIEF DESCRIPTION OF DRAWINGS

FIG. 1 explains the small-angle scattering intensity of a polypropylene having long chain branches and the like (FIG. 1 (a) is a profile of small-angle scattering, and FIG. 1 (b) shows the ratio of (V) (integrated value (across the whole measured range of scattering vector) of average small-angle scattering intensity of the sector within ±10 degree with respect to the direction perpendicular to the flow direction) to (H) (integrated value (across the whole measured range of scattering vector) of average small-angle scattering intensity of the sector within ±10 degree with respect to the direction parallel to the flow direction) plotted against the time of shear flow application).

FIG. 3 explains typical results of the observation by a polarizing optical microscope.

FIG. 4 is a conceptual diagram explaining the device for CFC-FT-IR.

DETAILED DESCRIPTION OF THE INVENTION

Figure 2:
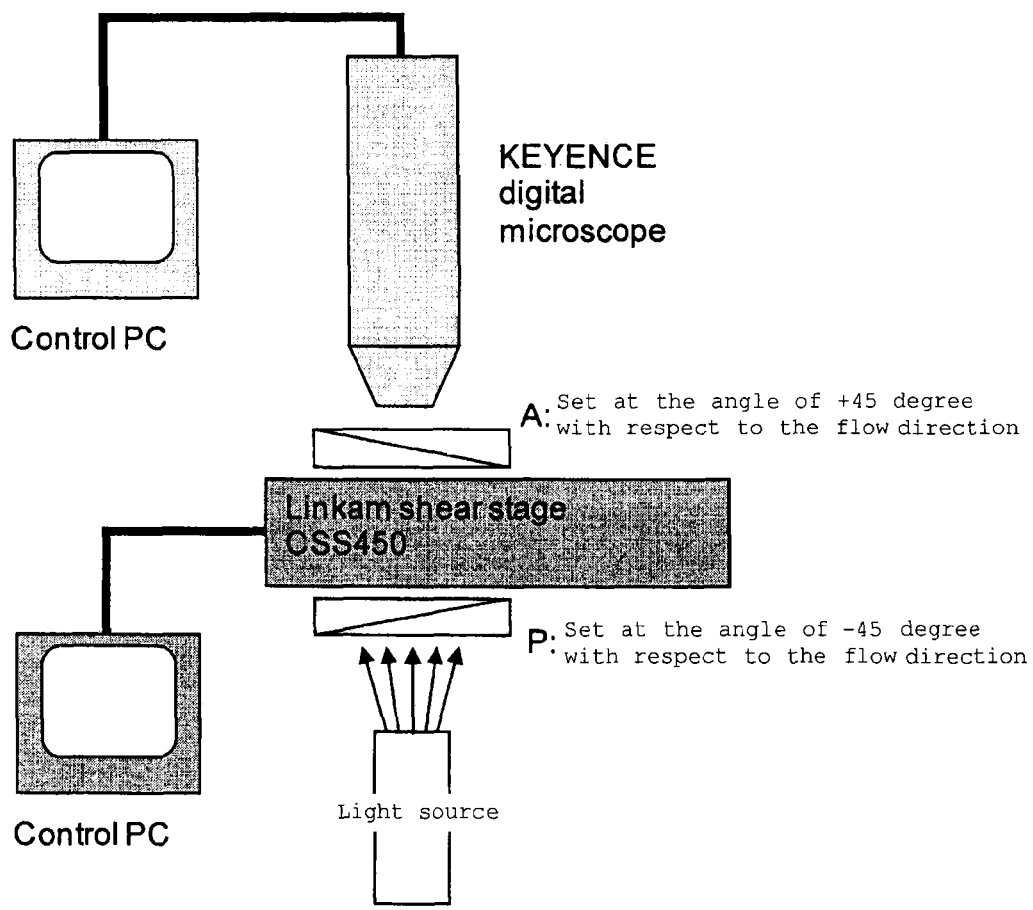
FIG. 2 is a conceptual diagram explaining the device for observation by a polarizing optical microscope.

Hereinbelow, the embodiments of the present invention will be described in more detail. The explanation of elements of the present invention below is made only on an example of the embodiment of the present invention and any description made below should not be construed as limiting the present invention without departing from the scope of the present invention.

The polypropylene-based resin composition (hereinbelow frequently referred to as "resin composition") of the present invention comprises:

5 to 99% by weight of a polypropylene resin component having a structure with long chain branches, especially (X) a polypropylene resin component having specific physical properties, and (Y) 1 to 95% by weight of a propylene-based block copolymer having specific physical properties, which block copolymer is produced by sequential polymerization and comprises (Y-1) a propylene (co)polymer and (Y-2) a propylene-ethylene copolymer. The polypropylene-based resin composition of the present invention for molding a foamed sheet comprises 0.05 to 6.0 parts by weight of a blowing agent per 100 parts by weight of the above-mentioned polypropylene-based resin composition.

The range of the ratio of the amount of polypropylene resin component (X) to the total amount of the resin composition is 5 to 99% by weight, preferably 10 to 90% by weight, more preferably 15 to 80% by weight. In response to this range, the range of the ratio of the amount of propylene-based block copolymer (Y) to the total amount of the resin composition is 1 to 95% by weight, preferably 10 to 90% by weight, more preferably 20 to 85% by weight. The amount of component (X) or (Y) out of the above-mentioned range causes some problem. For example, when the amount of polypropylene resin component (X) having a structure with long chain branches is too small, the expansion moldability and thermoformability are lowered. The amount of component (X) is too large, the appearance is poor and the productivity is lowered.

Detailed explanation of each item related to the properties satisfied by component (X) or (Y) is made below.

I. Polypropylene Resin Component (X) Having a Structure with Long Chain Branches Polypropylene resin component (X) used in the polypropylene-based resin composition of the present invention, which has a structure with long chain branches, has at least one (preferably all) of the following properties (X-i) to (X-iv).

(X-i): MFR of 0.1 to 30.0 g/10 minutes (X-ii): molecular weight distribution Mw/Mn of 3.0 to 10.0 measured by GPC and Mz/Mw of 2.5 to 10.0

(X-iii): melt tension (MT) (unit: g) satisfying the relationship:

$$\log(MT) \geq -0.9 \times \log(MFR) + 0.7, \text{ or}$$

$$MT \geq 15$$

(X-iv): content of p-xylene soluble components (CXS) at 25° C. of less than 5% by weight based on the total amount of the resin (X)

Specific explanation is made below on each of the above-mentioned properties defined in the present invention, method for producing polypropylene resin component (X) having a structure with long chain branches and the like.

I-1. Property (X-i): MFR

In the present invention, the melt flow rate (MFR) of polypropylene resin component (X) having a structure with long chain branches must be in the range of from 0.1 to 30.0 g/10 minutes. The MFR is preferably in the range of from 0.3 to 20.0 g/10 minutes, more preferably in the range of from 0.5 to 10.0 g/10 minutes. If the MFR is lower than this range, the fluidity is unsatisfactory and the load on the extruder during various molding becomes too high. On the other hand, if the MFR is lower than this range, the resultant product becomes unsuitable because of poor properties as high melt tension material due to unsatisfactory melt tension.

The MFR (unit: g/10 minutes) is determined in accordance with method A of JIS K7210:1999 "Plastics-Testing method for melt mass flow rate (MFR) and melt volume flow rate (MVR) of thermoplastics" under conditions M (i.e., at 230° C. under a load of 2.16 kg).

I-2. Property (X-ii): Molecular Weight Distribution Measured by GPC

The molecular weight distribution of polypropylene resin component (X) having a structure with long chain branches must be broad. The molecular weight distribution Mw/Mn (Mw: weight-average molecular weight, Mn: number-average molecular weight) measured by gel permeation chromatography (GPC) of component (X) must be 3.0 to 10.0. The range of the molecular weight distribution Mw/Mn of component (X) is preferably 3.5 to 8.0, more preferably 4.1 to 6.0.

The parameter Mz/Mw (Mz: Z-average molecular weight) of component (X), which more clearly express the broadness of the molecular weight distribution, must be 2.5 to 10.0. The range of Mz/Mw of component (X) is preferably 2.8 to 8.0, more preferably 3.0 to 6.0.

The broader the molecular weight distribution, the more improved the moldability. The combination of Mw/Mn and Mz/Mw within the above-mentioned ranges gives especially excellent moldability.

Definition of each of Mn, Mw and Mz is described in "Kobunshi Kagaku No Kiso (Fundamentals of Polymer Chemistry)" (edited by Society of Polymer Science, Japan, published by Tokyo Kagaku Dojin, 1978) and the like. These values can be calculated from the molecular weight distribution curve obtained by GPC.

Specific method for the measurement by GPC is described below.

Chromatograph: Waters GPC (ALC/GPC, 150C)

Detector: FOXBORO MIRAN 1A IR detector (measurement wavelength: 3.42 μm)

Column: Showa Denko AD806M/S (3 columns)

Mobile phase solvent: o-dichlorobenzene (ODCB)

Measurement temperature: 140° C.

Flow rate: 1.0 mL/minute

Quantity of sample injected: 0.2 mL

Sample preparation: Each sample for GPC was dissolved in ODCB (containing BHT at 0.5 mg/mL) at 140° C. over around 1 hour to obtain a solution (concentration: 1.0 mg/mL).

The retention volume obtained by GPC is converted to the molecular weight using a calibration curve prepared in advance using standard polystyrenes (PSs). The standard polystyrenes used are commercially available from Tosoh Corporation under the trade names F380, F288, F128, F80, F40, F20, F10, F4, F1, A5000, A2500 and A1000.

Each of these standard PSs is dissolved in ODCB (containing 0.5 mg/mL BHT) to obtain a series of PS solutions each having a concentration of 0.5 mg/mL. 0.2 mL of each of the resultant solutions is injected into the above-mentioned chromatograph to prepare the calibration curve. The calibration curve used herein is a cubic expression obtained using approximation by least square method.

In the equation for viscosity ($[\eta]=K \times M^{\alpha}$) used herein, the following values are used.

$K=1.38 \times 10^{-4}$, $\alpha=0.7$ (for PS)

$K=1.03 \times 10^{-4}$, $\alpha=0.78$ (for PP)

I-3. Property (X-iii): Melt Tension (MT)

Polypropylene resin component (X) having a structure with long chain branches must satisfy the following Requirement (1).

Requirement (1)

Melt tension (MT) satisfying at least one of the following relationships $$\log(MT) \geq -0.9 \times \log(MFR) + 0.7$$

$$MT \geq 15$$

The MT (unit: g) is measured using CAPILOGRAPH 1B (manufactured and sold by Toyo Seiki Seisaku-Sho, Ltd.) under the following conditions.

Capillary: diameter 2.0 mm, length 40 mm

Cylinder diameter: 9.55 mm

Cylinder extrusion rate: 20 mm/minute

Withdrawing rate: 4.0 m/minute
Temperature: 230° C.

When MT of component (X) is extremely high, the resin may break during the measurement at the withdrawing rate of 4.0 m/minute. In such a case, the withdrawing rate is lowered and MT is the tension measured at the highest withdrawing rate in which the resin can be withdrawn. The unit and measurement conditions for MFR are described above.

This requirement is an index of the melt tension of polypropylene resin (X) having a structure with long chain branches sufficient for expansion molding. In general, MT is correlated with MFR. For this reason, this requirement is described as an expression showing the relationship with MFR.

For a person skilled in the art, such a method for defining MT by an expression showing the relationship with MFR is usual. For example, in JP-A-2003-025425, the following relational expression is proposed for defining polypropylene with high melt tension.

$$\log(MS) \geq -0.61 \times \log(MFR) + 0.82 (230° C.)$$

(wherein MS is the same as MT)

In JP-A-2003-064193, the following relational expression is proposed for defining polypropylene with high melt tension.

$$11.32 \times MFR^{-0.7854} \leq MT(230° C.)$$

In JP-A-2003-094504, the following relational expression is proposed for defining polypropylene with high melt tension.

$$MT \geq 7.52 \times MFR^{-0.576}$$

(wherein MT is measured at 190° C. and MFR is measured at 230° C.)

Polypropylene resin component (X) having a structure with long chain branches satisfying the above-mentioned Requirement (1) has sufficiently high melt tension and is suitable for expansion molding. Component (X) preferably satisfies Requirement (1)' below, more preferably Requirement (1)" below.

Requirement (1)'

Melt tension (MT) satisfying at least one of the following relationships $$\log(MT) \geq -0.9 \times \log(MFR) + 0.9$$

$$MT \geq 15$$

Requirement (1)"

Melt tension (MT) satisfying at least one of the following relationships $$\log(MT) \geq -0.9 \times \log(MFR) + 1.1$$

$$MT \geq 15$$

It is not necessary to define the higher limit of MT. In the above-mentioned method for MT measurement, measurement of MT value of more than 40 g is difficult because extremely low withdrawing rate becomes necessary. In such a case, it is thought that the extensibility of the resin is poor. For this reason, MT is preferably 40 g or less, still more preferably 35 g or less, most preferably 30 g or less.

I-4. Property (X-IV): Content of P-Xylene Soluble Components (CXS) at 25° C.

It is preferred that polypropylene resin component (X) used in the present invention having a structure with long chain branches has high stereoregularity and the content of low crystallinity components (which may bring sticky feeling and cause bleeding out) in component (X) is low. The content of low crystallinity components is evaluated with the content of p-xylene soluble components (CXS) at 25° C. which must be less than 5% by weight based on the total amount of component (X). CXS is preferably 3.0% by weight or less, more preferably 1.0% by weight or less, still more preferably 0.5% by weight or less. There is not particular limitation of the lower limit of CXS. However, CXS is usually 0.01% by weight or more, preferably 0.03% by weight or more. Details of the method for measuring CXS are given below.

2 g of sample is dissolved in 300 ml of p-xylene (containing 0.5 mg/ml of BHT) at 130° C. to thereby obtain a solution. Then, the solution is left to stand at 25° C. for 12 hours. The precipitated polymer is filtrated and then p-Xylene is evaporated from the resultant filtrate. The resultant residue is dried under reduced pressure at 100° C. for 12 hours to collect the p-xylene soluble components at room temperature. The ratio (wt. %) of the weight of the collected components based on the original weight of the sample is defined as CXS.

It is preferred that polypropylene resin component (X) used in the present invention having a structure with long chain branches has the following properties (X-v) to (X-vi) as additional characteristics.

I-5. Property (X-v): Branching Index g'

As a direct index of the presence of branches in polypropylene resin (X) having a structure with long chain branches, there can be mentioned branching index g' which is given as the ratio $[\eta]_{br}/[\eta]_{lin}$, wherein $[\eta]_{br}$ is an intrinsic viscosity of a polymer having a structure with long chain branches, and $[\eta]_{lin}$ is an intrinsic viscosity of a linear polymer having a molecular weight which is the same as that of the above-mentioned polymer having a structure with long chain branches. When a structure with long chain branches is present, this value is less than 1.

Branching index g' is an index conventionally known to a person skilled in the art which is defined in, for example, "Developments in Polymer Characterization-4" (J. V. Dawkins ed. Applied Science Publishers, 1983).

g' can be obtained as a function of the absolute molecular weight $M_{abs}$ using, for example, a GPC described below equipped with a light scattering and viscometer as detectors.

g' of polypropylene resin (X) used in the present invention having a structure with long chain branches at the absolute molecular weight $M_{abs}$ (measured by light scattering method) of 1,000,000 is preferably 0.30 or more and less than 1.00, more preferably 0.55 or more and 0.98 or less, still more preferably 0.75 or more and 0.96 or less, most preferably 0.78 or more and 0.95 or less.

As described below in detail, from the polymerization mechanism, polypropylene resin (X) used in the present invention having a structure with long chain branches is regarded as having a molecular structure with comb-like chain. In such a structure, g' of less than 0.30 means extremely high ratio of side chains and low ratio of main chain which may cause unimproved melt tension and gel formation unfavorable for expansion molding. On the other hand, g' of 1.00 means absence of branch. In such a case, melt tension tends to be insufficient and unsuitable for expansion molding.

The above-mentioned lower limit of g' is preferred for the reason as described below.

According to "Encyclopedia of Polymer Science and Engineering vol. 2" (John Wiley & Sons 1985 p. 485), g' of a comb-like polymer is represented by the following formula.

$$g' = g^\varepsilon = \left\{ \lambda + \frac{3(1-\lambda)^2}{p} + \frac{(1-\lambda)^3}{p^2} \right\}^\varepsilon \quad \text{[Formula 1]}$$

In this formula, g is a branching index defined by the ratio of radii of gyration of a polymer. $\varepsilon$ is a constant dependent on the shape of the molecular chain and type of solvent. According to Table 3 at page 487 of the above-mentioned document, it is reported that this value for a comb-like chain is approximately 0.7 to 1.0 in a good solvent. $\lambda$ is the ratio of the main chain of a comb-like chain. p is the average number of branches. This formula shows that in a comb-like chain, as the number of branches becomes extremely large (in other words, p approaches infinity), the limit of the right side of this formula is $\lambda^\varepsilon$. That is, in this situation, $g'=g^\varepsilon=\lambda^\varepsilon$. This means that g' must be larger than $\lambda^\varepsilon$, i.e., g' generally has a lower limit.

On the other hand, g' of a conventionally known random branched chain (which is regarded as being produced by electron beam radiation or peroxide modification) is given by Formula (19) at page 485 of the above-mentioned document. According to this formula, each of the values g' and g monotonically decreases as the number of branches increases with no particular lower limit. That is, in the present invention, the presence of lower limit for the value of g' shows that the shape of the structure of polypropylene resin (X) used in the present invention having a structure with long chain branches is similar to a comb-like chain. This fact more clearly distinguishes resin (X) from a conventionally known random branched chain.

In a branched polymer having g' within the above-mentioned range (i.e., having a structure similar to a comb-like chain), degree of decrease in melt tension after repeated kneading is low. This means that degree of deterioration of physical properties, moldability and the like of scrap materials produced in a commercial production of a molded article (such as end materials cut from the edge of sheet or film during its molding, runners produced by injection molding and the like) is small even when the scrap materials are subjected to molding again as recycled materials. For this reason, such a polymer is preferred.

Specific method for calculating g' is given below.

As a chromatograph for GPC, Alliance 2000 (manufactured and sold by Waters) equipped with a differential refractive index detector (RI) and viscosity detector (viscometer) is used. As a light scattering detector, multi-angle laser light scattering detector (MALLS) DAWN-E (manufactured and sold by Wyatt Technology) is used. These detectors are connected in the order of MALLS-RI-Viscometer. As a mobile phase solvent, 1,2,4-trichlorobenzene (having added thereto an antioxidant, Irganox 1076 (manufactured and sold by BASF Japan Ltd.), at a concentration of 0.5 mg/mL) is used. Flow rate is 1 mL/minute. As a column, GMHHR-H(S) HT (manufactured and sold by Tosoh Corporation) is used (2 columns connected in series). The temperature of the column, sample injector and each detector is 140° C. Concentration of the sample solution is 1 mg/mL and the injection volume (internal volume of the sample loop) is 0.2175 mL.

Calculation of the absolute molecular weight ($M_{abs}$) and mean square radius of gyration ($R_g$) from MALLS data and calculation of the intrinsic viscosity [η] from Viscometer data using the data processing software ASTRA (version 4.73.04) bundled to MALLS are conducted with reference to the following documents.

REFERENCE DOCUMENTS

1. "Developments in Polymer Characterization-4" (J. V. Dawkins ed. Applied Science Publishers, 1983. Chapter 1.)
2. Polymer, 45, 6495-6505(2004)
3. Macromolecules, 33, 2424-2436(2000)
4. Macromolecules, 33, 6945-6952(2000)

Calculation of Branching Index g'

Branching index g' is calculated as the ratio $[\eta]_{br}/[\eta]_{lin}$, wherein $[\eta]_{br}$ is an intrinsic viscosity obtained by subjecting the sample to the measurement using the above-mentioned Viscometer and $[\eta]_{lin}$ is another intrinsic viscosity obtained by separately subjecting a linear polymer to the same measurement.

When branches are introduced into a polymer molecule, the radius of gyration of this branched molecule is smaller than that of a molecule of a linear polymer having a molecular weight which is the same as that of this branched molecule. The smaller the radius of gyration of a molecule, the lower the intrinsic viscosity of the molecule. Therefore, as the amount of long chain branches introduced into the structure of a branched polymer becomes large, the ratio of the intrinsic viscosity [η] br of this branched polymer to another intrinsic viscosity $[\eta]_{lin}$, the intrinsic viscosity of a linear polymer having a molecular weight which is the same as that of this branched molecule (i.e., the ratio $[\eta]_{br}/[\eta]_{lin}$) becomes low.

This fact shows that the branching index g' ($[\eta]_{br}/[\eta]_{lin}$) of less than 1 means the presence of introduced branches. As a linear polymer for obtaining the $[\eta]_{lin}$, a commercially available homopolypropylene (NOVATEC PP (registered trademark), grade name: FY6, manufactured and sold by Japan Polypropylene Corporation) is used. In a linear polymer, there is a linear relationship between the logarithm of the and the molecular weight. This linear relationship is conventionally known as the Mark-Houwink-Sakurada equation. Therefore, any appropriate value of the $[\eta]_{lin}$ can be obtained by extrapolation of an appropriate molecular weight into the high/low molecular weight side of this equation.

I-6. Property (X-vi): Mm Fraction in the Propylene Unit Triads Measured by $^{13}$C-NMR It is preferred that polypropylene resin (X) used in the present invention having a structure with long chain branches has high stereoregularity. The degree of stereoregularity can be evaluated by $^{13}$C-NMR. It is preferred that component (X) has stereoregularity corresponding to mm fraction of 95% or more in the propylene unit triads measured by $^{13}$C-NMR.

The mm fraction is the ratio of the amount of specific propylene unit triads, based on the amount of any propylene unit triads (each constructed with head-to-tail bondings) in polymer chains, in each of which specific propylene unit triads the configurational direction of the methyl group in each propylene unit is the same. The upper limit of the mm fraction is 100%. The mm fraction shows the degree of control of the configuration of the methyl group in each propylene unit to an isotactic polymer. The higher the mm fraction, the higher the degree of the configuration control. When the mm fraction is lower than this value, lowering of the physical properties (such as elastic modulus) of the final product tends to occur.

Therefore, the mm fraction is preferably 95.0% or more, more preferably 96.0% or more, still more preferably 97.0% or more. Each of properties (X-v) to (X-vi) is related to the stereoregularity. It is especially preferred that all of properties (X-v) to (X-vi) are simultaneously satisfied.

Details of the method for measuring the mm fraction in the propylene unit triads by $^{13}$C-NMR is described below.

375 mg of the sample is completely dissolved in 2.5 ml of deuterated 1,1,2,2-tetrachlororethane in an NMR sample tube (10ϕ), and NMR spectrum is obtained using the resultant solution by complete proton decoupling method at 125° C. In the obtained spectrum, the chemical shift of the signal appearing in the middle among the 3 signals for deuterated 1,1,2,2-tetrachlororethane is set at 74.2 ppm and the chemical shift of each of the other signals in the spectrum is determined with reference to the chemical shift of this signal.

Flip angle: 90 degree
Pulse interval: 20 seconds
Resonance frequency: 100 MHz or more
Accumulation number: 10000 scans or more
Observation range: −20 ppm to 179 ppm
Number of data points: 32768

Analysis for the mm fraction is conducted using the $^{13}$C-NMR spectrum obtained under the above-mentioned conditions.

Assignment of signal in the spectrum is conducted with reference to Macromolecules, (1975) Vol. 8, page 687, Polymer, Vol. 30, page 1350 (1989) or the like.

More specific method for determining the mm fraction is described in detail in paragraphs [0053] to [0065] in JP-A-2009-275207. In the present invention, the mm fraction is determined in accordance with this method.

In the present invention, a polypropylene resin having (i) a melt tension satisfying the relationship log (MT)≥−0.9×log (MFR)+0.7 in property (X-iii) and (ii) g' of less than 1.00 at the absolute molecular weight $M_{abs}$ of 1,000,000 has a structure with long chain branches.

I-7. Method for Producing Polypropylene Resin (X) Having a Structure with Long Chain Branches There is no particular limitation of the method for producing polypropylene resin (X) having a structure with long chain branches as long as resin (X) satisfies the above-mentioned properties (X-i) to (X-iv). However, preferred production method for satisfying all of the above-mentioned requirements related to high stereoregularity, low content of low crystallinity components, relatively broad molecular weight distribution, range of branching index g', high melt tension and the like is a method by macromer copolymerization using a combination of metallocene catalysts. Examples of such a method include the method disclosed in JP-A-2009-057542.

In this method, a polypropylene having a structure with long chain branches is produced using a catalyst in which (i) a catalyst component having a specific structure which is capable of producing a macromer and (ii) another catalyst component having another specific structure which is capable of copolymerizing a high molecular weight macromer are combined. By this method, a polypropylene resin having a structure with long chain branches with desired properties can be produced by an industrially effective manner (such as bulk polymerization and vapor phase polymerization) with a single-stage polymerization process under practical pressure and temperature conditions using hydrogen as a molecular weight modifier.

Conventionally, efficacy of branch production must have been improved by decreasing the crystallinity of the product by the use of a polypropylene component with low stereoregularity. However, by the above-mentioned method, a polypropylene component having satisfactorily high stereoregularity can be introduced as side chains. That is, this method is preferred for achieving properties (X-iv) and (X-v) (related to high stereoregularity and low content of low crystallinity components, respectively) which are preferred as those of polypropylene resin (X) used in the present invention.

Further, by the use of the above-mentioned method using 2 different catalyst components with polymerization properties drastically different to each other, the molecular weight distribution becomes broad and properties (X-i) to (X-iii) necessary for polypropylene resin (X) used in the present invention having a structure with long chain branches can be simultaneously achieved. For this reason, this method is preferred.

Preferred method for producing polypropylene resin (X) having a structure with long chain branches is described below in detail.

As a preferred method for producing polypropylene resin (X) having a structure with long chain branches, there can be mentioned a method for producing a propylene-based polymer using the following catalyst components (A), (B) and (C).

(A): at least 2 transition metal compounds of Group 4 the Periodic Table comprising at least 1 compound selected from the group consisting of the compounds of component [A-1] below and at least 1 compound selected from the group consisting of the compounds of component [A-2] below:

Component [A-1]: a compound represented by general formula (a1) given below
Component [A-2]: a compound represented by general formula (a2) given below
(B): a phyllosilicate having ion exchange ability
(C): an organoaluminum compound Each of catalyst components (A), (B) and (C) is explained below in detail.

(1) Catalyst Component (A)
(i) Component [A-1]: a compound represented by general formula (a1)

[Chemical Formula 1]

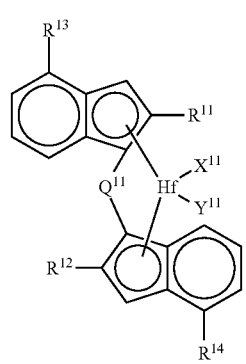

General formula (a1)

(In general formula (a1),
each of $R^{11}$ and $R^{12}$ independently represents a $C_4$-$C_{16}$ heterocyclic group containing nitrogen, oxygen or sulfur;
each of $R^{13}$ and $R^{14}$ independently represents a $C_6$-$C_{16}$ aryl group which may contain 1 or more heteroatom selected from the group consisting of halogen, silicon, oxygen, sulfur, nitrogen, boron and phosphorus or a $C_6$-$C_{16}$ heterocyclic group containing nitrogen, oxygen or sulfur;

each of $X^{11}$ and $Y^{11}$ independently represents a hydrogen atom, a halogen atom, a $C_1$-$C_{20}$ hydrocarbon group, a $C_1$-$C_{20}$ silicon-containing hydrocarbon group, a $C_1$-$C_{20}$ halogenated hydrocarbon group, a $C_1$-$C_{20}$ oxygen-containing hydrocarbon group, an amino group or a $C_1$-$C_{20}$ nitrogen-containing hydrocarbon group; and $Q^{11}$ represents a $C_1$-$C_{20}$ divalent hydrocarbon group or a silylene or germylene group which may have a $C_1$-$C_{20}$ hydrocarbon group.)

As the above-mentioned $C_4$-$C_{16}$ heterocyclic group containing nitrogen, oxygen or sulfur as $R^{11}$ or $R^{12}$, 2-furyl group, substituted 2-furyl groups, substituted 2-thienyl groups and substituted 2-furfuryl group are preferred. Substituted 2-furyl groups are more preferred.

As the substituent for the substituted 2-furyl groups, substituted 2-thienyl groups and substituted 2-furfuryl group, there can be mentioned a $C_1$-$C_6$ alkyl group, such as methyl group, ethyl group and propyl group; a halogen atom, such as fluorine atom and chlorine atom; a $C_1$-$C_6$ alkoxy group such as methoxy group and ethoxy group; and a triallylsilyl group. Among these, methyl group and triallylsilyl group are preferred, and methyl group is more preferred.

Especially preferred group as each of $R^{11}$ and $R^{12}$ is 2-(5-methyl)-furyl group. It is preferred that $R^{11}$ and $R^{12}$ are the same.

The above-mentioned $C_6$-$C_{16}$ aryl group as $R^{13}$ or $R^{14}$ (which may contain 1 or more heteroatom selected from the group consisting of halogen, silicon, oxygen, sulfur, nitrogen, boron and phosphorus) may have, on its carbon atom(s) in the aryl ring skeleton, at least 1 substituent selected from the group consisting of a $C_1$-$C_6$ hydrocarbon group, a $C_1$-$C_6$ silicon-containing hydrocarbon group and a $C_1$-$C_6$ halogenated hydrocarbon group, as long as number of the carbon atom(s) in this aryl group is from 6 to 16.

At least one of $R^{13}$ and $R^{14}$ is preferably phenyl group, 4-methylphenyl group, 4-i-propylphenyl group, 4-t-butylphenyl group, 4-trimethylsilylphenyl group, 2,3-dimethylphenyl group, 3,5-di-t-butylphenyl group, 4-phenyl-phenyl group, chlorophenyl group, naphthyl group or phenanthryl group, more preferably phenyl group, 4-i-propylphenyl group, 4-t-butylphenyl group, 4-trifluoromethylphenyl group or 4-chlorophenyl group. It is preferred that $R^{13}$ and $R^{14}$ are the same.

In general formula (a1), each of $X^{11}$ and $Y^{11}$ is an auxiliary ligand which reacts with catalyst component (B) (promoter) to form an active metallocene catalyst with olefin polymerization activity. Therefore, as long as this object is achieved, there is no particular limitation of kind of ligand as each of $X^{11}$ and $Y^{11}$. Each of $X^{11}$ and $Y^{11}$ independently represents a hydrogen atom, a halogen atom, a $C_1$-$C_{20}$ hydrocarbon group, a $C_1$-$C_{20}$ silicon-containing hydrocarbon group, a $C_1$-$C_{20}$ halogenated hydrocarbon group, a $C_1$-$C_{20}$ oxygen-containing hydrocarbon group, an amino group, a $C_1$-$C_{20}$ nitrogen-containing hydrocarbon group, a $C_1$-$C_{20}$ alkoxy group, a $C_1$-$C_{20}$ alkylamide group, trifluoromethyanesulfonic acid group or a $C_1$-$C_{20}$ phosphorus-containing hydrocarbon group.

In general formula (a1), $Q^{11}$, a bridging group bonding two 5-membered rings, is a $C_1$-$C_{20}$ divalent hydrocarbon group or a silylene or germylene group which may have a $C_1$-$C_{20}$ hydrocarbon group. When 2 hydrocarbon groups are present on the above-mentioned silylene or germylene group, the 2 hydrocarbon groups may be bonded to each other to form a cyclic structure.

Specific examples of the above-mentioned $Q_{11}$ include alkylene groups such as methylene, methylmethylene, dimethylmethylene and 1,2-ethylene; arylalkylene groups such as diphenylmethylene; silylene group; alkylsilylene groups such as methylsilylene, dimethylsilylene, diethylsilylene, di(n-propyl)silylene, di(i-propyl)silylene and di(cyclohexyl)silylene; (alkyl)(aryl)silylene groups such as methyl(phenyl)silylene; arylsilylene groups such as diphenylsilylene; alkyloligosilylene groups such as tetramethyldisilylene; germylene group; and alkylgermylene groups, (alkyl) (aryl) germylene) germylene groups and arylgermylene groups each in which the silicon atom in the above-mentioned silylene group having a $C_1$-$C_{20}$ hydrocarbon group is substituted with a germanium atom. Among these groups, preferred are silylene groups each having a $C_1$-$C_{20}$ hydrocarbon group and germylene groups each having a $C_1$-$C_{20}$ hydrocarbon group. Alkylsilylene groups and alkylgermylene groups are especially preferred.

Specific examples of preferred compounds of general formula (a1) include the compounds enumerated below.

Dichloro[1,1'-dimethylsilylenebis{2-(2-furyl)-4-phenyl-indenyl}]hafnium

Dichloro[1,1'-dimethylsilylenebis{2-(2-thienyl)-4-phenyl-indenyl}]hafnium

Dichloro[1,1'-dimethylsilylenebis{2-(5-methyl-2-furyl)-4-phenyl-indenyl}]hafnium Dichloro[1,1'-diphenylsilylenebis{2-(5-methyl-2-furyl)-4-phenyl-indenyl}]hafnium Dichloro[1,1'-dimethylgermylenebis{2-(5-methyl-2-furyl)-4-phenyl-indenyl}]hafnium Dichloro[1,1'-dimethylgermylenebis{2-(5-methyl-2-thienyl)-4-phenyl-indenyl}]hafnium Dichloro[1,1'-dimethylsilylenebis{2-(5-t-butyl-2-furyl)-4-phenyl-indenyl}]hafnium Dichloro[1,1'-dimethylsilylenebis{2-(5-trimethylsilyl-2-furyl)-4-phenyl-indenyl}]hafnium Dichloro[1,1'-dimethylsilylenebis{2-(5-phenyl-2-furyl)-4-phenyl-indenyl}]hafnium Dichloro[1,1'-diphenylsilylenebis{2-(4,5-dimethyl-2-furyl)-4-phenyl-indenyl}]hafnium dichloride Dichloro[1,1'-dimethylsilylenebis{2-(2-benzofuryl)-4-phenyl-indenyl}]hafnium Dichloro[1,1'-dimethylsilylenebis{2-(5-methyl-2-furyl)-4-(4-methylphenyl)-indenyl}]hafnium Dichloro[1,1'-dimethylsilylenebis{2-(5-methyl-2-furyl)-4-(4-i-propylphenyl)-indenyl}]hafnium Dichloro[1,1'-dimethylsilylenebis{2-(5-methyl-2-furyl)-4-(4-trimethylsilylphenyl)-indenyl}]hafnium Dichloro[1,1'-dimethylsilylenebis{2-(2-furfuryl)-4-phenyl-indenyl}]hafnium Dichloro[1,1'-dimethylsilylenebis{2-(5-methyl-2-furyl)-4-(4-chlorophenyl)-indenyl}]hafnium Dichloro[1,1'-dimethylsilylenebis{2-(5-methyl-2-furyl)-4-(4-fluorophenyl)-indenyl}]hafnium Dichloro[1,1'-dimethylsilylenebis{2-(5-methyl-2-furyl)-4-(4-trifluoromethylphenyl)-indenyl}]hafnium Dichloro[1,1'-dimethylsilylenebis{2-(5-methyl-2-furyl)-4-(4-t-butylphenyl)-indenyl}]hafnium Dichloro[1,1'-dimethylsilylenebis{2-(2-furyl)-4-(1-naphthyl)-indenyl}]hafnium Dichloro[1,1'-dimethylsilylenebis{2-(2-furyl)-4-(2-naphthyl)-indenyl}]hafnium Dichloro[1,1'-dimethylsilylenebis{2-(2-furyl)-4-(2-phenanthryl)-indenyl}]hafnium Dichloro[1,1'-dimethylsilylenebis{2-(2-furyl)-4-(9-phenanthryl)-indenyl}]hafnium Dichloro[1,1'-dimethylsilylenebis{2-(5-methyl-2-furyl)-4-(1-naphthyl)-indenyl}]hafnium Dichloro[1,1'-dimethylsilylenebis{2-(5-methyl-2-furyl)-4-(2-naphthyl)-indenyl}]hafnium
Dichloro[1,1'-dimethylsilylenebis{2-(5-methyl-2-furyl)-4-(2-phenanthryl)-indenyl}]hafnium
Dichloro[1,1'-dimethylsilylenebis{2-(5-methyl-2-furyl)-4-(9-phenanthryl)-indenyl}]hafnium
Dichloro[1,1'-dimethylsilylenebis{2-(5-t-butyl-2-furyl)-4-(1-naphthyl)-indenyl}]hafnium
Dichloro[1,1'-dimethylsilylenebis{2-(5-t-butyl-2-furyl)-4-(2-naphthyl)-indenyl}]hafnium
Dichloro[1,1'-dimethylsilylenebis{2-(5-t-butyl-2-furyl)-4-(2-phenanthryl)-indenyl}]hafnium
Dichloro[1,1'-dimethylsilylenebis{2-(5-t-butyl-2-furyl)-4-(9-phenanthryl)-indenyl}]hafnium Among these compounds, the following compounds are preferred.
Dichloro[1,1'-dimethylsilylenebis{2-(5-methyl-2-furyl)-4-phenyl-indenyl}]hafnium
Dichloro[1,1'-dimethylsilylenebis{2-(5-methyl-2-furyl)-4-(4-methylphenyl)-indenyl}]hafnium
Dichloro[1,1'-dimethylsilylenebis{2-(5-methyl-2-furyl)-4-(4-i-propylphenyl)-indenyl}]hafnium
Dichloro[1,1'-dimethylsilylenebis{2-(5-methyl-2-furyl)-4-(4-trimethylsilylphenyl)-indenyl}]hafnium
Dichloro[1,1'-dimethylsilylenebis{2-(5-methyl-2-furyl)-4-(4-chlorophenyl)-indenyl}]hafnium
Dichloro[1,1'-dimethylsilylenebis{2-(2-furyl)-4-(2-naphthyl)-indenyl}]hafnium
Dichloro[1,1'-dimethylsilylenebis{2-(5-methyl-2-furyl)-4-(4-t-butylphenyl)-indenyl}]hafnium The following compounds are especially preferred.
Dichloro[1,1'-dimethylsilylenebis{2-(5-methyl-2-furyl)-4-phenyl-indenyl}]hafnium
Dichloro[1,1'-dimethylsilylenebis{2-(5-methyl-2-furyl)-4-(4-i-propylphenyl)-indenyl}]hafnium
Dichloro[1,1'-dimethylsilylenebis{2-(5-methyl-2-furyl)-4-(4-trimethylsilylphenyl)-indenyl}]hafnium
Dichloro[1,1'-dimethylsilylenebis{2-(5-methyl-2-furyl)-4-(4-t-butylphenyl)-indenyl}]hafnium (ii) Component [A-2]: a Compound Represented by General Formula (a2)

[Chemical Formula 2]

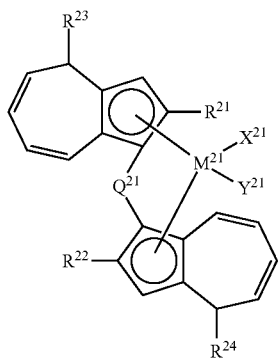

General formula (a2)

(In general formula (a2),
each of $R^{21}$ and $R^{22}$ independently represents a $C_1$-$C_6$ hydrocarbon group;
each of $R^{23}$ and $R^{24}$ independently represents a $C_6$-$C_{16}$ aryl group which may contain 1 or more heteroatom selected from the group consisting of halogen, silicon, oxygen, sulfur, nitrogen, boron and phosphorus;
each of $X^{21}$ and $Y^{21}$ independently represents a hydrogen atom, a halogen atom, a $C_1$-$C_{20}$ hydrocarbon group, a $C_1$-$C_{20}$ silicon-containing hydrocarbon group, a $C_1$-$C_{20}$ halogenated hydrocarbon group, a $C_1$-$C_{20}$ oxygen-containing hydrocarbon group, an amino group or a $C_1$-$C_{20}$ nitrogen-containing hydrocarbon group;
$Q^{21}$ represents a $C_1$-$C_{20}$ divalent hydrocarbon group or a silylene or germylene group which may have a $C_1$-$C_{20}$ hydrocarbon group; and
$M^{21}$ represents zirconium or hafnium.)

Each of the above-mentioned $R^{21}$ and $R^{22}$ independently represents a $C_1$-$C_6$ hydrocarbon group (preferably an alkyl group), more preferably a $C_1$-$C_4$ alkyl group. Specific examples of these groups include methyl, ethyl, n-propyl, i-propyl, n-butyl, i-butyl, sec-butyl, n-pentyl, i-pentyl and n-hexyl. Among these, methyl, ethyl and n-propyl are preferred.

Each of the above-mentioned $R^{23}$ and $R^{24}$ independently represents a $C_6$-$C_{16}$ (preferably $C_6$-$C_{12}$) aryl group which may contain 1 or more heteroatom selected from the group consisting of halogen, silicon, oxygen, sulfur, nitrogen, boron and phosphorus. Examples of preferred groups include phenyl, 3-chlorophenyl, 4-chlorophenyl, 3-fluorophenyl, 4-fluorophenyl, 4-methylphenyl, 4-i-propylphenyl, 4-t-butylphenyl, 4-trimethylsilylphenyl, 2-fluoro-4-biphenylyl, 2-chloro-4-biphenylyl, 1-naphthyl, 2-naphthyl, 4-chloro-2-naphthyl, 3-methyl-4-trimethylsilylphenyl, 3,5-dimethyl-4-t-butylphenyl, 3,5-dimethyl-4-trimethylsilylphenyl and 3,5-dichloro-4-trimethylsilylphenyl.

Each of the above-mentioned $X^{21}$ and $Y^{21}$ is an auxiliary ligand which reacts with catalyst component (B) (promoter) to form an active metallocene catalyst with olefin polymerization activity. Therefore, as long as this object is achieved, there is no particular limitation of kind of ligand as each of $X^{21}$ and $Y^{21}$. Each of $X^{21}$ and $Y^{21}$ independently represents a hydrogen atom, a halogen atom, a $C_1$-$C_{20}$ hydrocarbon group, a $C_1$-$C_{20}$ silicon-containing hydrocarbon group, a $C_1$-$C_{20}$ halogenated hydrocarbon group, a $C_1$-$C_{20}$ oxygen-containing hydrocarbon group, an amino group, a $C_1$-$C_{20}$ nitrogen-containing hydrocarbon group, a $C_1$-$C_{20}$ alkoxy group, a $C_1$-$C_{20}$ alkylamide group, trifluoromethyanesulfonic acid group or a $C_1$-$C_{20}$ phosphorus-containing hydrocarbon group.

The above-mentioned $Q^{12}$, a bridging group bonding two ligands each having a conjugated 5-membered ring, is a $C_1$-$C_{20}$ divalent hydrocarbon group or a silylene or germylene group which may have a $C_1$-$C_{20}$ hydrocarbon group. Each of the 2 substituents bonded to silicon or germanium is preferred to be a $C_1$-$C_{12}$ hydrocarbon group. These substituents may be bonded to each other to form a cyclic structure.

Specific examples of $Q^{12}$ include methylene, dimethylmethylene, ethylen-1,2-diyl, dimethylsilylene, diethylsilylene, diphenylsilylene, methylphenylsilylene, 9-silafluoren-9,9-diyl, dimethylsilylene, diethylsilylene, diphenylsilylene, methylphenylsilylene, 9-silafluoren-9,9-diyl, dimethylgermylene, diethylgermylene, diphenylgermylene and methylphenylgermylene.

The above-mentioned $M^{21}$ is zirconium or hafnium, preferably hafnium.

Non-limiting examples of metallocene compounds represented by the above-mentioned general formula (a2) include the following compounds.

Although only the following compounds are described as typical examples for avoiding cumbersome exemplification of large number of compounds, it is apparent that the present invention should not be construed as being limited to these compounds and any other ligand, bridging group and/or auxiliary ligand may be arbitrarily used. Although each of the compounds described below contains hafnium as the central metal, the present specification should be regarded as also disclosing analogs of these compounds each in which hafnium is replaced with zirconium.

Dichloro{1,1'-dimethylsilylenebis(2-methyl-4-phenyl-4-hydroazulenyl)}hafnium
Dichloro[1,1'-dimethylsilylenebis{2-methyl-4-(4-chlorophenyl)-4-hydroazulenyl}]hafnium
Dichloro[1,1'-dimethylsilylenebis{2-methyl-4-(4-t-butylphenyl)-4-hydroazulenyl}]hafnium
Dichloro[1,1'-dimethylsilylenebis{2-methyl-4-(4-trimethylsilylphenyl)-4-hydroazulenyl}]hafnium
Dichloro[1,1'-dimethylsilylenebis{2-methyl-4-(3-chloro-4-t-butylphenyl)-4-hydroazulenyl}]hafnium
Dichloro[1,1'-dimethylsilylenebis{2-methyl-4-(3-methyl-4-t-butylphenyl)-4-hydroazulenyl}]hafnium
Dichloro[1,1'-dimethylsilylenebis{2-methyl-4-(3-chloro-4-trimethylsilylphenyl)-4-hydroazulenyl}]hafnium
Dichloro[1,1'-dimethylsilylenebis{2-methyl-4-(3-methyl-4-trimethylsilylphenyl)-4-hydroazulenyl}]hafnium
Dichloro[1,1'-dimethylsilylenebis{2-methyl-4-(l-naphthyl)-4-hydroazulenyl}]hafnium
Dichloro[1,1'-dimethylsilylenebis{2-methyl-4-(2-naphthyl)-4-hydroazulenyl}]hafnium
Dichloro[1,1'-dimethylsilylenebis{2-methyl-4-(4-chloro-2-naphthyl)-4-hydroazulenyl}]hafnium
Dichloro[1,1'-dimethylsilylenebis{2-methyl-4-(2-fluoro-4-biphenylyl)-4-hydroazulenyl}]hafnium
Dichloro[1,1'-dimethylsilylenebis{2-methyl-4-(2-chloro-4-biphenylyl)-4-hydroazulenyl}]hafnium
Dichloro[1,1'-dimethylsilylenebis{2-methyl-4-(9-phenanthryl)-4-hydroazulenyl}]hafnium
Dichloro[1,1'-dimethylsilylenebis{2-ethyl-4-(4-chlorophenyl)-4-hydroazulenyl}]hafnium
Dichloro[1,1'-dimethylsilylenebis{2-n-propyl-4-(3-chloro-4-trimethylsilylphenyl)-4-hydroazulenyl}]hafnium
Dichloro[1,1'-dimethylsilylenebis{2-ethyl-4-(3-chloro-4-t-butylphenyl)-4-hydroazulenyl}]hafnium
Dichloro[1,1'-dimethylsilylenebis{2-ethyl-4-(3-methyl-4-trimethylsilylphenyl)-4-hydroazulenyl}]hafnium
Dichloro[1,1'-dimethylgermylenebis{2-methyl-4-(2-fluoro-4-biphenylyl)-4-hydroazulenyl}]hafnium
Dichloro[1,1'-dimethylgermylenebis{2-methyl-4-(4-t-butylphenyl)-4-hydroazulenyl}]hafnium
Dichloro[1,1'-(9-silafluoren-9,9-diyl)bis{2-ethyl-4-(4-chlorophenyl)-4-hydroazulenyl}]hafnium
Dichloro[1,1'-dimethylsilylenebis{2-ethyl-4-(4-chloro-2-naphthyl)-4-hydroazulenyl}]hafnium
Dichloro[1,1'-dimethylsilylenebis{2-ethyl-4-(2-fluoro-4-biphenylyl)-4-hydroazulenyl}]hafnium
Dichloro[1,1'-(9-silafluoren-9,9-diyl)bis{2-ethyl-4-(3,5-dichloro-4-trimethylsilylphenyl)-4-hydroazulenyl}]hafnium Among these compounds, the following compounds are preferred.
Dichloro[1,1'-dimethylsilylenebis{2-methyl-4-(4-chlorophenyl)-4-hydroazulenyl}]hafnium
Dichloro[1,1'-dimethylsilylenebis{2-methyl-4-(3-chloro-4-trimethylsilylphenyl)-4-hydroazulenyl}]hafnium
Dichloro[1,1'-dimethylsilylenebis{2-ethyl-4-(2-fluoro-4-biphenylyl)-4-hydroazulenyl}]hafnium
Dichloro[1,1'-dimethylsilylenebis{2-ethyl-4-(4-chloro-2-naphthyl)-4-hydroazulenyl}]hafnium
Dichloro[1,1'-dimethylsilylenebis{2-ethyl-4-(3-methyl-4-trimethylsilylphenyl)-4-hydroazulenyl}]hafnium
Dichloro[1,1'-(9-silafluoren-9,9-diyl)bis{2-ethyl-4-(3,5-dichloro-4-trimethylsilylphenyl)-4-hydroazulenyl}]hafnium The following compounds are especially preferred.
Dichloro[1,1'-dimethylsilylenebis{2-methyl-4-(4-chlorophenyl)-4-hydroazulenyl}]hafnium
Dichloro[1,1'-dimethylsilylenebis{2-ethyl-4-(2-fluoro-4-biphenylyl)-4-hydroazulenyl}]hafnium
Dichloro[1,1'-dimethylsilylenebis{2-ethyl-4-(3-methyl-4-trimethylsilylphenyl)-4-hydroazulenyl}]hafnium
Dichloro[1,1'-(9-silafluoren-9,9-diyl)bis{2-ethyl-4-(3,5-dichloro-4-trimethylsilylphenyl)-4-hydroazulenyl}]hafnium (2) Catalyst Component (B)

Catalyst component (B) preferably used for producing polypropylene resin (X) having a structure with long chain branches is a phyllosilicate having ion exchange ability.

(i) Type of Phyllosilicates Having Ion Exchange Ability

The term "phyllosilicate having ion exchange ability" (hereinbelow may be simply referred to as "silicate") means a silicate compound which has a crystalline structure that each plane constituted by an ionic bond or the like is stacked in parallel by the bonding strength, and in which the contained ion is exchangeable. Since most of silicates are produced mainly as the major component of natural clay minerals, they often contain foreign matters (quartz, cristobalite and the like) other than phyllosilicates having ion exchange ability. These foreign matters may be contained. The complex of silicate and foreign matters may be more preferred than pure silicate, depending on the type, particle diameter, crystallinity, state of dispersion and the like of the foreign matters. Therefore, such a complex is included in catalyst component (B).

The silicate used in the present invention is not limited to naturally occurred silicate and may be or contain an artificial (synthetic) silicate.

Specific examples of silicates include the following phyllosilicates, which are described in "Clay Mineralogy" written by Shiramizu Haruo, published by Asakura Shoten (1995).

They are a smectite group such as montmorillonite, sauconite, beidellite, nontronite, saponite, hectorite and stevensite; a vermiculite group such as vermiculite; a mica group such as mica, illite, sericite and glauconite; attapulgite, sepiolite, palygorskite, bentonite, pyrophylite, talc, chlorite group and the like.

The silicate is preferably a silicate having a 2:1 type structure of the main component silicate, more preferably a smectite group and particularly preferably montmorillonite. The kind of an interlayer cation is not particularly limited, but a silicate having an alkaline metal or an alkaline-earth metal as the main component of the interlayer cation is preferable from the standpoint that it can be obtained relatively easily and inexpensively as an industrial raw material.

(ii) Chemical Treatment of Phyllosilicates Having Ion Exchange Ability

The silicate to be used as catalyst component (B) in the present invention can be used as it is, without being particularly treated, but is preferably subjected to chemical treatment. The chemical treatment that can be used here means both of the surface treatment for removing impurities on the surface and the treatment for affecting the structure of clay. Specifically, the following acid treatment, alkali treatment, salt treatment, organic-compound treatment and the like are included.

<Acid Treatment>

Acid treatment removes impurities on the surface and also can elute part or all of cations such as Al, Fe and Mg in the crystal structure.

The acid to be used in the acid treatment is preferably selected from hydrochloric acid, sulfuric acid, nitric acid, phosphoric acid, acetic acid and oxalic acid.

Two or more kinds of salts (explained in the next item) and acids may be used for treatment. The treating conditions are not particularly limited, but usually, it is preferred that the treatment is conducted under the conditions in which at least a portion of the substance constituting at least one compound selected from the group consisting of the phyllosilicates having ion exchange ability is eluted, i.e., under the appropriately selected conditions including the salt or acid concentration of 0.1 to 50% by weight, a treating temperature of room temperature to a boiling point and a treating time of 5 minutes to 24 hours. The salts and acids are generally used in the form of an aqueous solution.

The following salts or acids may be used in combination as combined treating agents. These salts and acids may be used in combination.

<Salt Treatment>

It is preferred in the present invention that 40% or more, preferably 60% or more of the exchangeable cations of a Group 1 metal contained in the phyllosilicates having ion exchange ability before subjected to salt treatment are exchanged with the cations dissociated from the salts shown below.

The salts to be used in the salt treatment aiming such ion exchange are a compound composed of (i) a cation derived from at least one atom selected from the group consisting of the atoms of Groups 1 to 14 and (ii) an anion derived from at least one member selected from the group consisting of halogen atoms, inorganic acids and organic acids. More preferably, the salt is a compound composed of (i) a cation derived from at least one atom selected from the group consisting of the atoms of Groups 2 to 14 and (ii) at least one anion selected from the group consisting of Cl, Br, I, F, $PO_4$, $SO_4$, $NO_3$, $CO_3$, $C_2O_4$, $ClO_4$, $OOCCH_3$, $CH_3COCHCOCH_3$, $OCl_2$, $O(NO_3)_2$, $O(ClO_4)_2$, $O(SO_4)$, $OH$, $O_2Cl_2$, $OCl_3$, $OOCH$, $OOCCH_2CH_3$, $C_2H_4O_4$ and $C_5H_5O_7$.

Examples of such salts include LiF, LiCl, LiBr, LiI, $Li_2SO_4$, $Li(CH_3COO)$, $LiCO_3$, $Li(C_6H_5O_7)$, $LiCHC_2$, $LiC_2O_4$, $LiClO_4$, $Li_3PO_4$, $CaCl_2$, $CaSO_4$, $CaC_2O_4$, $Ca(NO_3)_2$, $Ca_3(C_6H_5O_7)_2$, $MgCl_2$, $MgBr_2$, $MgSC_4$, $Mg(PO_4)_2$, $Mg(ClO_4)_2$, $MgC_2O_4$, $Mg(NO_3)_2$, $Mg(OOCCH_3)_2$, $MgC_4H_4O_4$ and the like.

Further examples of such salts include $Ti(OOCCH_3)_4$, $Ti(CO_3)_2$, $Ti(NO_3)_4$, $Ti(SO_4)_2$, $TiF_4$, $TiCl_4$, $Zr(OOCCH_3)_4$, $Zr(CO_3)_2$, $Zr(NO_3)_4$, $Zr(SO_4)_2$, $ZrF_4$, $ZrCl_4$, $ZrOCl_2$, $ZrO(NO_3)_2$, $ZrO(ClC_4)_2$, $ZrO(SO_4)$ $Hf(OOCCH_3)_4$, $Hf(CO_3)_2$, $Hf(NO_3)_4$, $Hf(SO_4)_2$, $HfOCl_2$, $HfF_4$, $HfCl_4$, $V(CH_3COCHCOCH_3)_3$, $VOSO_4$, $VOCl_3$, $VCl_3$, $VCl_4$, $VBr_3$ and the like.

Further examples of such salts include $Cr(CH_3COCHCOCH_3)_3$, $Cr(OOCCH_3)_2OH$, $Cr(NO_3)_3$, $Cr(ClO_4)_3$, $CrPO_4$, $Cr_2(SO_4)_3$, $CrO_2Cl_2$, $CrF_3$, $CrCl_3$, $CrBr_3$, $CrI_3$, $Mn(OOCCH_3)_2$, $Mn(CH_3COCHCOCH_3)_2$, $MnCO_3$, $Mn(NO_3)_2$, $MnO$, $Mn(ClO_4)_2$, $MnF_2$, $MnCl_2$, $Fe(OOCCH_3)_2$, $Fe(CH_3COCHCOCH_3)_3$, $FeCO_3$, $Fe(NO_3)_3$, $Fe(ClO_4)_3$, $FePO_4$, $FeSO_4$, $Fe_2(SO_4)_3$, $FeF_3$, $FeCl_3$, $FeC_6H_5O_7$ and the like.

Further examples of such salts include $Co(OOCCH_3)_2$, $Co(CH_3COCHCOCH_3)_3$, $CoCO_3$, $Co(NO_3)_2$, $CoC_2O_4$, $Co(ClO_4)_2$, $CO_3(PO_4)_2$, $CoSO_4$, $CoF_2$, $CoCl_2$, $NiCO_3$, $Ni(NO_3)_2$, $NiC_2O_4$, $Ni(ClO_4)_2$, $NiSO_4$, $NiCl_2$, $NiBr_2$ and the like.

Still further examples of such salts include $Zn(OOCCH_3)_2$, $Zn(CH_3COCHCOCH_3)_2$, $ZnCO_3$, $Zn(NO_3)_2$, $Zn(ClO_4)_2$, $Zn_3(PO_4)_2$, $ZnSO_4$, $ZnF_2$, $ZnCl_2$, $AlF_3$, $AlCl_3$, $AlBr_3$, $AlI_3$, $Al_2(SO_4)_3$, $Al_2(O_2O_4)_3$, $Al(CH_3COCHCOCH_3)_3$, $Al(NO_3)_3$, $AlPO_4$, $GeCl_4$, $GeBr_4$, $GeI_4$ and the like.

<Alkali Treatment>

In addition to the acid and/or salt treatment, the following alkali treatment and/or organic-compound treatment may be conducted, if necessary. Examples of the treating agent to be used for alkali treatment include LiOH, NaOH, KOH, $Mg(OH)_2$, $Ca(OH)_2$, $Sr(OH)_2$ and $Ba(OH)_2$.

<Organic-Compound Treatment>

The organic compound to be used for organic-compound treatment includes trimethylammonium, triethylammonium, N,N-dimethylanilinium, triphenylphosphonium and the like.

The anion constituting an agent for organic-compound treatment includes, but is not limited thereto, for example, hexafluorophosphate, tetrafluoroborate and tetraphenylborate, besides the above-mentioned anions given as the examples of the anion constituting a salt treating agent.

These treating agents may be used individually or in combination. The treating agents may be combined at the time of beginning the treatment or during the treatment. Multiple chemical treatments may be conducted using the same or different treating agent(s).

These phyllosilicates having ion exchange ability usually contain adsorbed water and interlayer water. In the present invention, it is preferred to remove the adsorbed water and interlayer water before the use as catalyst component (B).

The heat-treating method for adsorbed water and interlayer water of phyllosilicates having ion exchange ability is not particularly limited, but it is necessary to select the conditions of the treatment so that the interlayer water may not be left or so that the structure may not be damaged. The heating time should be 0.5 hours or longer, preferably 1 hour or longer. Preferably, the water content of catalyst component (B) after the water is removed is not higher than 3% by weight, preferably not higher than 1% by weight, based on the water content after 2-hour dehydration under the conditions including the temperature of 200° C. and pressure of 1 mmHg regarded as 0% by weight.

As described above, the phyllosilicate having ion exchange ability with the water content of not higher than 3% by weight, which has been subjected to salt treatment and/or acid treatment, is particularly preferred as catalyst component (B) in the present invention.

The phyllosilicate having ion exchange ability may be (and is preferred to be) treated with catalyst component (C) (organoaluminum compound) described below, prior to the catalyst formation or use as a catalyst. There is no limitation of the amount of catalyst component (C), but the amount is usually 20 mmol or less, preferably 0.5 mmol or more and 10 mmol or less, per 1 g of the phyllosilicate having ion exchange ability. There is no limitation of the time and temperature for this treatment, but the temperature for this treatment is usually 0° C. or higher and 70° C. or lower, and the time for this treatment is usually 10 minutes or more and 3 hours or less. The silicate may be (and is preferred to be) washed after this treatment. The solvent for this washing is the same as that for the preliminary polymerization and slurry polymerization described below.

In addition, preferably, spherical particles of a mean particle diameter of not less than 5 μm are used as catalyst component (B). A natural product or commercially available product may be used as it is, as long as its particle shape is spherical, or particles having a shape and size controlled by granulating, grading, sorting and the like may be used.

The granulating method to be used includes, for example, an agitation granulating method and a spray granulating method. Commercially available granulated product may also be used.

In addition, an organic compound, an inorganic solvent, an inorganic salt and various binders may be used in granulating.

It is preferred that thus obtained spherical particles have a compressive crushing strength not lower than 0.2 MPa, particularly preferably not lower than 0.5 MPa in order to suppress fracture and fine formation in a polymerization step. Such a particle strength is remarkably effective for improvement of particle properties, especially in preliminary polymerization.

(3) Catalyst Component (C)

Catalyst component (C) is an organoaluminum compound. The organoaluminum compound suitably used as catalyst component (C) is represented by general formula $(AlR^{31}_q Z_{3-q})_p$.

Needless to say, the compound represented by this formula can be used individually or in a mixed form with others or together with others. In this formula, $R^{31}$ is a $C_1$-$C_{20}$ hydrocarbon group, Z is halogen, hydrogen, an alkoxy group or an amino group, q is an integer of from 1 to 3 and p is an integer of from 1 to 2. $R^{31}$ is preferably an alkyl group. Preferably, Z is chlorine in the case of a halogen, a $C_1$-$C_8$ alkoxy group in the case of an alkoxy group and a $C_1$-$C_8$ amino group in the case of an amino group.

Specific examples of organoaluminum compounds include trimethylaluminum, triethylaluminum, trinormalpropylaluminum, trinormalbutylaluminum, triisobutylaluminum, trinormalhexylaluminum, trinormaloctylaluminum, trinormaldecylaluminum, diethylaluminum chloride, diethylaluminum sesquichloride, diethylaluminum hydride, diethylaluminum ethoxide, diethylaluminum dimethylamide, diisobutylaluminum hydride, diisobutylaluminum chloride and the like.

Among these compounds, a trialkylaluminum and alkylaluminum hydride with p of 1 and q of 3 are preferred. A trialkylaluminum with a $C_1$-$C_8$ hydrocarbon group as $R^{31}$ is more preferred.

(4) with Regard to Catalyst Formation and Preliminary Polymerization

The catalyst can be formed by contacting, in a (preliminary) polymerization tank, the above-mentioned catalyst component (A) to (C) all at once or continuously, or at a time or a plurality of times.

Contact of each component is usually carried out in an aliphatic or aromatic hydrocarbon solvent. Contact temperature is not particularly limited, but preferably –20° C. to 150° C. Contact may be carried out in any order suitable for its purpose. Especially preferred order of contact for each component is described below.

In the case where catalyst component (C) is used, the following methods are available.

A method in which, prior to contact of catalyst component (A) with catalyst component (B), catalyst component (A), catalyst component (B) or both of catalyst components (A) and (B) is contacted with catalyst component (C)

A method in which both of catalyst components (A) and (B) are contacted with catalyst component (C) at the same time when catalyst component (A) is contacted with catalyst component (B)

A method in which both of catalyst components (A) and (B) are contacted with catalyst component (C) after catalyst component (A) is contacted with catalyst component (B)

After the contact, the mixture of catalyst components can be washed with an aliphatic or aromatic hydrocarbon solvent.

The amounts of catalyst components (A), (B) and (C) may be arbitrarily determined. For example, the amount of catalyst component (A) relative to catalyst component (B) is preferably 0.1 to 1,000 μmol, particularly preferably 0.5 to 500 μmol per g of catalyst component (B). The amount of catalyst component (C) relative to catalyst component (A) in terms of the molar ratio of the transition metals is preferably 0.01 to $5 \times 10^6$, particularly preferably 0.1 to $1 \times 10^4$.

The amount ratio between the above-mentioned Component [A-1] (a compound represented by general formula (a1)) and Component [A-2] (a compound represented by general formula (a2)) may be arbitrarily determined, as long as the above-mentioned properties of the propylene-based polymer are achieved. For example, the amount of [A-1] based on the total amount of [A-1] and [A-2] in terms of the molar ratio of the transition metals is preferably 0.30 or more and 0.99 or less.

The balance between the melt properties and catalytic activity can be adjusted by changing this ratio. Component [A-1] is used for producing low molecular weight macromer with terminal vinyl group and Component [A-2] is used for producing high molecular weight product with partial copolymerization of the macromer. Therefore, by changing the ratio of Component [A-1], the average molecular weight, molecular weight distribution, bias of the molecular weight distribution to high molecular weight side and state of branching (amount, length and distribution) of the resultant polymer can be controlled. This enables control of the melt properties, such as rate of strain hardening, melt tension and melt extensibility.

In order to produce the propylene-based polymer with high rate of strain hardening, this ratio must be 0.30 or more. This ratio is preferably 0.40 or more, more preferably 0.50 or more. The upper limit of this ratio is 0.99 or less. In order to effectively obtain polypropylene resin (X) with high catalytic activity this ratio is preferably 0.95 or less, more preferably 0.90 or less.

Further, by the use of Component [A-1] in an amount within the above-mentioned range, the balance of the molecular weight and catalytic activity against the amount of hydrogen can be adjusted.

The catalyst used in the present invention is subjected to preliminary polymerization treatment by contacting the catalyst with an olefin to produce small amount of polymer. By this preliminary polymerization treatment, gel formation during the main polymerization can be prevented. The reason of this improvement is regarded as achievement of uniform distribution of the long chain branches between the polymer particles during the main polymerization. This also improves melt properties.

There is no particular limitation of the olefin used for preliminary polymerization. Examples of the olefins include ethylene, propylene, 1-butene, 1-hexene, 1-octene, 4-methyl-1-pentene, 3-methyl-1-butene, a vinylcycloalkane and styrene. The method for feeding the olefin may be arbitrarily selected. For example, the olefin is fed into the reaction tank at a constant feeding rate and/or a constant pressure, or with stepwise change of feeding rate and/or pressure.

There is no particular limitation of the temperature and time for preliminary polymerization. It is preferred that the temperature and time are −20° C. to 100° C. and 5 minutes to 24 hours, respectively. The amount of preliminary polymerization in terms of the amount of preliminarily polymerized product based on the amount of catalyst component (B) is preferably 0.01 to 100, more preferably 0.1 to 50. Catalyst component (C) may be newly or additionally introduced during preliminary polymerization. The preliminarily polymerization product may be washed after the preliminary polymerization.

During or after the above-mentioned contact of each component, a polymer (such as polyethylene and polypropylene), solid inorganic oxide (such as silica and titania) or the like may be present or contacted.

(5) with Regard to the Use of the Catalyst/Propylene Polymerization

Any manner of polymerization may be employed as long as effective contact of the above-mentioned olefin polymerization catalyst comprising catalyst components (A), (B) and (C) with the monomer(s) is achieved.

Specifically, a slurry method using an inert solvent, a so-called bulk method using propylene as a solvent (with substantially no inert solvent), a solution polymerization method, a vapor phase method with each monomer kept in a gaseous form (with substantially no inert solvent) or the like may be employed. Continuous polymerization or batch polymerization may be applied to these methods. In addition to single-step polymerization, multi-step polymerizations with 2 or more steps may be conducted.

In the slurry method, as a polymerization solvent, a saturated aliphatic hydrocarbon and/or aromatic hydrocarbon, such as hexane, heptane, cyclohexane, benzene or toluene, may be use individually or in combination.

The polymerization temperature is 0° C. or higher and 150° C. or lower. Especially in the bulk polymerization, the temperature is preferably 40° C. or higher, more preferably 50° C. or higher. The upper limit of the temperature is preferably 80° C. or lower, more preferably 75° C. or lower.

In the vapor phase polymerization, the temperature is preferably 40° C. or higher, more preferably 50° C. or higher. The upper limit of the temperature is preferably 100° C. or lower, more preferably 90° C. or lower.

The polymerization pressure is 1.0 MPa or higher and 5.0 MPa or lower. Especially in the bulk polymerization, the pressure is preferably 1.5 MPa or higher, more preferably 2.0 MPa or higher. The upper limit of the pressure is preferably 4.0 MPa or lower, more preferably 3.5 MPa or lower.

In the vapor phase polymerization, the pressure is preferably 1.5 MPa or higher, more preferably 1.7 MPa or higher. The upper limit of the pressure is preferably 2.5 MPa or lower, more preferably 2.3 MPa or lower.

Further, hydrogen may be auxiliarilly used as a modifier and for activity improving effect in an amount of $1.0 \times 10^{-6}$ or more and $1.0 \times 10^{-2}$ or less in terms of molar ratio based on the amount of propylene.

By changing the amount of hydrogen, it becomes possible to control not only the resultant polymer but also the molecular weight distribution, bias of the molecular weight distribution to high molecular weight side, content of extremely high molecular weight components and state of branching (amount, length and distribution) of the resultant polymer. This enables control of the properties characterizing the polypropylene having a structure with long chain branches, such as MFR, rate of strain hardening, melt tension (MT) and melt extensibility.

For this reason, the amount of hydrogen in terms of molar ratio based on the amount of propylene is preferably $1.0 \times 10^{-6}$ or more, more preferably $1.0 \times 10^{-5}$ or more, still more preferably $1.0 \times 10^{-4}$ or more. The upper limit of the amount of hydrogen is preferably $1.0 \times 10^{-2}$ or less, more preferably $0.9 \times 10^{-2}$ or less, still more preferably $0.8 \times 10^{-2}$ or less.

Copolymerization using, in addition to propylene monomer, a $C_2$-$C_{20}$ α-olefin comonomer except for propylene (such as ethylene and/or 1-butene) as a comonomer may be conducted, depending on the intended use of the polymer.

In order to achieve the melt properties of polypropylene resin (X) used in the present invention having a structure with long chain branches well balanced with the catalytic activity, ethylene and/or 1-butene is used in an amount of preferably 15 mol % or less, more preferably 10.0 mol % or less, still more preferably 7.0 mol % or less, based on the amount of propylene.

When propylene is polymerized using the above-mentioned catalyst and method for polymerization, by the effect of the active species derived from component [A-1], one of the two terminals of the resultant polymer mainly has a structure with a propenyl group formed by a special kind of chain transfer reaction (generally referred to as β-methyl elimination) so that a so-called macromer is produced. This macromer is regarded as being taken into the active species derived from component [A-2] which gives a product with higher molecular weight (i.e., has higher activity of copolymerization) so that the macromer copolymerization proceeds. Therefore, the structure of the resultant polypropylene resin having a structure with long chain branches is regarded as mainly a comb-like structure.

8. Other Properties of Polypropylene Resin (X) Having a Structure with Long Chain Branches As one of other additional properties of polypropylene resin (X) having a structure with long chain branches which is used in the present invention and produced by the above-mentioned method, there can be mentioned a rate of strain hardening at a strain rate of 0.1 s$^{-1}$ ($\lambda_{max}(0.1)$) of 6.0 or more.

The rate of strain is an index of strength of a resin in a molten state. Increase of this value is effective for improving melt tension. As a result, the closed pore rate after expansion molding becomes high. When this rate of strain is 6.0 or more, high closed pore rate can be maintained. The rate of strain is preferably 8.0 or more.

Details of method for calculating $\lambda_{max}$ (0.1) is given below.

Method for calculating $\lambda_{max}$ (0.1)

Elongational viscosity measured under conditions including the temperature of 180° C. and strain rate of 0.1 s$^{-1}$ is plotted against time on a double logarithmic chart (horizontal axis: time t (sec), vertical axis: elongational viscosity $\eta_E$ (Pa·sec)) and, in the resultant double logarithmic graph, the elongational viscosity within some range of time immediately before the occurrence of strain hardening is approximated by a straight line.

Specifically, the measured values of elongational viscosity are plotted against time, and the slope of each point of time is obtained. In this process, considering the fact that the measured data of elongational viscosity are discrete, one of various kinds of averaging methods (for example, a method in which the slope between each combination of adjacent data points is obtained and, with respect to each data point, the moving average of the obtained slopes of a few data points around the data point in question is obtained) is used.

In the range of low amount of strain, elongational viscosity is expressed as a monotone increasing function at first, then becomes gradually close to a certain fixed value and, if strain hardening does not occur, becomes equal to the Trouton viscosity after satisfactorily long time. On the other hand, if strain hardening occurs, elongational viscosity begins to increase over time generally from the point of time in which the amount of strain (rate of strain×time) is approximately 1. That is, the above-mentioned slope tends to decrease over time in range of low amount of strain, but tends to increase from the point of time in which the amount of strain is approximately 1. Therefore, there is an inflexion point in the curve formed by plotting elongational viscosity against time. Considering this fact, within the range of this curve in which the amount of strain is approximately from 0.1 to 2.5, the point with the lowest slope among the slopes obtained by the above-mentioned manner is determined, and a line tangent to this curve is drawn through this point. Then, an appropriate point of time in which the amount of strain is 4.0 is extrapolated to this tangent line. $\eta_{max}$, the maximum value of elongational viscosity $\eta_E$ on this curve within the range of time by the point of time in which the amount of strain is 4.0, is determined. Further, another value of elongational viscosity, $\eta_{lin}$, the point on the tangent line corresponding to the point of time in which the amount of strain is 4.0, is determined. The value $\lambda_{max}$ (0.1) is defined as $\lambda_{max}/\eta_{lin}$.

As mentioned above, it is preferred that polypropylene resin (X) used in the present invention having a structure with long chain branches has high stereoregularity which makes possible to produce a molded article with high stiffness.

Polypropylene resin (X) may be a homopolypropylene or, as long as the above-mentioned various properties are achieved, a propylene-α-olefin random copolymer with a small amount of comonomer such as ethylene, 1-butene and 1-hexene. When polypropylene resin (X) is a homopolypropylene, the crystallinity and melting point are high. When polypropylene resin (X) is a propylene-α-olefin random copolymer, it is preferred that the melting point is high.

More specifically, the melting point measured by differential scanning calorimetry (DSC) is preferably 145° C. or higher, more preferably 150° C. or higher. The melting point of 145° C. or higher is preferred in view of heat resistance of the final product. The upper limit of the melting point of polypropylene resin (X) is usually 170° C. or lower.

The melting point is the peak-top temperature of the observed endothermic peak by DSC by the method in which the sample is first heated to 200° C. to erase thermal history, cooled to 40° C. at the temperature lowering rate of 10° C./minute and heated again at the temperature elevating rate of 10° C./minute.

II. Propylene-Based Block Copolymer (Y)

As component (Y) blended with the above-mentioned polypropylene resin (X) used in the present invention having a structure with long chain branches, a propylene-based block copolymer (Y) comprising (Y-1) a propylene (co) polymer and (Y-2) a propylene-ethylene copolymer, which is produced by a conventionally known method, is used.

The term "block copolymer" is a vernacular name idiomatically used for referring to a propylene-based resin composition obtained by multiple-step polymerization in a sequential manner. Therefore, this "block copolymer" is different from a polymer what is called a (real) block copolymer or graft copolymer in which the components of products of each of the polymerization steps are chemically bonded to each other. In this "block copolymer", the components of products of each of the polymerization steps are not chemically bonded to each other. Therefore, generally, these components can be separated from each other taking advantage of the difference in crystallinity, molecular weight, solubility or the like between these components by crystallinity-based fractionation, molecular weight-based fractionation, solubility-based fractionation or the like.

In propylene-based block copolymer (Y) obtained by conventionally known sequential polymerization, presence of a structure with long chain branches (as found in the above-mentioned polypropylene resin (X)) cannot be observed, even at the maximum sensitivity with analytical significance.

1. Method and Catalyst for Producing Propylene-Based Block Copolymer (Y)

Any catalyst may be used for producing propylene-based block copolymer (Y). However, in view of satisfaction of properties (Y-i) to (Y-v) and production of propylene-ethylene copolymer (Y-2) as a component of block copolymer (Y), it is preferred to use a Ziegler-Natta catalyst. When a Ziegler-Natta catalyst is used, there is no particular limitation of specific method for producing the catalyst. Examples of such methods include the method for producing the catalyst disclosed in JP-A-2007-254671.

More specifically, as an example of typical Ziegler-Natta catalyst used for producing propylene-based block copolymer (Y) for the present invention, there can be mentioned a catalyst comprising the following components.

(ZN-1) a solid component containing titanium, magnesium and a halogen as essential components
(ZN-2) an organoaluminum compound
(ZN-3) an electron donor (1) A Solid Component (ZN-1)

In the present invention, as solid component (ZN-1), titanium (ZN-1a), magnesium (ZN-1b) and a halogen (ZN-1c) are contained as essential components, and electron donor (ZN-1d) may be used as an optional component. Here, "be contained as essential components" means that optional components, other than the exemplified three components, may be contained in arbitrary forms within a range not to impair the effects of the present invention. The solid component is explained below in detail.

(ZN-1a) Titanium

As a titanium source, any titanium compound can be used. As a typical example thereof, there can be mentioned a compound disclosed in JP-A-3-234707. As for valence of titanium, a titanium compound having arbitrary valence of tetra-, tri-, di- or zero-valence may be used, however, it is desirable that a titanium compound having preferably tetra- and tri-valence, more preferably a titanium compound having tetra-valence is used.

(ZN-1b) Magnesium

As a magnesium source, any magnesium compound may be used. As a typical example thereof, there can be mentioned a compound disclosed in JP-A-3-234707. In general, magnesium chloride, diethoxy magnesium, metal magnesium or butyl magnesium chloride is frequently used.

(ZN-1c) A Halogen

As the halogen, fluorine, chlorine, bromine, iodine and a mixture thereof may be used. Among them, chlorine is particularly preferable.

(ZN-1d) An Electron Donor

The solid component (ZN-1) may contain the electron donor as an optional component. As a typical example of the electron donor (ZN-1d), there can be mentioned a compound disclosed in JP-A-2004-124090. In general, it is desirable to use an organic acid or an inorganic acid, and their derivative (ester, acid anhydride, acid halide, or amide) compounds thereof, ether compounds, ketone compounds, aldehyde compounds, alcohol compounds, amine compounds or the like.

Among these, preferred are phthalic acid esters, such as dibutyl phthalate, dibutyl phthalate, disiobutyl phthalate and diheptyl phthalate; phthalic halides, such as phthalic dichloride; malonic acid esters having one or two substituents at the 2-position, such as diethyl 2-n-butylmalonate, succinic acid esters having one or two substituents at the 2-position or one or more substituents at each of the 2- and 3-positions, such as diethyl 2-n-butylsuccinate; aliphatic polyvalent ether compounds as represented by 1,3-dimethoxy propane having one or two substituents at the 2-position, such as 2-isopropyl-2-isobutyl-1,3-dimethoxypropane, or 2-isopropyl-2-isopentyl-1,3-dimethoxypropane; and polyvalent ether compounds having an aromatic substituent in a molecule as represented by 9,9-bis(methoxymethyl)fluorene.

(2) an Organoaluminum Compound (ZN-2)

As an organoaluminum compound (ZN-2), there can be mentioned a compound disclosed in JP-A-2004-124090. In general, it is preferred to use a compound represented by the following general formula (5):)

(in the general formula (5), $R^9$ represents a hydrocarbon group;

X represents a halogen or hydrogen;

$R^{10}$ represents a hydrocarbon group or a cross-linking group bridged by Al; provided that $c \geq 1$, $0 \leq d \leq 2$, $0 \leq e \leq 2$ and $c+d+e=3$).

Specific examples of compound (ZN-2) include trimethylaluminum, triethylaluminum, triisobutylaluminum, trioctylaluminum, diethylalminum chloride, ethylalminum chloride, diethylalminum ethoxide and methylalumoxane.

(ZN-3) Electron Donor

As electron donor (ZN-3), there can be mentioned (ZN-3a) organosilicon compound having an alkoxy group and (ZN-3b) compound having at least 2 ether bonds.

(ZN-3a) Organosilicon Compound Having an Alkoxy Group

As organosilicon compound (ZN-3a) having an alkoxy group (a component of the Ziegler-Natta catalyst suitable for producing propylene-based block copolymer (Y)), for example, the compounds disclosed in JP-A-2004-124090 may be used. In general, it is preferred to use the compound represented by the following general formula (3):

(in the general formula (3), $R^3$ represents a hydrocarbon group or a hetero atom-containing hydrocarbon group; $R^4$ represents an arbitrary substituent selected from the group consisting of hydrogen, a halogen, a hydrocarbon group and a hetero atom-containing hydrocarbon group; $R^5$ represents a hydrocarbon group; provided that $0 \leq a \leq 2$, $1 \leq b \leq 3$ and $a+b=3$).

Specific examples of compound (ZN-3a) include t-Bu(Me)Si(OMe)$_2$, t-Bu(Me)Si(OEt)$_2$, t-Bu(Et)Si(OMe)$_2$, t-Bu(n-Pr)Si(OMe)$_2$, c-Hex(Me)Si(OMe)$_2$, c-Hex(Et)Si(OMe)$_2$, c-Pen$_2$Si(OMe)$_2$, i-Pr$_2$Si(OMe)$_2$, i-Bu$_2$Si(OMe)$_2$, i-Pr(i-Bu)Si(OMe)$_2$, n-Pr(Me)Si(OMe)$_2$, t-BuSi(OEt)$_3$, (Et$_2$N)$_2$Si(OMe)$_2$, Et$_2$N—Si(OEt)$_3$ and the like.

(ZN-3b) Compound Having at Least 2 Ether Bonds

As compound (ZN-3b) having at least 2 ether bonds, for example, the compounds disclosed in JP-A-3-294302 and JP-A-8-333413 may be used. In general, it is preferred to use the compound represented by the following general formula (4):

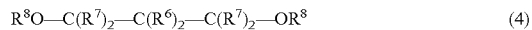

(In the general formula (4), $R^6$ and $R^7$ represent any substituent selected from hydrogen, a hydrocarbon group and a hetero atom-containing hydrocarbon group. $R^8$ represents a hydrocarbon group or a hetero atom-containing hydrocarbon group).

Specific examples of compound (ZN-3b) include 2,2-diisopropyl-1,3-dimethoxypropane, 2,2-diisobutyl-1,3-dimethoxypropane, 2-isobutyl-2-isopropyl-1,3-dimethoxypropane, 2-isopropyl-2-isopentyl-1,3-dimethoxypropane, 2,2-dicyclopentyl-1,3-dimethoxypropane, 9,9-bis(methoxymethyl)fluorene and the like.

<Preliminary Polymerization>

The catalyst exemplified above may be subjected to preliminary polymerization treatment prior to use in the main polymerization. By forming small amount of polymer around the catalyst in advance prior to the polymerization process, the catalyst becomes more uniform and the amount of fine can be reduced.

As examples of monomers for the preliminary polymerization, there can be mentioned the compounds mentioned in JP-A-2004-124090. More specifically, examples of especially preferred monomers include ethylene, propylene, 3-methylbutene-1,4-methylpentene-1, styrene and divinylbenzenes.

There is no particular limitation of conditions for the reaction using the above-mentioned catalyst and monomer. Usually, it is preferred that the conditions are within the range described below.

The amount of preliminary polymerization in terms of the amount of preliminarily polymerized product per 1 g of solid component (ZN-1) is 0.001 to 100 g, preferably 0.1 to 50 g, more preferably 0.5 to 10 g. The temperature for the preliminary polymerization is −150 to 150° C., preferably 0 to 100° C. It is preferred that the reaction temperature for the preliminary polymerization is lower than that for the main polymerization. It is preferred that the reaction is effected under stirring. During the reaction, an inert solvent (such as hexane and heptane) may be present.

(5) Sequential Polymerization

Next, the method for producing propylene-based block copolymer (Y) used in the present invention is described in detail.

Propylene-based block copolymer (Y) used in the present invention is a propylene-ethylene copolymer comprising propylene (co)polymer (Y-1) and propylene-ethylene copolymer (Y-2). Therefore, in order to produce propylene-based block copolymer (Y), it is necessary to produce 2 polymer components, propylene (co)polymer (Y-1) and propylene-ethylene copolymer (Y-2). In view of the fact that original performance of produce propylene-based block copolymer (Y) should be achieved by finely dispersing propylene-ethylene copolymer (Y-2) (having relatively high molecular weight and low viscosity and MFR) in propylene (co)polymer (Y-1), these 2 components must be produced by sequential polymerization.

Specifically, it is preferred that propylene (co)polymer (Y-1) is polymerized in the 1st step and propylene-ethylene copolymer (Y-2) is polymerized in the 2nd step. The order of productions of these polymers may be reversed. However, the crystallinity of propylene-ethylene copolymer (Y-2) is low since, because of property (Y-iv), the ethylene content of propylene-ethylene copolymer (Y-2) is 11.0 or more and less than 60.0% by weight. For this reason, it is highly possible that production of propylene-ethylene copolymer (Y-2) in the 1st step causes some trouble during the production, such as adhesion to the inner portion of the polymerization tank and clogging of a transfer pipe, and this manner of production is not so preferable.

Any of batch process and continuous process may be employed for the sequential polymerization. However, in view of productivity, use of the continuous process is preferred.

In the batch process, propylene (co)polymer (Y-1) and propylene-ethylene copolymer (Y-2) can be separately produced using only 1 polymerizer by changing the polymerization conditions with time. A plurality of polymerizers connected in parallel to each other may be used, as long as the effect of the present invention is not damaged.

In the continuous process, use of 2 or more polymerizers connected in series to each other is necessary, since propylene (co)polymer (Y-1) and propylene-ethylene copolymer (Y-2) must be separately produced. Although the polymerizer corresponding to the 1st step for producing propylene (co)polymer (Y-1) and another polymerizer corresponding to the 2nd step for producing propylene-ethylene copolymer (Y-2) must be connected in series to each other, a series of polymerizers used in the 1st or 2nd step can be connected in series and/or in parallel to each other.

(6) Polymerization Process

Any polymerization process may be used.

With respect to the reaction phase, the process may use a liquid medium or gaseous medium. As specific examples of polymerization processes, there can be mentioned a slurry process, bulk process and vapor phase process. Supercritical conditions as intermediate conditions between bulk process conditions and vapor phase process conditions can be used. Since the process using these conditions is relevant to the vapor phase process, these processes are not distinguished from each other and the former is regarded as being included in the latter. In the multi-tank continuous polymerization process, a polymerizer for the vapor phase process may be provided after a polymerizer for the bulk process. Such a process is referred to as a bulk process in accordance with the customary practice in this field. In the batch process, it is possible that the 1st step is conducted by the bulk process and the 2nd step is conducted by the vapor phase process. Such a batch process is also referred to as a bulk process.

As apparent from the above, there is no particular limitation of the reaction phase. However, since there is a problem in the slurry process in that production cost becomes high because of the use of many annexed equipments caused by the use of an organic solvent (such as hexane and heptane), use of the bulk process conditions or vapor phase process is more preferred.

Various processes (which are different in agitation (mixing) method and/or heat removing method) are proposed for each of the bulk process conditions and vapor phase process. There is no particular limitation of the process from this viewpoint.

(7) General Conditions for Polymerization

Generally used range of the polymerization temperature may be used as the polymerization temperature with no particular difficulty. More specifically, the polymerization temperature may be within the range of 0 to 200° C., preferably 40 to 100° C.

The polymerization pressure may be different depending on the selected polymerization process. However, generally used range of the polymerization pressure may be used as the polymerization pressure with no particular difficulty.

More specifically, the polymerization temperature may be within the range of more than 0 to 200 MPa, preferably 001 to 50 MPa. An inert gas (such as nitrogen) may be present with no difficulty.

In the 2nd step for producing propylene-ethylene copolymer (Y-2), a polymerization inhibitor (such as ethanol and oxygen) may be added. Use of such a polymerization inhibitor may make it easy to control the amount of the polymerization product of the 2nd step and improve the properties of the polymer particles.

(Y-1) produced in the former step of the sequential polymerization is a propylene homopolymer or a propylene random copolymer having copolymerized therein a small amount of a comonomer not beyond the gist of the present invention. Usually, an α-olefin having 10 or less (excluding 3) carbon atoms, such as ethylene, butene and hexene, is used as the comonomer.

There is no particular limitation of the content of the above-mentioned comonomer. The content is preferably 10 wt. % or less, more preferably 3 wt. % or less, especially preferably 1 wt. % or less. The content of the comonomer is usually controlled by appropriately adjusting the amount ratio between the monomers (for example, the ratio of the amount of ethylene to that of propylene) to be fed into the polymerization tank. The amount ratio between the monomers to be fed may be adjusted based on the copolymerization properties of the catalyst to be used, the properties obtained by preliminary study, so that the composition of the gas in the polymerization tank corresponds to the desired content of the comonomer.

2. Properties of Propylene-Based Block Copolymer (Y)

As a result of a lot of experimental study, the present inventors found that formation of the specific structure by polypropylene resin (X) having a structure with long chain branches under shear flow could be prevented when propylene-based block copolymer (Y) blended with polypropylene resin (X) had properties (Y-i) to (Y-v) described below. Hereinbelow, detailed description of these properties will be made.

2-1. Property (Y-i): Ratios of the Amounts of (Y-1) and (Y-2)

In the present invention, the ratio of the amount of (Y-1) is 55 to 99 wt. %, preferably 55 to 97 wt. %, more preferably 60 to 95 wt. %, and accordingly, the ratio of the amount of (Y-2) is 1 to 50 wt. %, preferably 3 to 45 wt. %, more preferably 5 to 40 wt. % (with the proviso that each ratio is calculated based on the total weight of propylene-based block copolymer (Y) regarded as 100% by weight).

By blending propylene-based block copolymer (Y) with polypropylene resin (X) having a structure with long chain branches, good extensibility is imparted to the resultant composition. Further, this blending gives various advantages over the single use of component (X), such as wider temperature ranges applicable to various molding methods, improved appearance of the product and improved physical properties (such as impact properties) of the product. When the amount of component (Y-2) is smaller than the above-mentioned range, it becomes difficult to obtain these advantages. On the other hand, when the amount of component (Y-2) is larger than the above-mentioned range, the heat resistance and stiffness of the resultant composition are damaged because of too small amount of crystalline component (Y-1).

The ratios of the weight amounts of propylene (co)polymer (Y-1) and propylene-ethylene copolymer (Y-2) are controlled by the production amount of the 1st step for producing propylene (co)polymer (Y-1) and the production amount of the 2nd step for producing propylene-ethylene copolymer (Y-2). For example, in order to increase the amount of propylene (co)polymer (Y-1) (decrease the amount of propylene-ethylene copolymer (Y-2)), the production amount of the 2nd step is decreased while remaining the production amount of the 1st step. This can be achieved by decreasing the residence time and/or lowering the polymerization temperature for the 2nd step. Substantially the same control can be achieved also by adding a polymerization inhibitor (such as ethanol and oxygen) or, this inhibitor has already been added, increasing the amount of this inhibitor. Also the opposite control can be achieved by the opposite method.

2-2. Property (Y-ii): MFR

The MFR of propylene-based block copolymer (Y) used in the present invention is in the range of from 0.1 to 200.0 g/10 minutes, preferably 0.2 to 190 g/10 minutes, more preferably 0.5 to 180 g/10 minutes, especially preferably 2.1 to 170 g/10 minutes.

This range of MFR is regularly used as that for a resin to be subjected to various moldings. When the MFR is lower than this range, the load to the extruder becomes problem and instability in flow of resin occurs. On the other hand, when the MFR is higher than this range, neck-in during extrusion becomes too large and withdrawing of the extruded sheet becomes difficult.

The method for measuring the MFR is the same as that for the MFR of the above-mentioned polypropylene resin (X).

Next, explanation is made with respect to the method for controlling the MFR of propylene-based block copolymer (Y). The relationship among MFR(Y) (MFR of propylene-based block copolymer (Y)), MFR(Y-1) (MFR of propylene (co)polymer (Y-1)) and MFR(Y-2) (MFR of propylene-ethylene copolymer (Y-2)) is represented by the following formula:

$$\log_e[MFR(Y)] = W(Y\text{-}1) \times \log_e[MFR(Y\text{-}1)] + W(Y\text{-}2) \times \log_e[MFR(Y\text{-}2)]$$

(wherein $\log_e$ is a logarithm to the base e;

W(Y-1) is the weight ratio of propylene (co)polymer (Y-1); and

W(Y-2) is the weight ratio of propylene-ethylene copolymer (Y-2), with the proviso that W(Y-1)+W(Y-2)=1).

This formula is an empirical formula showing the additivity rule of logarithms of viscosities which is used on a daily basis in this field. The weight ratio of propylene (co)polymer (Y-1), the weight ratio of propylene-ethylene copolymer (Y-2), MFR(Y), MFR(Y-1) and MFR(Y-2) are not independent to each other. Therefore, control of MFR(Y) can be achieved by control of the 3 factors, the weight ratio of propylene-ethylene copolymer (Y-2), MFR(Y-1) and MFR(Y-2). For example, increase of MFR(Y) can be achieved by increasing MFR(Y-1) or increasing MFR(Y-2). Further, it may be easily understood that when MFR(Y-2) is lower than MFR(Y-1), increase of MFR(Y) can be achieved by increasing W(Y-1) (decreasing W(Y-2)). Also the opposite control can be achieved by the opposite method.

Next, mention is made as to which method is preferred. Because of property (Y-v) described later, MFR(Y-2) must be controlled, to some extent, to a small value. For this reason, in order to control MFR(Y), it is preferred to control MFR(Y-1) or the weight ratio between (Y-1) and (Y-2). Further, in view of the above-mentioned property (Y-i) related to the weight ratio between (Y-1) and (Y-2), it is most preferred to control MFR(Y-1).

As the most convenient method to control MFR(Y-1) or MFR(Y-2), there can be mentioned a method in which hydrogen is used as a chain transfer agent. Specifically, high concentration of hydrogen as a chain transfer agent gives high MFR(Y-1) of propylene (co)polymer (Y-1). Also the opposite control can be achieved by the opposite method. Increase of the concentration of hydrogen in the polymerization tank can be achieved by increasing the amount of hydrogen fed into the polymerization tank. This amount can be extremely easily adjusted by a person skilled in the art. MFR(Y-2) can be controlled in substantially the same manner.

2-3. Property (Y-iii): Melting Point

The melting point of propylene-based block copolymer (Y) used in the present invention must be more than 155° C., and is preferably 157° C., in view of keeping the heat resistance of the sheet. It is not necessary to set the upper limit of the melting point. Production of copolymer (Y) having a melting point higher than 170° C. is virtually impossible.

This melting point is measured as follows by DSC. The sample is first heated to 200° C. to erase thermal history, cooled to 40° C. at the temperature lowering rate of 10° C./minute and heated again at the temperature elevating rate of 10° C./minute. The melting point is the peak-top temperature of the observed endothermic peak.

The melting point of propylene-based block copolymer (Y) mainly depends on the melting point of propylene (co)polymer (Y-1). Therefore, it is preferred that the melting point of propylene-based block copolymer (Y) is controlled by controlling the melting point of propylene (co)polymer (Y-1). The melting point of propylene-based block copolymer (Y) depends on the MFR(Y-1) and comonomer content of propylene (co)polymer (Y-1). High MFR(Y-1) gives low melting point of (Y-1), and high comonomer content also gives low melting point of (Y-1). It is obvious to a person skilled in the art that the MFR(Y-1) and/or comonomer content is adjusted based on the relationship between the melting point and the MFR(Y-1) and/or comonomer content obtained by preliminary study, so that the melting point is the desired value.

2-4. Property (Y-iv): Ethylene Content of Propylene-Ethylene Copolymer (Y-2)

In the present invention, the ethylene content of propylene-ethylene copolymer (Y-2) must be 11.0 by weight or more and less than 60.0% by weight, with the proviso that the ethylene content is calculated based on the total weight of monomers constructing component (Y-2) regarded as 100% by weight. The lower limit of the ethylene content is preferably 16% by weight or more, more preferably 18% by weight or more. On the other hand, the upper limit of the ethylene content is preferably 55% by weight or less, more preferably 50% by weight or less, most preferably 38% by weight or less.

The ethylene content of propylene-ethylene copolymer (Y-2) is usually controlled by appropriately adjusting the ratio of the amount of ethylene to be fed into the polymerization tank to that of propylene. The amount ratio between the monomers to be fed may be adjusted based on the copolymerization properties of the catalyst to be used, the properties obtained by preliminary study, so that the composition of the gas in the polymerization tank corresponds to the desired content of the comonomer.

Use of component (Y-2) having the ethylene content within the above-mentioned range exhibits an effect for preventing the formation of the specific structure by polypropylene resin (X) having a structure with long chain branches under shear flow. When the ethylene content falls outside of the above-mentioned range, this effect becomes low. The reason will be described later.

2-5. Property (Y-v): Intrinsic Viscosity [η] of Propylene-Ethylene Copolymer (Y-2)

As a result of a lot of experimental study, the present inventors found that in propylene-ethylene copolymer (Y-2) constructing propylene-based block copolymer (Y) blended with polypropylene resin (X), the intrinsic viscosity [η] must have satisfied some specific requirements.

Specifically, if the ethylene content of propylene-ethylene copolymer (Y-2) is 11.0 to 38.0% by weight, the intrinsic viscosity [η] (unit: dl/g) of propylene-ethylene copolymer (Y-2) measured at 135° C. in decalin is 5.3 or more, preferably 6.0 or more, more preferably 7.0 or more, most preferably 7.5 or more. If the ethylene content of propylene-ethylene copolymer (Y-2) is more than 38.0% and less than 60.0% by weight, the intrinsic viscosity [η] (unit: dl/g) of propylene-ethylene copolymer (Y-2) measured at 135° C. in decalin is 7.3 or more, preferably 7.5 or more, Use of component (Y-2) having the intrinsic viscosity which is equals to or more than the above-mentioned value exhibits an effect for preventing the formation of the specific structure by polypropylene resin (X) having a structure with long chain branches under shear flow. When the intrinsic viscosity is less than the above-mentioned range, this effect becomes low. The reason will be described later.

It is not necessary to set the upper limit of the intrinsic viscosity. However, too high intrinsic viscosity causes gel formation. Therefore, the intrinsic viscosity is preferably 25.0 dl/g or less, more preferably 20.0 dl/g or less, still more preferably 18.0 dl/g or less, most preferably 16.0 dl/g or less.

This intrinsic viscosity is measured by an Ubbelohde capillary viscosimeter at 135° C. using decalin as a solvent. In order to measure the intrinsic viscosity of component (Y-2), component (Y-2) is collected as the p-xylene soluble components at 25° C. by substantially the same method as described above in the item of CXS and the collected component (Y-2) is subjected to measurement of the intrinsic viscosity. However, when the ethylene content of component (Y-2) is less than 15% by weight, it becomes difficult to fully separate component (Y-2) by the method of the item of CXS. In such a case, the intrinsic viscosity of component (Y-2) is measured by the method comprising: measuring the intrinsic viscosity of component (Y-1) taken in a small amount during the sequential polymerization; measuring the intrinsic viscosity of component (Y) as a whole after the sequential polymerization; and calculating the intrinsic viscosity of component (Y-2) by the following formula.

Intrinsic viscosity of component (Y-2)=[Intrinsic viscosity of component (Y) as a whole−{Intrinsic viscosity of component (Y-1)×(Weight ratio of component (Y-1)/100)}]/(Weight ratio of component (Y-2)/100)

Since an intrinsic viscosity [η] depends on a molecular weight, as the most convenient method to control the intrinsic viscosity, there can be mentioned a method in which hydrogen is used as a chain transfer agent, as in the control of MFR. Specifically, high concentration of hydrogen as a chain transfer agent gives low intrinsic viscosity of propylene (co)polymer (Y-2). Also the opposite control can be achieved by the opposite method. Increase of the concentration of hydrogen in the polymerization tank can be achieved by increasing the amount of hydrogen fed into the polymerization tank. This amount can be extremely easily adjusted by a person skilled in the art.

The present inventors have made extensive and intensive studies of the properties of propylene-based block copolymer (Y) (especially component (Y-2)) to be combined with polypropylene resin (X) having a structure with long chain branches for obtaining a resin composition suitable for expansion molding. As a result, it has been found from experimental results that only block copolymer (Y) satisfying the relationships (Y-iv) and (Y-v) specifically exhibits excellent performance.

With respect to the reason why block copolymer (Y) satisfying the relationship (Y-v) exhibits excellent performance, the following discussion is made by the present inventors.

Propylene-based block copolymer (Y) used in the present invention prevents the formation of the specific structure by polypropylene resin (X) having a structure with long chain branches under shear flow. This specific structure is a structure what is called shish-kebab structure (or its precursor). Therefore, it is thought to be preferred that block copolymer (Y) is a component with low crystallinity and, in order to prevent the growth of the specific structure, with low mobility, i.e., high molecular weight. When the ethylene content is lower than the above-mentioned range, component (Y-2) itself has low crystallinity, and it becomes impossible to prevent the formation of the shish-kebab structure. When the intrinsic viscosity is lower than the above-mentioned range, it becomes impossible to prevent the formation of the shish-kebab structure. For this reason, each of the ethylene content and intrinsic viscosity of component (Y-2) has the lower limit value. On the other hand, when the ethylene content of component (Y-2) is too high, component (Y-2) and component (Y-1) disadvantageously form a sea-island phase separated structure in which these components are separately present as completely different phases. These components forming such a structure have no effect on the formation of the shish-kebab structure. That is, in view of the fact that the compatibility of component (Y-2) with a crystalline polypropylene component must be kept to some extent, the ethylene content of component (Y-2) has the upper limit value.

From the viewpoint of entanglement of polymer molecules, apart from the viewpoint of thermodynamic compatibility, higher molecular weight is preferred. Especially, it is conventionally well known to a person skilled in the art that mechanical properties of a propylene-based block copolymer are improved when a molecular weight of a propylene-ethylene random copolymer component of the block copolymer is increased (see, for example, JP-A-2003-327642). As reason of this phenomenon, it is thought that entanglement of molecules occurring between 2 different phases in the block copolymer which are separated from each other, a phase mainly composed of crystalline polypropylene and another phase mainly composed of ethylene-propylene copolymer, contributes to this improvement of mechanical properties. The higher the molecular weight of the ethylene-propylene copolymer component, the higher the interaction between the crystalline polypropylene component and the ethylene-propylene copolymer component.

This is the reason why the above-mentioned property (Y-v) is prescribed. This property means that although high ethylene content is disadvantageous from the viewpoint of thermodynamic compatibility, high molecular weight (i.e., high intrinsic viscosity) gives, even in such a case, increased interaction of components caused by entanglement of molecules which makes it possible to prevent the formation of the shish-kebab structure by component (Y-2).

The ratios of the amounts of (Y-1) and (Y-2) in component (Y) and ethylene content of (Y-2) can be determined by a conventionally known analyzing method using IR, NMR, a combination of a solubility-based fractionation method with IR or the like.

In the present invention, various indexes mainly related to component (Y) are determined by a method using a combination of a cross fractionation method with FT-IR method described below.
(1) Analyzing Devices to be Used
(i) Cross Fractionation Device CFC T-100 manufactured and sold by Dia Instruments Co., Ltd. (hereinbelow simply referred to as CFC)
(ii) Fourier Transform Infrared Spectroscopy:

FT-IR 1760X manufactured and sold by Perkin Elmer, Inc.

A fixed-wavelength type infrared spectrophotometer installed as a detector of CFC is removed and, in place of this spectrophotometer, this FT-IR is connected and used as a detector. A transfer line for a solution eluted from the CFC has a length of 1 m between the outlet of the CFC and the FT-IR and is kept at 140° C. during the measurement. A flow cell attached to the FT-IR has an optical pass length of 1 mm and an optical pass width of 5 mm φ in diameter and is kept at 140° C. during the measurement.
(iii) Gel Permeation Chromatography (GPC)

As the columns for the GPC conducted in the step immediately after the CFC, three GPC columns (AD806MS manufactured and sold by Showa Denko K.K.) connected in series are used.
(3-2) Measurement Conditions of CFC
(i) Solvent: orthodichlorobenzene (ODCB)
(ii) Concentration of sample: 4 mg/mL
(iii) Injected amount: 0.4 mL
(iv) Crystallization: cooling from 140° C. to 40° C. over about 40 minutes
(v) Fractionation method:

The fractionation temperatures for the temperature-rising elution fractionation are set at 40, 100 and 140° C. and a sample is divided into three fractions in total. The amount ratios (unit: % by weight) of the components eluted at 40° C. or less (Fraction 1), the components eluted between 40° C. and 100° C. (Fraction 2) and the components eluted between 100° C. and 140° C. (Fraction 3) are defined as W40, W100 and W140, respectively. W40+W100+W140=100. Each fraction is automatically sent as it is to the FT-IR analyzer.
(vi) Flow rate of a solvent for elution: 1 mL/minute
(3) Measurement Conditions of FT-IR When a sample solution begins to be eluted from GPC at the step immediately after the CFC, FT-IR measurement is conducted under the following conditions for each of the above-mentioned fractions 1 to 3 to obtain GPC-IR data.

Conceptual diagram of CFC-FT-IR is given in FIG. 4.
(i) Detector: MCT
(ii) Resolution: 8 cm$^{-1}$
(iii) Measurement interval: 0.2 minutes (12 seconds)
(iv) Accumulation frequency for one measurement: 15 times
(4) Post-Treatment and Analysis of Measurement Results The amount and molecular weight distribution of the component eluted at each temperature are determined using absorbance at 2,945 cm$^{-1}$ obtained by FT-IR as a chromatogram. The amounts of eluted components are normalized so that the total amount of the eluted components becomes 100%.

The retention volume is converted to the molecular weight using a calibration curve prepared in advance using standard polystyrenes (PS). Specific method for this conversion is the same as that described above.

The distribution of ethylene content in each eluted component (the distribution of ethylene content along the axis of molecular weight) is determined by converting the ratio of absorbance at 2,956 cm$^{-1}$ and absorbance at 2927 cm$^{-1}$ obtained by GPC-IR to ethylene content (% by weight) using a calibration curve prepared in advance. The calibration curve is prepared using polyethylene, polypropylene, an ethylene-propylene rubber (EPR) (in which the ethylene content is known by $^{13}$C-NMR measurement and the like) and a mixture of these polymers.
(5) Content of Propylene-Ethylene Copolymer In the present invention, the content of propylene-ethylene copolymer (Y-2) (hereinbelow referred to as "EP") in propylene-based block copolymer (Y) is defined by the following formula (I) and obtained by the method described below.

$$\text{EP content (\% by weight)} = W40 \times A40/B40 + W100 \times A100/B100 + W140 \times A140/B140 \quad (I)$$

In formula (I), each of W40, W100 and W140 is a ratio (unit: % by weight) of amount of the eluted components in each of the above-mentioned fractions; each of A40, A100 and A140 is a measured value of the average ethylene content (unit: % by weight) in the fraction corresponding to each of W40, W100 and W140, respectively; and each of B40, B100 and 8140 is an ethylene content (unit: % by weight) in the EP contained in each fraction.

Method for measuring A40, A100, A140, B40, B100 and B140 is described later.

Formula (I) has the following meaning. The first term on the right side of formula (I) is a term for calculating the amount of EP contained in fraction 1 (a fraction of components soluble at 40° C.). If fraction 1 contains only EP with no PP, W40 itself contributes to the content of EP derived from fraction 1 in the whole block copolymer. However, in addition to components derived from EP, a small amount of components derived from PP (components with extremely low molecular weight and atactic polypropylene) are contained in fraction 1. For this reason, correction of W40 for these additional components is necessary, and the amount of EP-derived components in fraction 1 is obtained by multiplying W40 by A40/B40. For example, when the average ethylene content in fraction 1 (A40) is 30% by weight and the ethylene content in EP contained in fraction 1 (B40) is 40% by weight, $^{30}/_{40}=^{3}/_{4}$ (i.e., 75% by weight) of fraction 1 is derived from EP and the remaining ¼ of fraction 1 is derived from PP. As apparent from the above, an operation of multiplying A40/B40 in the first term on the right side means calculating a contribution of EP from the amount ratio (% by weight) of fraction 1 (W40). Substantially the same matter applies also to the second term and later in the right side of formula (I). The total EP content can be obtained by calculating the contribution to EP in each fraction and adding up all of the calculated contributions.
(i) As described above, the average ethylene contents (unit: % by weight) in the fractions corresponding to fractions 1 to 3 measured by CFC are A40, A100 and A140, respectively. The method for measuring the average ethylene content is described later.
(ii) The ethylene content (unit: % by weight) corresponding to the peak-top position in the differential molecular weight distribution curve for fraction 1 is B40. This definition cannot be applied to each of fractions 2 and 3, since all rubber portions in an ethylene-propylene rubber are regarded as eluting at 40° C. in CFC. For this reason, in the present invention, it is defined that B100=B140=100. Each of B40, B100 and B140 is an ethylene content in the EP contained in each fraction. It is virtually impossible to analytically obtain these values, because there is no means to completely separate PP and CP coexisting in the fractions. As a result of studies using various model samples, it has been found that reasonable explanation of the effect for improving the physical properties of materials can be made using, as the value of B40, the ethylene content corresponding to the peak-top position in the differential molecular weight distribution curve for fraction 1. On the other hand, with respect to each of B100 and B140, approximation of each of these values by 100 gives results quite close to the truth with almost no error in calculation because of two reasons, crystallinity of each of fractions 2 and 3 caused by ethylene chain(s) and relatively low EP content of each of fractions 2 and 3 as compared to that of fraction 1. For this reason, analysis is conducted based on the definition B100=B140=100.

(iii) The EP content is calculated according to the following formula.

$$\text{EP content (\% by weight)} = W40 \times A40/B40 + W100 \times A100/100 + W140 \times A140/100 \quad \text{(II)}$$

The first term (W40×A40/B40) on the right side shows the content (% by weight) of EP having no crystallinity and the sum of the second and third terms (W100×A100/100+W140×A140/100) shows the content (% by weight) of EP having crystallinity.

B40 and each of A40, A100 and A140 (average ethylene contents in fractions 1 to 3 obtained by CFC measurement, respectively) are obtained as follows.

Fraction 1 (obtained by fractionation based on the difference in crystal distribution) is analyzed to obtain 2 curves, (i) a differential molecular weight distribution curve obtained by the measurement of molecular weight distribution using GPC columns constructing a portion of the CFC analyzing system; and (ii) an ethylene content distribution curve with data points each corresponding to those in differential molecular weight distribution curve (i) above, obtained by the measurement of ethylene content using the FT-IR connected after the GPC columns. The ethylene content of a certain point in ethylene content distribution curve (ii) corresponding to the peak-top position in differential molecular weight distribution curve (i) is B40.

The average ethylene content A40 is obtained by summing up the product of each weight ratio taken during the measurement as each data point in curve (i) and the ethylene content taken during the measurement as each data point in curve (ii).

Significance of setting the above-mentioned three fractionation temperatures is as follows.

In the CFC analysis in the present invention, the temperature of 40° C. is significant in that this temperature is necessary and sufficient for fractionating only a polymer having no crystallinity (for example, most of EP and, among propylene polymer components (PP), a component having extremely low molecular weight and an atactic component). The temperature of 100° C. is necessary and sufficient for eluting only a component insoluble at 40° C. but soluble at 100° C. (for example, a component having crystallinity caused by ethylene and/or propylene chains in EP, and PP having low crystallinity). The temperature of 140° C. is necessary and sufficient for eluting only a component that is insoluble at 100° C. but soluble at 140° C. (for example, a component having especially high crystallinity in PP and a component having an extremely high molecular weight and very high ethylene crystallinity in EP) and recovering the whole amount of the propylene-based block copolymer used in the analysis. Incidentally, the EP component in W140 is extremely small, and this EP component is substantially negligible.

$$\text{Ethylene content in EP (\% by weight)} = (W40 \times A40 + W100 \times A100 + W140 \times A140)/[EP] \quad \text{(III)}$$

In this formula, [EP] is the EP content (% by weight) obtained in advance.

The EP content (% by weight) for the portion among EP having no crystallinity is approximated by the value of B40. This is because elution of almost all rubber portions in an ethylene-propylene rubber is completed at 40° C. or less in CFC.

However, when the ethylene content of (Y-2) is less that 15 wt. %, accurate analysis by the above-mentioned analyzing method using a combination of a cross fractionation method with FT-IR method is difficult. This is because in such a case, there is no significant difference in crystallinity between (Y-1) and (Y-2) and temperature-based fractionation between (Y-1) and (Y-2) does not sufficiently occur. In such a case, it is preferred that the comonomer content of component (Y-2) is obtained by a method comprising (a) taking a small portion of component (Y-1) during the sequential polymerization to measure the molecular weight (and comonomer content if a comonomer is copolymerized) of component (Y-1), (b) determining the amount ratio between components (Y-1) and (Y-2) based on the material balance, (c) measuring the comonomer content of (Y) as a whole after completion of the sequential polymerization and (d) calculating the comonomer content of component (Y-2) using the formula given below showing simple additivity of weight. When ethylene is used as a comonomer, the ethylene content of (Y-2) is obtained using this formula.

$$\text{Ethylene content of component } (Y\text{-}2) = [\text{Ethylene content of } (Y) \text{ as a whole} - \{\text{Ethylene content of component } (Y\text{-}1) \times \text{Weight ratio of component } (Y\text{-}1)/100\}]/\{\text{Weight ratio of component } (Y\text{-}2)/100\}$$

As an example of another method for obtaining the ratios of the amounts of components (Y-1) and (Y-2), there can be mentioned, when components (Y-1) and (Y-2) with different average molecular weights to some extent are produced, a method comprising (a) subjecting (Y) as a whole after completion of the sequential polymerization to GPC measurement, (b) subjecting the data of the obtained multimodal molecular weight distribution curve to peak-separation treatment using a commercially available data analysis software, and (c) calculating the weight ratio between the components corresponding to the peaks separated by the peak-separation treatment.

JP-A-2010-150509 discloses a polypropylene-based resin composition for injection foam molding comprising a propylene-ethylene copolymer having properties analogous to those described above; another propylene-based polymer; and a blowing agent. However, close study of Examples therein shows that a propylene-based block copolymer having an MFR of 30 g/10 minutes is used as the another propylene-based polymer. Therefore, there is no technical suggestion in this document related to the issue of solving the problem disclosed in the present invention specific to the polypropylene having a structure with long chain branches.

JP-A-2010-121054 discloses, as a composition suitable for expansion blow molding, a polypropylene-based resin composition comprising a propylene-ethylene copolymer (component B) having properties analogous to those described above; a crystalline polypropylene (component A) having a specific MFR; a propylene polymer (component C) comprising an olefin polymer having a specific range of intrinsic viscosity and a polypropylene; and at least one thermoplastic resin selected from the group consisting of a hydrogenated styrene-conjugated diene block copolymer, ethylene-α-olefin-based copolymer rubber and ethylene polymer resin. However, there is no technical suggestion in this document related to the issue of solving the problem to the polypropylene having a structure with long chain branches. Therefore, this document should be regarded as belonging to a technical category other than that the present invention belongs to.

The above-mentioned PATENT LITERATURE 10 discloses a foamed sheet obtained from a propylene-based resin composition portion having a specific MFR, MFR-MT balance and longest relaxation time, the resin composition comprising 50 to 90% by weight of a propylene homopolymer or copolymer of propylene with an α-olefin other than propylene (with an α-olefin content of 1% by weight or less) having an MFR of 10 to 1000 g/10 minutes; and 10 to 50% by weight of a copolymer of propylene with an α-olefin other than propylene (with an α-olefin content of 1 to 15% by weight) having a weight average molecular weight of 500000 to 10000000. However, there is no technical suggestion in this document related to the issue of solving the problem specific to the polypropylene having a structure with long chain branches using specific ultrahigh molecular weight propylene-ethylene copolymer component. Close study of Examples therein shows that the only α-olefin content of the high molecular weight component is 3 to 10% by weight (ethylene) which is different from the ethylene content of component (Y-2) defined in the present invention. As described specifically later in Examples, component (Y-2) with such an ethylene content does not exhibit an effect for preventing the formation of the shish-kebab structure (or its precursor) by polypropylene resin (X) having a structure with long chain branches under shear flow.

III. Components, Preparation Method and Intended Use of the Polypropylene-Based Resin Composition 1. Components of the Polypropylene-Based Resin Composition Detailed description is made below with respect to the components of the polypropylene-based resin composition suitable for expansion molding.

(1) Blowing Agent

It is preferred that the polypropylene-based resin composition of the present invention further comprises a blowing agent.

As the blowing agent, any conventionally known blowing agent for plastics, rubber or the like may be used with no difficulty. Use may be made of any kind of conventionally used blowing agent, such as physical blowing agents, decomposing (chemical) blowing agents and microcapsules each having contained therein a heat expanding agent.

Examples of physical blowing agents include aliphatic hydrocarbons, such as propane, butane, pentane and hexane; alicyclic hydrocarbons, such as cyclobutane and cyclopentane; halogenated hydrocarbons, such as chlorodifluoromethane, difluoromethane, trifluoromethane, trichlorofluoromethane, dichlorodifluoromethane, chloromethane, dichloromethane, chloroethane, dichlorotrifluoroethane, dichlorofluoroethane, chlorodifluoroethane, dichloropentafluoroethane, tetrafluoroethane, difluoroethane, pentafluoroethane, trifluoroethane, trichlorotrifluoroethane, dichlorotetrafluoroethane, chloropentafluoroethane and perfluorocyclobutane; and inorganic gases, such as water, carbon dioxide gas and nitrogen gas. These physical blowing agents may be used individually or in combination.

Among these physical blowing agents, in view of inexpensiveness and solubility into polypropylene resin (X), aliphatic hydrocarbons (such as propane, butane, pentane and hexane) and carbon dioxide gas are preferred. Carbon dioxide gas is in supercritical state under conditions including the pressure of 7.4 MPa or more and the temperature of 31° C. or more. Carbon dioxide gas in this state is excellent in diffusibility and solubility into a polymer.

When the polypropylene-based resin composition is obtained using a physical blowing agent, a cell nucleating agent may be used, if necessary. Examples of cell nucleating agents include inorganic decomposing blowing agents, such as ammonium carbonate, sodium bicarbonate, ammonium bicarbonate and ammonium nitrite; azo compounds, such as azodicarbonamide, azobisisobutyronitrile and diazoaminobenzene; nitroso compounds, such as N,N'-dinitrosopentamethylenetetramine and N,N'-dimethyl-N,N'-dinitrosoterephthalamide; decomposing blowing agents, such as benzenesulfonylhydrazide, p-toluenesulfonylhydrazide, p,p'-oxybisbenzenesulfonylsemicarbazide, p-toluenesulfonylsemicarbazide, trihydrazinotriazine and barium azodicarboxylate; inorganic powders, such as talc and silica; acidic salts, such as salts of polyacids; and a reaction mixture of a polyacid and sodium carbonate or bicarbonate. These cell nucleating agents can be used individually or in combination.

When the polypropylene-based resin composition is obtained using a decomposing (chemical) blowing agent, examples of the agents include a mixture of sodium bicarbonate and an organic acid (such as citric acid); azo blowing agents, such as azodicarbonamide and barium azodicarboxylate; nitroso blowing agents, N,N'-dinitrosopentamethylenetetramine and N,N'-dimethyl-N,N'-dinitrosoterephthalamide; sulfohydrazide blowing agents, such as p,p'-oxybisbenzenesulfonylhydrazide and p-toluenesulfonylsemicarbazide; and trihydrazinotriazine.

The blending amount of the blowing agent is preferably 0.05 to 6.0 parts by weight, more preferably 0.05 to 3.0 parts by weight, still more preferably 0.5 to 2.5 parts by weight, especially preferably 1.0 to 2.0 parts by weight, based on the total amount of components (X) and (Y) regarded as 100 parts by weight.

When the blending amount of the blowing agent is much more than 6.0 parts by weight, excess foaming makes it difficult to form fine cells uniform in size. When the blending amount of the blowing agent is much less than 0.05 part by weight, the amount of gas to be generated is disadvantageously low.

When a cell nucleating agent is used, the blending amount of the cell nucleating agent (excluding impurities) is preferably 0.01 to 5 parts by weight, based on the total amount of components (X) and (Y) regarded as 100 parts by weight.

(2) Other Additives

The polypropylene-based resin composition of the present invention comprises, in addition to the above-mentioned component (X), component (Y), blowing agent and cell nucleating agent, if necessary, various additives, such as another polymer, antioxidant, neutralizer, light stabilizer, ultraviolet absorber, inorganic filler, lubricant, antistatic agent and metal deactivator, as long as the object of the present invention is not damaged.

Examples of other polymers include high density polyethylenes, low density polyethylenes, linear low density polyethylenes, polypropylene-based resins other than those mentioned above, propylene-α-olefin copolymers (α-olefin is a $C_4$-olefin or more), α-polyolefins (such as poly-4-methyl-pentene-1), olefin-based elastomers (such as ethylene-propylene elastomer), a copolymer of one of these polymers with another monomer coporimerizable with these polymers (such as vinyl acetate, vinyl chloride, (meth) acrylic acid and (meth)acrylate esters) and mixtures thereof.

A high melt tension resin composition is frequently used after dilution with another resin (Z) in view of physical properties of final product and economy, especially in the field which requires high melt tension (such as expansion molding). As an example of a resin as another resin (Z), there can be mentioned a polypropylene-based resin comprising 90 wt. % or more of propylene, the resin having none of properties (X-i) to (X-iv) and (Y-i) to (Y-v) in the present invention. As this resin, homopolypropylene (propylene homopolymer) is especially preferred.

The range of the blending amount of another resin (Z) is preferably more than 0 part by weight and 1000 parts by weight or less, more preferably 1 part by weight or more and 500 parts by weight or less, still more preferably 10 parts by weight or more and 300 parts by weight or less, based on the amount of the polypropylene-based resin composition comprising components (X) and (Y) regarded as 100 parts by weight.

Examples of antioxidants include phenol-type antioxidants, phosphite-type antioxidants, thio-type antioxidant and the like. Examples of neutralizers include higher fatty acid salts, such as calcium stearate and zinc stearate. Examples of light stabilizers antioxidants and ultraviolet absorbers include hindered amines, nickel complex compounds, benzotriazols, benzophenones and the like.

Examples of inorganic fillers include calcium carbonate, silica, hydrotalcite, zeolite, aluminum silicate, magnesium silicate and the like. Examples of lubricants include higher fatty acid amides, such as stearamide.

Examples of antistatic agents include fatty acid partial esters, such as glycerin fatty acid mono ester. Examples of metal deactivators include triazines, phosphones, epoxies, triazols, hydrazides, oxamides and the like.

2. Method for Preparing the Polypropylene-Based Resin Composition

As a method for preparing the polypropylene-based resin composition of the present invention, there can be mentioned a method in which the above-mentioned component (X), component (Y), blowing agent, cell nucleating agent and other optional additive(s), each in the form of powder or pellet, are mixed by a dry-blender, Henschel mixer or the like. These components may be melt-kneaded in advance by a single- or twin-screw kneader or another type of kneader. When a chemical blowing agent is simultaneously melt-kneaded, the kneading temperature must be controlled to be lower than the decomposition temperature of the chemical blowing agent.

Depending on the situations, only a foaming agent may be separately fed during the production of the polypropylene-based foam.

3. Intended Use

The polypropylene-based resin composition of the present invention can be suitably used in various molding methods (molded articles) which requires high melt tension, such as extrusion foaming (extruded foam), injection foam molding (injection foam), blow molding (blow molded article), injection blow molding (injection blow molded article), expansion blow molding (expansion blow molded article), deep drawing (deep drawn article), thermoform and the like, especially in the field of expansion molding in which the property of melt tension is remarkably reflected.

4. Polypropylene-Based (Multi-Layer) Foamed Sheet

In the polypropylene-based (multi-layer) foamed sheet obtained from the polypropylene-based resin composition of the present invention (containing a blowing agent), the average cell diameter is preferably 500 μm or less, more preferably 400 μm or less, still more preferably 300 μm or less. When the average cell diameter is much more than 500 μm, deterioration of appearance (such as dimples) of the polypropylene-based foamed sheet (including that during the thermoforming of this foamed sheet to obtain a thermoform) disadvantageously occurs.

In the polypropylene-based foamed sheet of the present invention, the open pore ratio is preferably 30% or less, more preferably 20% or less, still more preferably 15% or less. When the open pore ratio is more than 30%, the thickness of the final thermoform disadvantageously decreases since expansion of cells in the foamed sheet during the thermoforming does not occur and this disadvantageously lowers heat insulating properties of the final thermoform.

There is no particular limitation of the thickness of the polypropylene-based foamed sheet of the present invention. The thickness is preferably approximately 0.3 mm to 10 mm, more preferably 0.5 mm to 5 mm.

The polypropylene-based foamed sheet can be obtained by a conventionally known method in which the polypropylene-based resin composition is melt-kneaded by an extruder and extruded through the die provided on the tip of the extruder. The extruder may be a single-screw or twin-screw extruder including a tandem type-extruder, for example, an extruder in which a twin-screw extruder as the former extruder is combined with a single-screw extruder as the latter extruder.

When a physical blowing agent is used, the physical blowing agent (such as carbon dioxide gas and butane) is introduced (injected) in the middle of the cylinder of the extruder. The extruder die may be a T-die or circular die.

When the foamed sheet is processed into a multi-layer foamed sheet, the multi-layer foamed sheet can be obtained by subjecting the foamed layer comprising the polypropylene-based resin composition and a non-foamed layer comprising a thermoplastic resin composition to co-extrusion.

The polypropylene-based resin multi-layer foamed sheet can be obtained by conventionally known co-extrusion method using a plurality of extruders, such as the feed block method and multi die method.

The non-foamed layer used in the polypropylene-based resin multi-layer foamed sheet can be formed in any side of the foamed layer. The multi-layer foamed sheet may have a construction in which the foamed layer is present between 2 non-foamed layer, i.e., sandwich structure.

The polypropylene-based resin multi-layer foamed sheet with the non-foamed layer is excellent in strength. Also surface smoothness and appearance become excellent when the non-foamed layer is formed at least in one side of the foamed layer corresponding to the outer surface of the final product. Further, use of a functional thermoplastic resin as the non-foamed layer is preferred since it becomes possible to impart some additional properties, such as antibacterial properties, softness, scratch resistance and the like, to the polypropylene-based resin multi-layer foamed sheet.

Examples of the thermoplastic resins used for the thermoplastic resin composition for the non-foamed layer include high density polyethylenes, low density polyethylenes, linear low density polyethylenes, polypropylenes, propylene-α-olefin copolymers, polyolefins (such as poly-4-methyl-pentene-1), olefin-based elastomers (such as ethylene-propylene elastomer), a copolymer of one of these polymers with another monomer copolimerizable with these polymers (such as vinyl acetate, vinyl chloride, (meth) acrylic acid and (meth)acrylate esters) and mixtures thereof, as long as the effect of the present invention is not damaged.

Among these, polypropylenes and propylene-α-olefin copolymers are preferred in view of recyclability, adhesiveness, oil resistance, stiffness and the like. The propylene-α-olefin copolymers include a polymer what is called an high-impact polypropylene or propylene block copolymer obtained by multi-stage polymerization of a propylene (co) polymer and an ethylene-propylene random copolymer using one or more polymerization tank(s).

It is preferred that the thermoplastic resin composition for the non-foamed layer has blended therewith 50 parts by weight or less, per 100 parts by weight of the thermoplastic resin, of an inorganic filler. When the amount of the inorganic filler is more than 50 parts by weight, the appearance of the sheet tends to be deteriorated by the occurrence of die drool at the outlet of the die.

Examples of inorganic fillers include talc, calcium carbonate, silica, hydrotalcite, zeolite, aluminum silicate, magnesium silicate and the like.

There is no particular limitation of the thickness of the polypropylene-based resin multi-layer foamed sheet. The thickness is preferably approximately 0.3 mm to 10 mm, more preferably 0.5 mm to 5 mm.

The thickness of the non-foamed layer in the polypropylene-based resin multi-layer foamed sheet is formed to have a thickness of 1 to 50%, more preferably 5 to 20%, based on the total thickness of the polypropylene-based resin multi-layer foamed sheet. When the thickness of the non-foamed layer is more than 50%, growth of cells in the foamed layer is disadvantageously prevented.

In order to improve printability, paint applicability and the like, the polypropylene-based resin foamed sheet of the present invention may be subjected to any surface treatment, such as corona discharge treatment, flame treatment, plasma treatment and the like with no difficulty.

5. Use of the Polypropylene-Based Foamed Sheet and Thermoform

The polypropylene-based (multi-layer) foamed sheet and thermoform of the present invention provides cells fine and uniform in size and is excellent in appearance, thermoformability impact resistance, lightness, stiffness, heat resistance, heat insulating properties, oil resistance and the like. Therefore, they can be suitably used as a material for food containers (such as trays, dishes and cups), automobile interiors (such as door trims and trunk mats for automobile), packagings, stationery, buildings and the like.

EXAMPLES

Hereinbelow, the present invention will be described in more detail with reference to the following Examples and Comparative Examples, which should not be construed as limiting the scope of the present invention.

In the following Examples and Comparative Examples, various properties of the polypropylene-based resin composition, polypropylene-based (multi-layer) foamed sheet and their components are evaluated by the following evaluation methods. The resins used in the Examples and Comparative Examples are also described below.

1. Evaluation Methods
(1) Melt Flow Rate (MFR):
MFR (unit: g/10 minutes) was determined in accordance with method A of JIS K7210:1999 under conditions M (i.e., at 230° C. under a load of 2.16 kg).
(2) Melt Tension (MT):
Melt tension (MT) (unit: g) was measured using CAPILOGRAPH 1B (manufactured and sold by Toyo Seiki Seisaku-Sho, Ltd.) under the following conditions.
Capillary: diameter 2.0 mm, length 40 mm
Cylinder diameter: 9.55 mm
Cylinder extrusion rate: 20 mm/minute
Withdrawing rate: 4.0 m/minute
Temperature: 230° C.
When MT of the resin is extremely high, the resin may break during the measurement at the withdrawing rate of 4.0 m/minute. In such a case, the withdrawing rate was lowered and MT was the tension measured at the highest withdrawing rate in which the resin could be withdrawn.
(3) Molecular Weight Distribution Mw/Mn and Mz/Mw:
Mw/Mn and Mz/Mw were measured by GPC in accordance with the method described above.
(4) Content of p-Xylene Soluble Components (CXS) at 25° C.:
CXS was measured by the method described above in this specification.
(5) mm Fraction:
mm fraction (unit: %) was measured by the method described in paragraphs [0053] to [0065] in JP-A-2009-275207, as described above, using FT-NMR spectrometer GSX-400 (manufactured and sold by JEOL Ltd.).
(6) Branching Index g':
Branching index g' was measured by the method described above using a GPC equipped with a differential refractive index detector (RI), viscosity detector (Viscometer) and a light scattering detector (MALLS).
(7) Rate of strain hardening $\lambda_{max}$:
Elongational viscosity was measured the following conditions.
Test machine: Ares (manufactured and sold by Rheometrics, Inc.)
Fixture: Extentional Viscosity Fixture (manufactured and sold by TA Instruments)
Temperature: 180° C.
Straining rate: 0.1/sec
Test piece preparation: Pressed sheet (18 mm×10 mm, thickness: 0.7 mm)
Details of $\lambda_{max}$ calculation are described above.
(8) Melting Point:
Melting point was measured as follows by DSC. The sample was first heated to 200° C. to erase thermal history, cooled to 40° C. at the temperature lowering rate of 10° C./minute and heated again at the temperature elevating rate of 10° C./minute. The melting point was the peak-top temperature of the observed endothermic peak.
(9) Ratios of (Y-1) and (Y-2) and Ethylene Content in (Y-2):
These values were measured by the method with combination of cross fractionation and FT-IR described above in this specification. With respect to (Y-2) with an ethylene content of less than 15 wt. %, the ratios of (Y-1) and (Y-2) was determined from the balance of materials used for polymerization of (Y) and the ethylene content was determined by the calculation formula described above in this specification.
(10) Intrinsic Viscosity of (Y-2):
This value was measured with respect to the CXS of propylene-based block copolymer (Y) using an Ubbelohde capillary viscosimeter at 135° C. using decalin as a solvent. With respect to (Y-2) with an ethylene content of less than 15 wt. %, the intrinsic viscosity was determined from the intrinsic viscosities measured for (Y-1) and (Y) by the calculation formula described above in this specification.

(11) Average Cell Diameter:

A sample with square shape (25 mm×25 mm) was cut off from each polypropylene-based resin foamed sheet obtained in each Example and Comparative Example. A magnified image of the cross section of the foamed layer of the sample was projected by a stereomicroscope (SMZ-1000-2, manufactured and sold by Nikon Corporation). From the projected image, with respect to each of the cross section along the direction of extrusion and the cross section perpendicular to the direction of extrusion, the average cell diameter was separately calculated from the observed number of cells and cell diameters, and the average value of these 2 average cell diameters was obtained as the average cell diameter of the whole foamed layer.

(12) Density:

A test piece was cut off from each polypropylene-based resin foamed sheet obtained in each Example and Comparative Example. Density was determined in accordance with JIS K7222. That is, density was determined by dividing the weight (g) of this test piece by the volume ($cm^3$) of this test piece calculated from its outer dimension.

(13) Open Cell Content:

A test piece was cut off from each polypropylene-based (multi-layer) foamed sheet obtained in each Example and Comparative Example. Open cell content was determined in accordance with ASTM D2856 using an air picnometer (manufactured and sold by Tokyoscience Co, Ltd.).

(14) Evaluation of Extensibility (Sheet Appearance):

Appearance of each polypropylene-based resin foamed sheet obtained in each Example and Comparative Example was evaluated in accordance with the following criteria.

⊚ Uniformly extended with extremely low unevenness in thickness, with fine pores uniform in shape and beautiful sheet appearance with no portion of sink marks.

○ Uniformly extended with low unevenness in thickness, with pores uniform in shape and no portion of sink marks.

Δ Defects in extension (unevenness in thickness) observed with portions of sink marks therein, with pores uniform in shape.

x Difficult to uniformly extend (unevenness in thickness in many portions, many fusion of pores and portions of sink marks observed)

(15) Drawdown Resistance:

A test piece with square shape (300 mm×300 mm) was cut off from each polypropylene-based resin foamed sheet obtained in each Example and Comparative Example and fixed on a frame with inner dimension 260 mm×260 mm. The test piece was introduced into a heating furnace in a sag testing machine manufactured and sold by MISUZUERIE Co., Ltd. (having installed therein 2 heaters arranged above and below the sample to be tested). The heating furnace was heated to the atmospheric temperature of 200° C. and change in position of the center of the test piece was repeatedly observed from the start of heating by laser beam measurement.

As the sheet is heated, the sheet once sags (change in position to the negative direction), becomes re-tensioned (change in position to the positive direction) by relaxation of stress and sags again. For this reason, Drawdown resistance was evaluated in accordance with the following criteria (A (mm): position of the center of the sheet at the beginning of heating, B (mm): position of the center of the sheet at the point of time of maximum re-tension, C (mm): position of the center of the sheet at the time 10 seconds after the point of time of maximum re-tension in B).

⊚: B–A≥0 mm and C–B≥–5 mm

○: B–A≥–5 mm and C–B≥–10 mm (unless B–A≥0 mm and C–B≥–5 mm)

Δ: B–A≥–5 mm and C–B<≥–10 mm or B–A<–5 mm and C–B≥–10 mm x: B–A<–5 mm and C–B<–10 mm B–A≥–5 mm means that the sheet is tensioned during the molding of a container and formation of beautiful appearance with no wrinkle becomes possible. C–B≥–10 mm means the sheet gives long molding time sufficient for obtaining good container.

2. Materials Used (1) Polypropylene Resin (X) Having a Structure with Long Chain Branches Each of polymers (PP-1) to (PP-3) obtained in Production Examples 1 to 3 below is used as resin (X).

Production Example 1

Production of (PP-1)

Synthesis Example 1 for Catalyst Component (A)

Synthesis of dichloro[1,1'-dimethylsilylenebis{2-(5-methyl-2-furyl)-4-(4-i-propylphenyl)-indenyl}]hafnium: (synthesis of component [A-1] (complex 1))

(i) Synthesis of 4-(4-i-propylphenyl)-indene

Into a 500-ml glass reaction vessel, 15 g (91 mmol) of 4-i-propylphenylboronic acid and 200 ml of dimethoxyethane (DME) were added. Then, a solution of 90 g (0.28 mol) of cesium carbonate in 100 ml of water was added. Further, 13 g (67 mmol) of 4-bromoindene and 5 g (4 mmol) of tetrakis(triphenyl-phoshino)paradium were added in this order and heated at 80° C. for 6 hours.

The reaction liquid was left to cool and poured into 500 ml of distilled water, and the resultant mixture was transferred into a separation funnel and extracted with diisopropyl ether. The resultant ether layer was washed with saturated brine and dried over sodium sulfate. Then, the sodium sulfate was removed by filtration and the resultant filtrate was evaporated under reduced pressure to remove the solvent. The resultant residue was purified by silica gel column chromatography to thereby obtain 15.4 g of 4-(4-i-propylphenyl)-indene as colorless liquid (yield: 99%).

(ii) Synthesis of 2-bromo-4-(4-i-propylphenyl)-indene

Into a 500-ml glass reaction vessel, 15.4 g of 4-(4-i-propylphenyl)-indene (67 mmol), 7.2 ml of distilled water and 200 ml of DMSO were added. Then, 17 g (93 mmol) of N-bromosuccinimide was gradually added and the resultant mixture was stirred for 2 hours at room temperature. The reaction liquid was poured into 500 ml of distilled water, and the resultant mixture was extracted with 100 ml of toluene for 3 times. The resultant toluene layer was washed with saturated brine. Then, 2 g (11 mmol) of p-toluenesulfonic acid was added to the washed toluene layer and refluxed under heating while removing water. The reaction liquid was left to cool, washed with saturated brine and dried over sodium sulfate. Then, the sodium sulfate was removed by filtration and the resultant filtrate was evaporated under reduced pressure to remove the solvent. The resultant residue was purified by silica gel column chromatography to thereby obtain 19.8 g of 2-bromo-4-(4-i-propylphenyl)-indene as yellow liquid (yield: 96%).

(iii) Synthesis of 2-(2-methyl-5-furyl)-4-(4-i-propyl-phenyl)-indene

Into a 500-ml glass reaction vessel, 6.7 g (82 mmol) of 2-methylfuran and 100 ml of DME were added and cooled to −70° C. in a dry ice-methanol bath. Then, 51 ml (81 mmol solute) of n-butyllithium solution in hexane (1.59 mol/L) was added dropwise and stirred for 3 hours. The resultant reaction mixture was cooled to −70° C. in a dry ice-methanol bath and a solution of 20 ml (87 mmol) of triisopropyl borate in 20 ml of DME was added dropwise. After the addition of this solution was completed, the resultant mixture was stirred overnight while the temperature was gradually returned to room temperature.

Into the resultant reaction mixture, 50 ml of distilled water was added for hydrolysis. The resultant mixture was added a solution of 223 g of potassium carbonate in 100 ml of water and 19.8 g (63 mmol) of 2-bromo-4-(4-i-propylphenyl)-indene in this order, and reacted for 3 hours while heating at 80° C. and removing low boiling point components.

The reaction liquid was left to cool and poured into 300 ml of distilled water, and the resultant mixture was transferred into a separation funnel and extracted with diisopropyl ether for 3 times. The resultant ether layer was washed with saturated brine and dried over sodium sulfate. Then, the sodium sulfate was removed by filtration and the resultant filtrate was evaporated under reduced pressure to remove the solvent. The resultant residue was purified by silica gel column chromatography to thereby obtain 19.6 g of 2-(2-methyl-5-furyl)-4-(4-i-propylphenyl)-indene as colorless liquid (yield: 99%).

(iv) Synthesis of dimethylbis{2-(2-methyl-5-furyl)-4-(4-i-propylphenyl)-indenyl}silane Into a 500-ml glass reaction vessel, 9.1 g (29 mmol) of 2-(2-methyl-5-furyl)-4-(4-i-propylphenyl)-indene and 200 ml of THF were added and cooled to −70° C. in a dry ice-methanol bath. Then, 17 ml (28 mmol solute) of n-butyllithium solution in hexane (1.66 mol/L) was added dropwise and stirred for 3 hours. The resultant reaction mixture was cooled to −70° C. in a dry ice-methanol bath and added 0.1 ml (2 mmol) of 1-methylimidazole and 1.8 g (14 mmol) of dimethyldichlorosilane in this order. The resultant mixture was stirred overnight while the temperature was gradually returned to room temperature.

The reaction liquid was added distilled water, and the resultant mixture was transferred into a separation funnel and washed with brine until the content became neutral. Sodium sulfate was added to the resultant reaction liquid for drying. Then, the sodium sulfate was removed by filtration and the resultant filtrate was evaporated under reduced pressure to remove the solvent. The resultant residue was purified by silica gel column chromatography to thereby obtain 8.6 g of dimethylbis{2-(2-methyl-5-furyl)-4-(4-i-propylphenyl)-indenyl}silane as light yellow liquid (yield: 88%).

(v) Synthesis of dimethylsilylenebis{2-(2-methyl-5-furyl)-4-(4-i-propylphenyl)-indenyl}hafnium dichloride Into a 500-ml glass reaction vessel, 8.6 g (13 mmol) of dimethylbis{2-(2-methyl-5-furyl)-4-(4-i-propylphenyl)-indenyl}silane and 300 ml of diethyl ether were added and cooled to −70° C. in a dry ice-methanol bath. Then, 15 ml (25 mmol solute) of n-butyllithium solution in hexane (1.66 mol/L) was added dropwise and stirred for 3 hours. The reaction liquid was evaporated under reduced pressure to remove the solvent. The resultant residue was added 400 ml of toluene of 40 ml of diethyl ether and cooled to −70° C. in a dry ice-methanol bath. The resultant mixture was added 4.0 g (13 mmol) of hafnium tetrachloride and stirred overnight while the temperature was gradually returned to room temperature.

The resultant reaction mixture was evaporated under reduced pressure to remove the solvent. The resultant residue was recrystallized dichloromethane-hexane to thereby obtain 7.6 g of dimethylsilylenebis{2-(2-methyl-5-furyl)-4-(4-i-propylphenyl)-indenyl}hafnium dichloride (racemic) as yellow crystals (yield: 65%).

$^1$H-NMR data for identification of the obtained racemic complex is given below.
Results of identification by $^1$H-NMR ($C_6D_6$)
Racemic form: δ0.95 (s, 6H), δ1.10 (d, 12H), δ2.08 (s, 6H), δ2.67 (m, 2H), δ5.80 (d, 2H), δ6.37 (d, 2H), δ6.74 (dd, 2H), δ7.07 (d, 2H), δ7.13 (d, 4H), δ7.28 (s, 2H), δ7.30 (d, 2H), δ7.83 (d, 4H)

Synthesis Example 2 for Catalyst Component (A)

Synthesis of rac-dichloro[1,1'-dimethylsilylenebis{2-methyl-4-(4-chlorophenyl)-4-hydroazulenyl}]hafnium: (synthesis of component [A-1] (complex 2))

Substantially the same method as described in Example 1 of JP-A-11-240909 was repeated to thereby obtain rac-dichloro[1,1'-dimethylsilylenebis{2-methyl-4-(4-chlorophenyl)-4-hydroazulenyl}]hafnium.

Catalyst Synthesis Example 1

(i) Chemical Treatment of Phyllosilicate Having Ion Exchange Ability

In a separable flask, 96% sulfuric acid (668 g) was added into 2264 g of distilled water, and then 4 L of montmorillonite (BENCLAY SL: average particle diameter: 19 manufactured and sold by Mizusawa Industrial Chemicals, Ltd.) was added as a phyllosilicate. The resultant slurry was heated at 90° C. for 210 minutes. The resultant reaction slurry was added 4000 g of distilled water and filtered, to thereby obtain 810 g of a cake-like solid.

Then, into the separable flask, 432 g of lithium sulfate and 1924 g of distilled water were added to prepare an aqueous solution of lithium sulfate, and whole quantity of the above-mentioned cake-like solid was charged therein. The resultant slurry was subjected to reaction at room temperature for 120 minutes. The resultant reaction slurry was added 4 L of distilled water and filtered. The collected solid was wished with distilled water until pH of the washing is 5 to 6 and filtered, to thereby obtain 760 g of a cake-like solid.

The resultant solid was subjected to preliminary drying at 100° C. overnight under nitrogen gas stream, and then coarse particles with a diameter of 53 μm or more were removed. The remaining solid was further dried at 200° C. under reduced pressure for 2 hours, to thereby obtain 220 g of chemically treated smectite.

Composition of this chemically treated smectite was Al: 6.45% by weight, Si: 38.30% by weight, Mg: 0.98% by weight, Fe: 1.88% by weight and Li: 0.16% by weight, and Al/Si=0.175 [mol/mol].

(ii) Catalyst Preparation and Preliminary Polymerization

Into a three-neck flask (inner volume: 1 L), 20 g of the chemically treated smectite obtained above was charged, and heptane (132 mL) was added thereto to thereby obtain a slurry. The resultant slurry was added triisobutylaluminum (25 mmol of the solute: 34.6 mL, as a solution in heptane with a concentration 143 mg/mL), stirred for 1 hour, washed with heptane so that the remaining solution ratio became 1/100, and added heptane so that the total volume was 100 mL.

In another flask (inner volume: 200 mL), rac-dichloro[1,1'-dimethylsilylenebis{2-(5-methyl-2-furyl)-4-(4-i-propyl-phenyl)-indenyl}]hafnium (210 µmol) prepared in Synthesis Example 1 for catalyst component (A) above was dissolved into toluene (42 mL) to thereby obtain a solution (solution 1). In a further flask (inner volume: 200 mL), rac-dichloro[1,1'-dimethylsilylenebis{2-methyl-4-(4-chlorophenyl)-4-hydroazulenyl}]hafnium (90 µmol) prepared in Synthesis Example 2 for catalyst component (A) above was dissolved into toluene (18 mL) obtain another solution (solution 2).

Into the above-mentioned 1 L-flask containing the chemically treated smectite, triisobutylaluminum (0.84 mmol of the solute: as a solution in heptane with a concentration 143 mg/mL) was added. The resultant mixture was added the above-mentioned solution 1, stirred at room temperature for 20 minutes. The resultant mixture was added further triisobutylaluminum (0.36 mmol of the solute: 0.50 ml, as a solution in heptane with a concentration 143 mg/mL) and stirred at room temperature for 1 hour.

The resultant mixture was added 338 mL of heptane. The resultant slurry was introduced into a 1 L-autoclave.

The inside temperature of the autoclave was raised to 40° C., and propylene was fed at the rate of 10 g/hr to effect preliminary polymerization for 4 hours while maintaining the temperature at 40° C. After that, propylene feed was stopped and remaining polymerization was effected for 1 hour. Supernatant of the resultant catalyst slurry was removed by decantation, and the remaining portion was added triisobutylaluminum (6 mmol of the solute: 17.0 ml, as a solution in heptane with a concentration 143 mg/mL) and stirred for 5 minutes.

The resultant solid was dried under reduced pressure for 1 hour, to thereby obtain 52.8 g of dried preliminarily polymerized catalyst. The preliminary polymerization rate (the value obtained by dividing the amount of the preliminarily polymerized polymer with the amount of the solid catalyst) was 1.64.

Hereinbelow, this product is referred to as "preliminarily polymerized catalyst 1".
<Polymerization>

An agitating-type autoclave having an inner volume of 200 L was fully replaced with propylene, and 40 kg of fully deoxygenated liquid propylene was introduced into this autoclave. Then, the autoclave was added 3.8 L (volume under the standard state) of hydrogen and 470 ml (0.12 mol solute) of triisobutyl aluminum solution in heptane and heated so that the inner temperature was raised to 70° C. Further, 2.8 g (excluding the amount of the preliminarily polymerized polymer) of preliminarily polymerized catalyst 1 was injected into the autoclave by argon pressure to start the polymerization and the inner temperature was kept at 70° C. After 2 hours, the polymerization terminated by injecting 100 mL of ethanol, purging unreacted propylene and replacing the autoclave with nitrogen.

The resultant product was dried at 90° C. under nitrogen stream to thereby obtain a polymer (hereinbelow referred to as "PP-1").

The catalytic activity was 6210 (g-PP/g-cat) and MFR of PP-1 was 0.60 g/10 minutes.

Production Example 2

Production of (PP-2)

Substantially the same procedure as in Production Example 1 was repeated, except that the amount of hydrogen fed during the polymerization was 4.4 liters and the amount of the preliminarily polymerized catalyst (excluding the amount of the preliminarily polymerized polymer) was 2.4 g, to thereby obtain 16.5 kg of polymer (hereinbelow referred to as "PP-2").

The catalytic activity was 6880 (g-PP/g-cat) and MFR of PP-2 was 1.0 g/10 minutes.

Production Example 3

Production of (PP-3)

Substantially the same procedure as in Production Example 1 was repeated, except that the amount of hydrogen fed during the polymerization was 6.6 liters and the amount of the preliminarily polymerized catalyst (excluding the amount of the preliminarily polymerized polymer) was 1.9 g, to thereby obtain 16.5 kg of polymer (hereinbelow referred to as "PP-3").

The catalytic activity was 8050 (g-PP/g-cat) and MFR of PP-3 was 4.6 g/10 minutes.

[Production of Pellets (X1) to (X3) of PP-1 to PP-3, Respectively]

100 parts by weight of each of polypropylene-based resins PP-1 to PP-3 produced in each of Production Examples 1 to 3 and 2 types of antioxidants, tetrakis[methylene-3-(3',5'-di-t-butyl-4'-hydroxyphenyl)propionate]methane (phenol-type antioxidant manufactured and sold by BASF Japan Ltd. under the tradename IRGANOX 1010, 0.125 part by weight) and tris(2,4-di-t-butylphenyl)phosphite (phosphite-type antioxidant manufactured and sold by BASF Japan Ltd. under the tradename IRGAFOS 168, 0.125 part by weight) were combined, mixed at room temperature for 3 minutes by a high-speed agitation mixer (tradename: Henschel mixer) and melt-kneaded by a twin-screw extruder to thereby obtain each of pellets (X1) to (X3) of polypropylene-based resin (X).

The melt-kneading was conducted using twin-screw extruder KZW-25 (manufactured and sold by TECH-NOVEL CORPORATION) under the conditions including screw rotation rate of 400 RPM and kneading temperatures (from the bottom of the hopper) of 80, 160, 210 and 230° C. The kneading temperature from the point of the last temperature to the outlet of die was the same.

These pellets (X1) to (X3) were subjected to evaluations of MFR, CXS, $^{13}$C-NMR, GPC, branching index, MT and elongational viscosity. The results of evaluations are given in Table 1.

(X4) Commercially Available High Melt Tension PP Modified by Electron Beam Radiation Commercially available high melt tension PP (manufactured and sold by Basell Polyolefins under the grade name PF814) was used to obtain (X4).

(X4) was subjected to the same evaluations as those for (X1). The results of evaluations are given in Table 1.

(X5) Commercially available high melt tension PP modified using a peroxide

Commercially available high melt tension PP (manufactured and sold by Borealis AG under the tradename WB140HMS) was used to obtain (X5).

(X5) was subjected to the same evaluations as those for (X1). The results of evaluations are given in Table 1.

TABLE 1

| Evaluated items | Unit | Polypropylene resin (X) | | | | |
|---|---|---|---|---|---|---|
| | | X1 | X2 | X3 | X4(PF814) | X5(WB140) |
| MFR | g/10 minutes | 0.6 | 1.0 | 4.6 | 2.3 | 2.2 |
| Melting point | ° C. | 154.0 | 154.2 | 154.4 | 159.4 | 158.1 |
| CXS | wt. % | 0.1 | 0.1 | 0.2 | 4.5 | 2.8 |
| mm | % | 98.6 | 98.4 | 98.4 | 92.5 | 92.7 |
| Mw/Mn | — | 4.9 | 4.2 | 4.0 | 6.3 | 5.1 |
| Mz/Mw | — | 3.8 | 3.7 | 3.8 | 3.9 | 3.3 |
| Branching index g' at the absolute molecular weight Mabs of 1,000,000. | — | 0.89 | 0.85 | 0.86 | 0.54 | 0.58 |
| MT | g | 26.1 | 23.3 | 10.7 | 21.3 | 18.9 |
| log(MT) | — | 1.42 | 1.37 | 1.03 | 1.33 | 1.28 |
| −0.9 × log(MFR) + 0.7 | — | 0.90 | 0.70 | 0.10 | 0.37 | 0.39 |
| λ max(0.1) | — | 15.0 | 12.0 | 11.0 | 36.5 | 27.1 |

(2) Propylene-Based Block Copolymer (Y)

Each of the following copolymers was used as propylene-based block copolymer (Y).

Propylene-based block copolymer (Y1) produced in Production Example 4 below

Propylene-based block copolymer (Y2) produced in Production Example 5 below

Propylene-based block copolymer (Y3) produced in Production Example 6 below

Propylene-based block copolymer (Y4c) produced in Production Example 7 below

Propylene-based block copolymer (Y5c) produced in Production Example 8 below

Propylene-based block copolymer (Y6) produced in Production Example 9 below

Propylene-based block copolymer (Y7) produced in Production Example 10 below

Propylene-based block copolymer (Y12c) produced in Production Example 11 below

Propylene-based block copolymer (Y13c) produced in Production Example 12 below

Propylene-based block copolymer (Y14) produced in Production Example 13 below

Propylene-based block copolymer (Y15) produced in Production Example 14 below

Propylene-based block copolymer (Y16) produced in Production Example 15 below

Propylene-based block copolymer (Y17) produced in Production Example 16 below

Propylene-based block copolymer (Y18) produced in Production Example 17 below

In addition, commercially available homopolypropylene resin (Y8c), polypropylene resin (Y9c), polypropylene resin (Y10c) and polypropylene resin (Y11c) (each manufactured sold by Japan Polypropylene) were used as resins each similar to Propylene-based block copolymer (Y). The grade name and the like of each of these commercially available resins are described later.

Production Example 4

Production of Y1

(i) Production of Solid Catalyst Component (b)

To a vessel (inner volume: 50 L) equipped with an agitator and replaced with nitrogen, 20 L of dehydrated and deoxygenated n-heptane was introduced. To this vessel, 10 mol of magnesium chloride and 20 mol of tetrabutoxytitanium were introduced and reaction was effected at 95° C. for 2 hours. Then, the temperature was cooled to 40° C. and 12 L of methylhydrogenpolysiloxane (having a viscosity of 20 centistokes) was introduced and reaction was further effected for 3 hours. Liquid component of the resultant reaction product was removed from the vessel, and the solid component of the reaction product remaining in the vessel was washed with n-heptane.

To the above-mentioned vessel equipped with an agitator, 5 L of dehydrated and deoxygenated n-heptane was introduced. Then, to this vessel, the solid component produced above (3 mol in terms of the amount of magnesium atoms) was introduced. 2.5 L of n-heptane was mixed with 5 mol of silicon tetrachloride and the resultant mixture was introduced into the above-mentioned vessel at 30° C. over 30 minutes. The temperature was raised to 70° C. and reaction was effected for 3 hours. Liquid component of the resultant reaction product was removed from the vessel, and the solid component of the reaction product remaining in the vessel was washed with n-heptane.

To the above-mentioned vessel equipped with an agitator, 2.5 L of dehydrated and deoxygenated n-heptane was introduced. Then, to this vessel, 0.3 mol of phthalic dichloride was introduced at 90° C. over 30 minutes, and reaction was effected at 95° C. for 1 hour. After completion of the reaction, the resultant reaction product was washed with n-heptane. Then, to this vessel, 2 L of titanium tetrachloride was added at room temperature. The temperature was raised to 100° C. and reaction was effected for 2 hours. After completion of the reaction, the resultant reaction product was washed with n-heptane. Further, to this vessel, 0.6 L of silicon tetrachloride and 8 L of n-heptane were introduced and reaction was effected at 90° C. for 1 hour. The resultant reaction product was washed with n-heptane, to thereby obtain a solid component containing 1.30% by mass of titanium.

To the above-mentioned vessel equipped with an agitator and replaced with nitrogen, 8 L of n-heptane, 400 g of the solid component obtained above, 0.27 mol of t-butyl-methyl-dimethoxysilane and 0.27 mol of vinyltrimethylsilane were introduced, and these materials were contacted at 30° C. for 1 hour. Then, the temperature was cooled to 15° C. and 1.5 mol of triethylaluminum diluted with n-heptane was introduced at 15° C. over 30 minutes. After the introduction of triethylaluminum, the temperature was raised to 30° C. and reaction was effected for 2 hours. Liquid component of the resultant reaction product was removed from the vessel, and the solid component of the reaction product remaining in the vessel was washed with n-heptane, to thereby obtain 390 g of a solid catalyst.

The obtained solid catalyst contained 1.22% by mass of titanium.

Further, to the above-mentioned vessel, 6 L of n-heptane and 1 mol of triethylaluminum diluted with n-heptane were introduced at 15° C. over 30 minutes. Then, preliminary polymerization was conducted by introducing propylene into the vessel at the rate of approximately 0.4 kg/hr for 1 hour while controlling the temperature to be not high than 20° C. As a result, solid catalyst component (b) containing polypropylene (having contained therein 0.9 g of polymerized propylene per 1 g of solid) was obtained.

(ii) Production of a Propylene Block Copolymer (Former Polymerization Step: Polymerization of Propylene)

Polymerization was conducted using a continuous reactor comprising 2 (1st and 2nd) fluidized-bed reactors (inner volume: 230 L) connected to each other. First, a propylene polymer was produced in the 1st fluidized-bed reactor while feeding (i) hydrogen (continuously as a molecular weight modifier), (ii) triethylaluminum and (iii) the above-mentioned catalyst as solid catalyst component (b), under the conditions including the polymerization temperature of 65° C., propylene partial pressure of 1.8 MPa (absolute pressure), hydrogen/propylene molar ratio of 0.012, triethylaluminum feeding rate of 5.25 g/hr and catalyst feeding rate which achieved the polymerization rate of 18 kg/hr. The powder (propylene polymer) obtained by the polymerization in the 1st fluidized-bed reactor was continuously withdrawn and transferred into the 2nd fluidized-bed reactor, while keeping the amount of the powder remaining in the 1st fluidized-bed reactor at 60 kg.

(Latter Polymerization Step: Production of Propylene-Ethylene Copolymer)

Next, a propylene-ethylene copolymer was produced in the 2nd fluidized-bed reactor by feeding (i) propylene and ethylene continuously at the ethylene/propylene molar ratio of 0.15 and (ii) ethyl alcohol as an active hydrogen compound at the molar ratio of 1.0 relative to triethylaluminum, so that the polymerization temperature and polymerization pressure for the 2nd fluidized-bed reactor were 80° C. and of 1.5 MPa, respectively. The powder of complete polymerization in the 2nd fluidized-bed reactor (propylene-based block copolymer comprising a propylene polymer and a propylene-ethylene copolymer) was continuously withdrawn to a vessel, while keeping the amount of the powder remaining in the 2nd fluidized-bed reactor at 60 kg. The reaction was terminated by feeding wet nitrogen gas into the reactors, to thereby obtain a propylene-based block copolymer which was used as (Y1).

Production Example 5

Production of Y2

Substantially the same procedure as in Production Example 4 was repeated using the catalyst and polymerization method therein, except that in the latter polymerization step, the ethylene/propylene molar ratio was 0.15 and the molar ratio of ethyl alcohol relative to triethylaluminum was 0.76, to thereby produce a propylene-based block copolymer which was used as (Y2).

Production Example 6

Production of Y3

Substantially the same procedure as in Production Example 4 was repeated using the catalyst and polymerization method therein, except that in the former polymerization step, the polymerization temperature was 70° C. and, in the latter polymerization step, the ethylene/propylene molar ratio was 0.32 and the molar ratio of ethyl alcohol relative to triethylaluminum was 0.80, to thereby produce a propylene-based block copolymer which was used as (Y3).

Production Example 7

Production of Y4c

Substantially the same procedure as in Production Example 4 was repeated using the catalyst and polymerization method therein, except that in the latter polymerization step, the ethylene/propylene molar ratio was 0.17, hydrogen as a molecular weight modifier was continuously fed at the hydrogen/propylene molar ratio of 0.0020, and the molar ratio of ethyl alcohol relative to triethylaluminum was 1.2, to thereby produce a propylene-based block copolymer which was used as (Y4c).

Production Example 8

Production of Y5c

Substantially the same procedure as in Production Example 4 was repeated using the catalyst and polymerization method therein, except that in the latter polymerization step, the ethylene/propylene molar ratio was 0.052 and the molar ratio of ethyl alcohol relative to triethylaluminum was 0.66, to thereby produce a propylene-based block copolymer which was used as (Y5c).

Production Example 9

Production of Y6

(i) Production of Solid Catalyst Component (c)

To a vessel (inner volume: 50 L) equipped with an agitator and fully replaced with nitrogen, 20 L of dehydrated and deoxygenated n-heptane was introduced. To this vessel, 10 mol of $MgCl_2$ and 20 mol of $Ti(O$-n-$C_4H_9)_4$ were introduced and reaction was effected at 95° C. for 2 hours. After completion of the reaction, the temperature was cooled to 40° C. and 12 L of methylhydrogenpolysiloxane (having a viscosity of 20 centistokes) was introduced and reaction was further effected for 3 hours. Liquid component of the resultant reaction product was removed from the vessel, and the solid component of the reaction product remaining in the vessel was washed with n-heptane.

To the above-mentioned vessel equipped with an agitator, 5 L of n-heptane was introduced in substantially the same manner as mentioned above. Then, to this vessel, the solid component produced above (3 mol in terms of the amount of magnesium atoms) was introduced. 2.5 L of n-heptane was mixed with 5 mol of SiCl4 and the resultant mixture was introduced into the above-mentioned vessel at 30° C. over 30 minutes. The temperature was raised to 70° C. and reaction was effected for 3 hours. After completion of the reaction, the resultant reaction product was washed with n-heptane.

To the above-mentioned vessel equipped with an agitator, 2.5 L of n-heptane was introduced. Then, to this vessel, 0.3 mol of phthalic dichloride was introduced at 70° C. over 30 minutes, and reaction was effected at 90° C. for 1 hour. After completion of the reaction, the resultant reaction product was washed with n-heptane. Then, to this vessel, 2 L of TiCl4 was added and reaction was effected at 110° C. for 3 hours. After completion of the reaction, the resultant reaction product was washed with n-heptane to thereby obtain solid component (c1) used for producing solid catalyst component (c). The titanium content of this solid component was 2.0% by mass.

To the above-mentioned vessel equipped with an agitator and replaced with nitrogen, 8 L of n-heptane and 400 g of solid component (c1) were introduced. Then, to this vessel, 0.6 L of SiCl4 as component (c2) was added and reaction was effected at 90° C. for 2 hours. After completion of the reaction, 0.54 mol of $(CH_2=CH)Si(CH_3)_2$ as component (c3), 0.27 mol of (t-Bu) $(Me)Si(OMe)_2$ as component (c4) and 1.5 mol $Al(C_2H_5)_3$ as component (c5) were sequentially introduced into this vessel, and these materials were contacted at 30° C. for 2 hour. After completion of this contact, the resultant reaction product was fully washed with n-heptane, to thereby obtain 390 g of catalyst component (c) mainly composed of magnesium chloride. The titanium content of this component was 1.8% by mass.

(ii) Production of a Propylene-Based Block Copolymer

A stainless steel autoclave (inner volume: 400 L) equipped with an agitator was fully replaced with propylene and added, as the polymerization solvent, 120 L of dehydrated and deoxygenated n-heptane was introduced. To this autoclave, 30 g of triethylaluminum, 91 L of hydrogen and 30 g of the above-mentioned catalyst component (c) were added. Then, the inner temperature of this autoclave was raised to 75° C., and propylene and hydrogen were fed at the rates of 20.25 Kg/Hr and 202.5 L/Hr, respectively. After 200 minutes, feeding of propylene and hydrogen was terminated. During the feeding of propylene and hydrogen, the inner pressure of the autoclave gradually increased finally to 0.66 MPaG. Then, remaining polymerization was effected and, when the inner pressure of the autoclave reached 0.35 MPa, the gas in the reactor was purged until the inner pressure reached 0.03 MPaG, to thereby obtain a propylene polymer (former polymerization step).

Next, the inner temperature of this autoclave was set at 65° C., and 12.5 cc of n-butanol was introduced into this autoclave. To this autoclave, propylene and ethylene were fed at the rates of 2.25 Kg/Hr and 0.96 Kg/Hr, respectively. After 140 minutes, feeding of propylene and ethylene was terminated to complete the polymerization. At the start of feeding of propylene and ethylene, the inner pressure of the autoclave was 0.03 MPaG, and at the time of terminating the feeding, the inner pressure was 0.02 MPaG (latter polymerization step).

The obtained slurry was transferred to next vessel equipped with an agitator, added 2.5 L of butanol and treated at 70° C. for 3 hours. The resultant treated slurry was transferred to next vessel equipped with an agitator, added 100 L of purified water having dissolved therein 20 g of sodium hydroxide and treated for 1 hours. The resultant slurry was left to stand to separate the aqueous layer for removing residue of the catalyst. The resultant slurry was subjected to treatment by a centrifugal separator for removing heptane, and the resultant precipitate was treatment by a dryer at 80° C. for 3 hours for completely removing heptane, to thereby obtain 59.6 Kg of Y6.

Production Example 10

Production of Y7

Substantially the same procedure as in Production Example 8 was repeated except that the catalyst and polymerization method in Production Example 9 were used and, in the former polymerization step, hydrogen was fed at the rate of 180 L/Hr, to thereby obtain propylene-based block copolymer Y7. At the time of terminating the feeding of propylene and hydrogen in the former polymerization step, the inner pressure was 0.61 MPaG, and at the time of terminating the feeding of propylene and ethylene in the latter polymerization step, the inner pressure was 0.02 MPaG.

Production Example 11

Production of Y12c (i) Production of a Propylene Block Copolymer (Former Polymerization Step: Polymerization of Propylene)

Polymerization was conducted using a continuous reactor comprising 2 (1st and 2nd) fluidized-bed reactors (inner volume: 230 L) connected to each other. First, a propylene polymer was produced in the 1st fluidized-bed reactor while feeding (i) hydrogen (continuously as a molecular weight modifier), (ii) triethylaluminum and (iii) the above-mentioned solid catalyst component (b), under the conditions including the polymerization temperature of 55° C., propylene partial pressure of 1.8 MPa (absolute pressure), hydrogen/propylene molar ratio of 0.082, triethylaluminum feeding rate of 5.25 g/hr and catalyst feeding rate which achieved the polymerization rate of 12.5 kg/hr. The powder (propylene polymer) obtained by the polymerization in the 1st fluidized-bed reactor was continuously withdrawn and transferred into the 2nd fluidized-bed reactor, while keeping the amount of the powder remaining in the 1st fluidized-bed reactor at 40 kg.

(Latter Polymerization Step: Production of Propylene-Ethylene Copolymer)

Next, a propylene-ethylene copolymer was produced in the 2nd fluidized-bed reactor by feeding (i) propylene and ethylene continuously at the ethylene/propylene molar ratio of 0.50, (ii) hydrogen continuously at the hydrogen/propylene molar ratio of 0.038 and (iii) ethyl alcohol as an active hydrogen compound at the molar ratio of 1.1 relative to triethylaluminum, so that the polymerization temperature and polymerization pressure for the 2nd fluidized-bed reactor were 60° C. and of 1.5 MPa, respectively. The powder of complete polymerization in the 2nd fluidized-bed reactor (propylene-based block copolymer comprising a propylene polymer and a propylene-ethylene copolymer) was continuously withdrawn to a vessel, while keeping the amount of the powder remaining in the 2nd fluidized-bed reactor at 60 kg. The reaction was terminated by feeding wet nitrogen gas into the reactors, to thereby obtain a propylene-based block copolymer which was used as (Y12c).

Production Example 12

Production of Y13c (i) Production of a Propylene Block Copolymer (Former Polymerization Step: Polymerization of Propylene)
Polymerization was conducted using a continuous reactor comprising 2 (1st and 2nd) fluidized-bed reactors (inner volume: 230 L) connected to each other. First, a crystalline propylene polymer component was produced in the 1st fluidized-bed reactor while feeding (i) hydrogen (continuously as a molecular weight modifier), (ii) triethylaluminum and (iii) the above-mentioned solid catalyst component (b), under the conditions including the polymerization temperature of 75° C., propylene partial pressure of 1.8 MPa (absolute pressure), hydrogen/propylene molar ratio of 0.014, triethylaluminum feeding rate of 5.25 g/hr and catalyst feeding rate which achieved the polymerization rate of 22.5 kg/hr. The powder (propylene polymer) obtained by the polymerization in the 1st fluidized-bed reactor was continuously withdrawn and transferred into the 2nd fluidized-bed reactor, while keeping the amount of the powder remaining in the 1st fluidized-bed reactor at 60 kg.
(Latter Polymerization Step: Production of Propylene-Ethylene Copolymer)
Next, a propylene-ethylene copolymer was produced in the 2nd fluidized-bed reactor by feeding (i) propylene and ethylene continuously at the ethylene/propylene molar ratio of 0.86 and (ii) ethyl alcohol as an active hydrogen compound at the molar ratio of 3.4 relative to triethylaluminum, so that the polymerization temperature and polymerization pressure for the 2nd fluidized-bed reactor were 80° C. and of 1.5 MPa, respectively. The powder of complete polymerization in the 2nd fluidized-bed reactor (propylene-based block copolymer comprising a propylene polymer and a propylene-ethylene copolymer) was continuously withdrawn to a vessel, while keeping the amount of the powder remaining in the 2nd fluidized-bed reactor at 40 kg. The reaction was terminated by feeding wet nitrogen gas into the reactors, to thereby obtain a propylene-based block copolymer which was used as (Y13c).

Production Example 13

Production of Y14

(i) Production of a Propylene-Based Block Copolymer

A stainless steel autoclave (inner volume: 400 L) equipped with an agitator was fully replaced with propylene and added, as the polymerization solvent, 120 L of dehydrated and deoxygenated n-heptane was introduced. To this autoclave, 30 g of triethylaluminum, 12 L of hydrogen and 10 g of the above-mentioned catalyst component (c) were added. Then, the inner temperature of this autoclave was raised to 75° C., and propylene and hydrogen were fed at the rates of 20.7 Kg/Hr and 20.6 L/Hr, respectively. After 200 minutes, feeding of propylene and hydrogen was terminated. During the feeding of propylene and hydrogen, the inner pressure of the autoclave gradually increased finally to 0.46 MPaG. Then, remaining polymerization was effected and, when the inner pressure of the autoclave reached 0.35 MPa, the gas in the reactor was purged until the inner pressure reached 0.03 MPaG, to thereby obtain a propylene polymer (former polymerization step).

Next, the inner temperature of this autoclave was set at 65° C., and 16.0 cc of n-butanol was introduced into this autoclave. To this autoclave, propylene and ethylene were fed at the rates of 2.4 Kg/Hr and 1.6 Kg/Hr, respectively. After 90 minutes, feeding of propylene and ethylene was terminated to complete the polymerization. At the start of feeding of propylene and ethylene, the inner pressure of the autoclave was 0.03 MPaG, and at the time of terminating the feeding, the inner pressure was 0.09 MPaG (latter polymerization step).

The obtained slurry was transferred to next vessel equipped with an agitator, added 2.5 L of butanol and treated at 70° C. for 3 hours. The resultant treated slurry was transferred to next vessel equipped with an agitator, added 100 L of purified water having dissolved therein 20 g of sodium hydroxide and treated for 1 hours. The resultant slurry was left to stand to separate the aqueous layer for removing residue of the catalyst. The resultant slurry was subjected to treatment by a centrifugal separator for removing heptane, and the resultant precipitate was treatment by a dryer at 80° C. for 3 hours for completely removing heptane, to thereby obtain 59.7 Kg of Y14.

Production Example 14

Production of Y15

(i) Production of a Propylene-Based Block Copolymer

A stainless steel autoclave (inner volume: 400 L) equipped with an agitator was fully replaced with propylene and added, as the polymerization solvent, 120 L of dehydrated and deoxygenated n-heptane was introduced. To this autoclave, 30 g of triethylaluminum, 80 L of hydrogen and 15 g of the above-mentioned catalyst component (c) were added. Then, the inner temperature of this autoclave was raised to 75° C., and propylene and hydrogen were fed at the rates of 20.25 Kg/Hr and 60 L/Hr, respectively. After 200 minutes, feeding of propylene and hydrogen was terminated. During the feeding of propylene and hydrogen, the inner pressure of the autoclave gradually increased finally to 0.52 MPaG. Then, remaining polymerization was effected and, when the inner pressure of the autoclave reached 0.35 MPa, the gas in the reactor was purged until the inner pressure reached 0.03 MPaG, to thereby obtain a propylene polymer (former polymerization step).

Next, the inner temperature of this autoclave was set at 65° C., and 12.5 cc of n-butanol was introduced into this autoclave. To this autoclave, propylene and ethylene were fed at the rates of 1.5 Kg/Hr and 1.0 Kg/Hr, respectively. After 180 minutes, feeding of propylene and ethylene was terminated to complete the polymerization. At the start of feeding of propylene and ethylene, the inner pressure of the autoclave was 0.03 MPaG, and at the time of terminating the feeding, the inner pressure was 0.04 MPaG (latter polymerization step).

The obtained slurry was transferred to next vessel equipped with an agitator, added 2.5 L of butanol and treated at 70° C. for 3 hours. The resultant treated slurry was transferred to next vessel equipped with an agitator, added 100 L of purified water having dissolved therein 20 g of sodium hydroxide and treated for 1 hours. The resultant slurry was left to stand to separate the aqueous layer for removing residue of the catalyst. The resultant slurry was subjected to treatment by a centrifugal separator for removing heptane, and the resultant precipitate was treatment by a dryer at 80° C. for 3 hours for completely removing heptane, to thereby obtain 59.7 Kg of Y15.

Production Example 15

Production of Y16

Substantially the same procedure as in Production Example 4 was repeated, except that in the former polymerization step (production of a propylene polymer), the polymerization temperature was 60° C., the hydrogen/propylene molar ratio was 0.027 and the amount of the powder remaining in the 1st fluidized-bed reactor was at kept 60 kg, and in the latter polymerization step (production of propylene-ethylene copolymer), the polymerization temperature was 70° C., propylene and ethylene was continuously fed at the ethylene/propylene molar ratio of 0.17, hydrogen was continuously fed at the hydrogen/propylene molar ratio of 0.0023 and the molar ratio of ethyl alcohol relative to triethylaluminum was 1.05, to thereby produce Y16.

Production Example 16

Production of Y17

Substantially the same procedure as in Production Example 15 was repeated, except that in the latter polymerization step (production of propylene-ethylene copolymer), propylene and ethylene was continuously fed at the ethylene/propylene molar ratio of 0.30, hydrogen was not fed and the molar ratio of ethyl alcohol relative to triethylaluminum was 0.86, to thereby produce Y17.

Production Example 17

Production of Y18

Substantially the same procedure as in Production Example 15 was repeated, except that in the former polymerization step (production of a propylene polymer), the hydrogen/propylene molar ratio was 0.081, and in the latter polymerization step (production of propylene-ethylene copolymer), the polymerization temperature was 60° C., propylene and ethylene was continuously fed at the ethylene/propylene molar ratio of 0.41, hydrogen was not fed and the molar ratio of ethyl alcohol relative to triethylaluminum was 1.45, to thereby produce Y18.

Each powder was palletized under the conditions described below, and the resultant pellet was subjected to various kinds of evaluations. The results of evaluations are given in Table 2.

[Production of Pellet of Propylene-Based Block Copolymer (Y)]

100 parts by weight of each propylene-based block copolymer (Y) produced in each Production Example above, 2 types of antioxidants, tetrakis-[methylene-3-(3',5'-di-t-butyl-4'-hydroxyphenyl)propionate]methane (phenol-type antioxidant manufactured and sold by BASF Japan Ltd. under the tradename IRGANOX 1010, 0.05 part by weight) and tris-(2,4-di-t-butylphenyl)phosphite (phosphite-type antioxidant manufactured and sold by BASF Japan Ltd. under the tradename IRGAFOS 168, 0.125 part by weight) and calcium stearate (0.05 part by weight) were combined, mixed at room temperature for 3 minutes by a high-speed agitation mixer (tradename: Henschel mixer), and melt-kneaded and extruded by a twin-screw extruder to thereby obtain a strand. The strand was passed through a cold-water bath and cut by a strand cutter to thereby obtain pellets.

The melt-kneading was conducted using twin-screw extruder KZW-25 (manufactured and sold by TECH-NOVEL CORPORATION) under the conditions including screw rotation rate of 300 RPM and kneading temperatures (from the bottom of the hopper) of 80, 160, 180, 200, 200, 200, 210, 210 and 210 (the temperature of the outlet of die) ° C.

(Y8c):

A commercially available homopolypropylene resin (manufactured and sold by Japan Polypropylene under the grade name "SA3A") was used as Y8c. Since this resin is not a block copolymer, the content of (Y-1) component can be regarded as 100 wt. %. The results of various kinds of evaluations are given in Table 2.

(Y9c):

A commercially available polypropylene resin (manufactured and sold by Japan Polypropylene under the grade name "EC9") was used as Y9c. The results of various kinds of evaluations are given in Table 2.

(Y10c):

A commercially available polypropylene resin (manufactured and sold by Japan Polypropylene under the grade name "BC04G") was used as Y10c. The results of various kinds of evaluations are given in Table 2.

(Y11c):

A commercially available polypropylene resin (manufactured and sold by Japan Polypropylene under the grade name "BC6") was used as Y10c. The results of various kinds of evaluations are given in Table 2.

TABLE 2

| Evaluated items | Unit | Y1 | Y2 | Y3 | Y4c | Y5c | Y6 | Y7 | Y8c | Y9c | Y10c |
|---|---|---|---|---|---|---|---|---|---|---|---|
| MFR | g/10 minutes | 0.8 | 0.6 | 0.7 | 2.3 | 0.6 | 115.0 | 160.0 | 10.0 | 0.5 | 40.0 |
| Weight ratio of (Y-1) in (Y) | wt. % | 72.9 | 71.7 | 69.9 | 76.0 | 61.6 | 91.9 | 91.2 | 100.0 | 92.3 | 80.0 |
| Weight ratio of (Y-2) in (Y) | wt. % | 27.1 | 28.3 | 30.1 | 24.0 | 28.4 | 7.6 | 8.8 | 0.0 | 7.7 | 20.0 |
| Ethylene content in (Y-2) | wt. % | 20.7 | 17.6 | 33.5 | 23.9 | 10.0 | 35.0 | 26.3 | — | 73.8 | 35.1 |
| Melting point | ° C. | 163 | 163 | 163 | 163 | 161 | 162 | 161 | 162 | 161 | 163 |
| Intrinsic viscosity of (Y-2) | dl/g | 10 | 10.2 | 9.7 | 4.8 | 10.1 | 7.6 | 10.2 | — | 7.5 | 3.2 |

TABLE 2-continued

| | | | | | | | | | | |
|---|---|---|---|---|---|---|---|---|---|---|
| Intrinsic viscosity of (Y-2)/ Ethylene content in (Y-2) | | 0.48 | 0.58 | 0.29 | 0.20 | 1.01 | 0.22 | 0.39 | — | 0.10 | 0.09 |

| Evaluated items | Unit | Y11c | Y12c | Y13c | Y14 | Y15 | Y16 | Y17 | Y18 |
|---|---|---|---|---|---|---|---|---|---|
| MFR | g/10 minutes | 2.7 | 2.1 | 7.7 | 14.0 | 65.0 | 2.45 | 1.20 | 31.0 |
| Weight ratio of (Y-1) in (Y) | wt. % | 88.6 | 50.0 | 91.0 | 94.0 | 91.9 | 79.6 | 63.5 | 78.5 |
| Weight ratio of (Y-2) in (Y) | wt. % | 11.4 | 50.0 | 9.0 | 6.0 | 8.1 | 20.4 | 36.5 | 21.5 |
| Ethylene content in (Y-2) | wt. % | 52.8 | 40.0 | 60.0 | 44.7 | 42.0 | 25.9 | 32.3 | 45.0 |
| Melting point | °C. | 163 | 163 | 163 | 164 | 163 | 163 | 163 | 163 |
| Intrinsic viscosity of (Y-2) | dl/g | 3.4 | 7.2 | 7.9 | 14.9 | 8.9 | 5.4 | 9.6 | 8.3 |
| Intrinsic viscosity of (Y-2)/ Ethylene content in (Y-2) | | 0.06 | 0.18 | 0.13 | 0.33 | 0.21 | 0.21 | 0.30 | 0.18 |

[Confirmation of Inhibition of the Shear-Induced Crystalline Structure Formation by Polarizing Microscope Observation]

Figure 5:
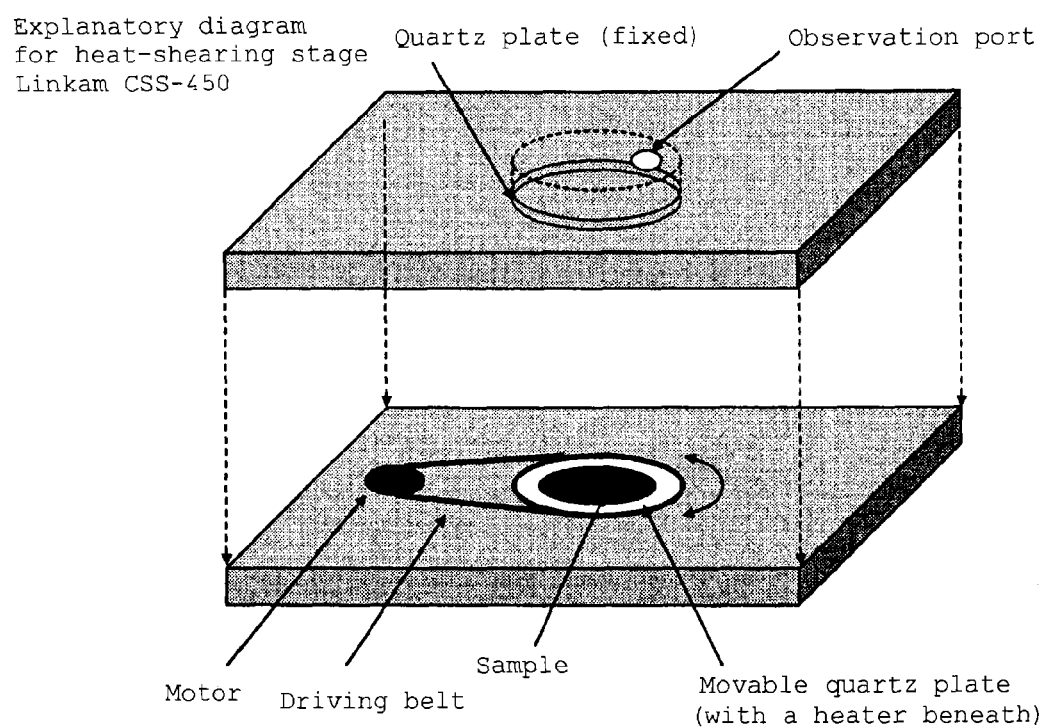
FIG. 5 is a diagram explaining the heat-shearing stage Linkam CSS-450.

Components (X) and (Y) were dry blended in the ratio given in Table 3 and the resultant mixture was subjected to a 30 mm φ single-screw extruder (manufactured and sold by IKG Corporation) to thereby obtain a blended sample. The operation conditions for the extruder include the rotation rate of 20 RPM and cylinder temperature of 230° C. The obtained blended sample was pressed at 230° C. to obtain form a sheet with thickness of 1 mm. The obtained sheet was cut into an appropriate size and set in Linkam CSS-450 heat-shearing stage. Steady shear was applied to the sheet for 10 minutes using the device illustrated in FIGS. 2 and 5 at the temperature of 170° C. and shear rate of 2 $s^{-1}$, and development of the shear-induced crystalline structure during this period of time was observed.

The image taken by a digital microscope was analyzed by the method described below with respect to development of the shish-kebab structure. In this analysis, the blended sample comprising the above-mentioned (X2) and (Y8c) (normal homopolypropylene) as components (X) and (Y) was used as the reference sample. The observed structure was compared with the structure observed in this reference sample, and development of the shear-induced crystalline structure was evaluated in accordance with the following criteria.

x: Readiness of development of the shear-induced crystalline structure was higher than that of the reference sample Δ: Readiness of development of the shear-induced crystalline structure was substantially the same as that of the reference sample ◯: Development of the shear-induced crystalline structure was slightly inhibited, as compared to the reference sample ◎: Development of the shear-induced crystalline structure was remarkably inhibited, as compared to the reference sample

[Method for Analyzing an Image]

Each of the above-mentioned images obtained by a digital microscope was analyzed for brightness using a software ATImage (ver. 4.5) for image analysis. Details of the image analysis are given below.

The obtained image was converted to a monochrome image. With respect to each of 3 pixel lines at different positions in a horizontal portion of this monochrome image within the field of view of the digital microscope, the distribution of brightness on the line was determined. In this monochrome image, a portion with strong development of the shear-induced crystalline structure is observed as a white portion. Therefore, the degree of development of the shear-induced crystalline structure can be evaluated by brightness. The degree of development of the shear-induced crystalline structure was evaluated in accordance with the above-mentioned criteria, based on the average or standard deviation of values of brightness.

The results related to inhibition of development of the shear-induced crystalline structure are given in Table 3. These results show that formation of uneven structure (analogous to the shish-kebab structure) by a PP having a structure with long chain branches can be inhibited by the use of propylene-based block copolymer (Y) satisfying the requirements defined in the present invention.

TABLE 3

| | Reference Sample | Samples | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| LCB(X) | X2 | X2 | X2 | X2 | X2 | X2 | X2 | X2 | X2 | X2 | X2 | X2 | X2 | X2 | X2 | X2 | X2 | X2 |
| Ratio of (X) wt. % | 50 | 50 | 50 | 50 | 50 | 50 | 50 | 50 | 50 | 50 | 50 | 50 | 50 | 50 | 50 | 50 | 50 | 50 |
| ICP(Y) | Y8c | Y7 | Y1 | Y2 | Y3 | Y6 | Y4c | Y5c | Y9c | Y10c | Y11c | Y12c | Y13c | Y14 | Y15 | Y16 | Y17 | Y18 |
| Ratio of (Y) wt. % | 50 | 50 | 50 | 50 | 50 | 50 | 50 | 50 | 50 | 50 | 50 | 50 | 50 | 50 | 50 | 50 | 50 | 50 |
| Judgment of the structure formation | — | ◎ | ◯ | ◯ | ◯ | ◯ | Δ | x | Δ | Δ | Δ | Δ | Δ | Δ | Δ | ◯ | ◯ | ◯ |

Example 1

100 parts by weight of a mixture of components (X) and (Y) (comprising pellet (X2) as component (X) and pellet (Y7) as component (Y) in the weight ratio of 70:30) and 4.0 parts by weight of a chemical blowing agent (Hydrocerole CF40E-J manufactured and sold by Nippon Boehringer Ingelheim Co., Ltd.) were uniformly mixed by a ribbon blender, and the resultant mixture was introduced into an extruder with a screw diameter of 65 mm φ.

The cylinder temperature of the extruder was set at 250° C., so that the resin was heated to be melted and plasticized and the chemical blowing agent was decomposed, to thereby obtain a polypropylene-based resin composition for foam molding. Further, immediately after this step, cooling of this resin composition was conducted so that the final temperature of this resin composition (hereinbelow referred to as "foaming temperature") was 165° C., and this polypropylene-based resin composition was extruded into air through a die attached on the tip of the extruder for foaming. The resultant foam was extended by pinch roll withdrawing for adjustment of thickness while cooling with cooling roll and air knife, to thereby obtain a foamed sheet having a thickness of 1.5 mm.

The resultant foamed sheet had a density of 0.29 g/cm$^3$ and average cell size of 80 μm with low open cell content, fine pore structure and good appearance. The results of evaluations of this foamed sheet are given in Table 4.

The resultant foamed sheet was extremely excellent in drawdown resistance suggesting good thermoformability.

Examples 2 to 14

Substantially the same procedure as in Example 1 was repeated using each mixture obtained by mixing components (X) and (Y) of each combination in Table 4 with the weight ratio therein, to thereby obtain a foamed sheet. The results of evaluations of these foamed sheets are given in Table 4.

Example 15

In order to obtain a foamed layer, the following operation was conducted. 100 parts by weight of a mixture of components (X) and (Y) (comprising pellet (X2) as component (X) and pellet (Y14) as component (Y) in the weight ratio of 25:75) and 0.5 part by weight of a cell nucleating agent (Hydrocerole CF40E-J manufactured and sold by Nippon Boehringer Ingelheim Co., Ltd.) were uniformly mixed by a ribbon blender, and the resultant mixture was introduced into an extruder with a screw diameter of 65 mm φ, which has a barrel hole in the middle of the barrel for physical blowing agent injection.

The cylinder temperature of the extruder was set at 250° C., so that the resin was heated to be melted and plasticized and the cell nucleating agent was decomposed, while injecting 0.45 part by weight of carbon dioxide per 100 parts by weight of the above-mentioned mixture, to thereby obtain a polypropylene-based resin composition for foam molding.

Immediately after this step, cooling of this resin composition was conducted so that the final foaming temperature was 165° C.

Separately, in order to obtain a non-foamed layer, a thermoplastic resin composition comprising 100 parts by weight of Y14 was introduced into an extruder with a screw diameter of 40 mm φ and heated to be melted at 220° C. The resultant molten resin composition was co-extruded, while cooling to 180° C., with the above-mentioned polypropylene-based resin composition for foam molding into air through a T-die (gap: 0.4 mm) via a feed block, with a construction of 2 materials and 3 layers (foamed layer-non-foamed layer-foamed layer), to thereby obtain a multi-layer foamed sheet.

The resultant foamed sheet was extended by pinch roll withdrawing for adjustment of thickness while cooling with cooling roll and air knife, to thereby obtain a foamed sheet having a thickness of 1.7 mm.

The resultant multi-layer foamed sheet had a thickness ratio (foamed layer:non-foamed layer:foamed layer) of 5:90:5, a density of 0.30 g/cm$^3$ and average cell size of 140 μm with low open cell content, fine pore structure and good appearance. The results of evaluations of this foamed sheet are given in Table 4.

Examples 16 to 18

Substantially the same procedure as in Example 15 was repeated using each mixture obtained by mixing components (X) and (Y) of each combination in Table 4 with the weight ratio therein, to thereby obtain a multi-layer foamed sheet. The results of evaluations of these foamed sheets are given in Table 4.

Example 19

Substantially the same procedure as in Example 13 was repeated, except that a mixture of (a) 100 parts by weight of a mixture of components (X) and (Y) (comprising pellet (X2) as component (X) and pellet (Y7) as component (Y) in the weight ratio of 50:50) and (b) 150 parts by weight of a commercially available homopolypropylene resin (manufactured and sold by Japan Polypropylene under the grade name "MA1B", MFR=21 g/10 minutes, MT<0.5 g) as component (Z) was used as a resin material for the foamed layer, to thereby obtain a multi-layer foamed sheet. The results of evaluations of these foamed sheets are given in Table 5.

TABLE 4

| | | | Examples | | | | | | | |
|---|---|---|---|---|---|---|---|---|---|---|
| | | Unit | 1 | 2 | 3 | 4 | 5 | 6 | 7 | 8 |
| Component (X) | Type | | X2 (PP-2) | X2 (PP-2) | X2 (PP-2) | X2 (PP-2) | X1 (PP-1) | X3 (PP-3) | X4 | X5 |
| | Ratio | Parts by weight | 70 | 25 | 10 | 90 | 50 | 50 | 25 | 25 |
| Component (Y) | Type | | Y7 | Y7 | Y7 | Y7 | Y7 | Y7 | Y7 | Y7 |
| | Ratio | Parts by weight | 30 | 75 | 90 | 10 | 50 | 50 | 75 | 75 |
| Blowing agent | Type | | Chemical blowing agent | Chemical blowing agent | Chemical blowing agent | Chemical blowing agent | Chemical blowing agent | Chemical blowing agent | Chemical blowing agent | Chemical blowing agent |
| | Amount | Parts by weight | 4.0 | 4.0 | 4.0 | 4.0 | 4.0 | 4.0 | 4.0 | 4.0 |
| Foamed sheet | Composition for non-foamed layer | Type | — | — | — | — | — | — | — | — |
| | Density of foam | g/cm$^3$ | 0.29 | 0.32 | 0.33 | 0.33 | 0.33 | 0.32 | 0.30 | 0.31 |
| | Expansion ratio | | 3.1 | 2.8 | 2.7 | 2.7 | 2.7 | 2.8 | 3.0 | 2.9 |
| | Layer construction | | Monolayer | Monolayer | Monolayer | Monolayer | Monolayer | Monolayer | Monolayer | Monolayer |
| | Evaluation of extendability and sheet appearance | | ◎ | ◎ | ◎ | ○ | ○ | ◎ | ◎ | ◎ |

TABLE 4-continued

|  |  | Unit |  |  |  |  |  |  |  |  |
|---|---|---|---|---|---|---|---|---|---|---|
|  | Thickness of sheet | (mm) | 1.5 | 1.5 | 1.5 | 1.5 | 1.5 | 1.4 | 1.5 | 1.5 |
|  | Cell size of the foamed layer | (μm) | 80 | 80 | 100 | 70 | 80 | 100 | 70 | 80 |
|  | Open cell content of the foamed layer | (%) | 8 | 8 | 18 | 7 | 15 | 16 | 10 | 11 |
| Thermoformability | Drawdown resistance |  | ◎ | ○ | ○ | ◎ | ◎ | ○ | ◎ | ◎ |

|  |  |  | Examples |  |  |  |  |  |  |
|---|---|---|---|---|---|---|---|---|---|
|  |  | Unit | 9 | 10 | 11 | 12 | 13 | 14 | 15 |
| Component (X) | Type |  | X2 (PP-2) | X2 (PP-2) | X2 (PP-2) | X2 (PP-2) | X2 (PP-2) | X2 (PP-2) | X2 (PP-2) |
|  | Ratio | Parts by weight | 50 | 50 | 50 | 50 | 25 | 25 | 25 |
| Component (Y) | Type |  | Y1 | Y2 | Y3 | Y6 | Y14 | Y15 | Y14 |
|  | Ratio | Parts by weight | 50 | 50 | 50 | 50 | 75 | 75 | 75 |
| Blowing agent | Type |  | Chemical blowing agent | Chemical blowing agent | Chemical blowing agent | Chemical blowing agent | Chemical blowing agent | Chemical blowing agent | Physical blowing agent |
|  | Amount | Parts by weight | 4.0 | 4.0 | 4.0 | 4.0 | 4.0 | 4.0 | 0.45 |
| Foamed sheet | Composition for non-foamed layer | Type | — | — | — | — | — | — | Y14 |
|  | Density of foam | g/cm³ | 0.30 | 0.31 | 0.32 | 0.29 | 0.33 | 0.32 | 0.30 |
|  | Expansion ratio |  | 3.0 | 2.9 | 2.8 | 3.1 | 2.7 | 2.8 | 3.0 |
|  | Layer construction |  | Monolayer | Monolayer | Monolayer | Monolayer | Monolayer | Monolayer | Multi-layer |
|  | Evaluation of extendability and sheet appearance |  | ◎ | ◎ | ◎ | ◎ | ◎ | ◎ | ◎ |
|  | Thickness of sheet | (mm) | 1.5 | 1.5 | 1.5 | 1.5 | 1.5 | 1.5 | 1.7 |
|  | Cell size of the foamed layer | (μm) | 80 | 80 | 80 | 80 | 80 | 80 | 140 |
|  | Open cell content of the foamed layer | (%) | 10 | 11 | 13 | 9 | 10 | 9 | 6 |
| Thermoformability | Drawdown resistance |  | ◎ | ◎ | ◎ | ◎ | ○ | ○ | ○ |

TABLE 5

|  |  |  | Examples |  |  |  |
|---|---|---|---|---|---|---|
|  |  | Unit | 16 | 17 | 18 | 19 |
| Component (X) | Type |  | X2 (PP-2) | X2 (PP-2) | X2 (PP-2) | X2 (PP-2) |
|  | Ratio | Parts by weight | 50 | 50 | 50 | 50 |
| Component (Y) | Type |  | Y16 | Y17 | Y18 | Y17 |
|  | Ratio | Parts by weight | 50 | 50 | 50 | 50 |
| Component (Z) | Type |  | — | — | — | Z |
|  | Ratio | Parts by weight | — | — | — | 150 |
| Blowing agent | Type |  | Physical blowing agent | Physical blowing agent | Physical blowing agent | Physical blowing agent |
|  | Amount | Parts by weight | 0.43 | 0.43 | 0.43 | 0.43 |
| Foamed sheet | Composition for non-foamed layer | Type | Y14 | Y14 | Y14 | Y14 |
|  | Density of foam | g/cm³ | 0.31 | 0.28 | 0.29 | 0.27 |
|  | Expansion ratio |  | 2.9 | 3.2 | 3.1 | 3.3 |
|  | Layer construction |  | Multi-layer | Multi-layer | Multi-layer | Multi-layer |
|  | Evaluation of extendability and sheet appearance |  | ◎ | ○ | ◎ | ○ |
|  | Thickness of sheet | (mm) | 1.3 | 1.3 | 1.3 | 1.3 |
|  | Cell size of the foamed layer | (μm) | 120 | 110 | 120 | 130 |
|  | Open cell content of the foamed layer | (%) | 12 | 10 | 14 | 18 |
| Thermoformability | Drawdown resistance |  | ◎ | ◎ | ○ | ○ |

Comparative Example 1

Substantially the same procedure as in Example 1 was repeated, except that pellet (Y7) as component (Y) was used alone as a material and the foaming temperature was 170° C., to thereby obtain a foamed sheet. The resultant foamed sheet was difficult for uniformly extend and has many portions of uneven thickness. Further, in this foamed sheet, many fusion of cells and portions of dimples (sink marks) were observed. The results of evaluations of these foamed sheets are given in Table 6.

Comparative Example 2

Substantially the same procedure as in Example 1 was repeated, except that pellet (X1) as component (X) was used alone as a material and the foaming temperature was 170° C., to thereby obtain a foamed sheet. The resultant foamed sheet has defects in extension, i.e., portions of uneven thickness. The results of evaluations of these foamed sheets are given in Table 6.

Comparative Example 3 to 11

Substantially the same procedure as in Example 1 was repeated using each mixture obtained by mixing components (X) and (Y) of each combination in Table 5 with the weight ratio therein, to thereby obtain a multi-layer foamed sheet. The results of evaluations of these foamed sheets are given in Table 6.

INDUSTRIAL APPLICABILITY

The polypropylene-based resin composition of the present invention, polypropylene-based (multi-layer) foamed sheet obtained from the same and thermoform obtained using this foamed sheet provides cells fine and uniform in size and is excellent in appearance, thermoformability impact resistance, lightness, stiffness, heat resistance, heat insulating properties, oil resistance and the like. Therefore, they can be suitably used as a material for food containers (such as trays, dishes and cups), automobile interiors (such as door trims and trunk mats for automobile), packagings, stationery, buildings and the like and have extremely high industrial value.

The invention claimed is:

1. A polypropylene-based resin foamed sheet obtained by extruding a foam molding resin comprising:
   (X) 5 to 99% by weight of a polypropylene resin comprising a structure with long chain branches,
   0.05 to 6.0 parts by weight of a blowing agent, based on 100 parts by weight of said foam molding resin; and
   (Y) 1 to 95% by weight of a sequentially polymerized propylene-based block copolymer wherein said resin (Y) comprises:
   (Y-1) a propylene (co)polymer, and
   (Y-2) a propylene-ethylene copolymer, and wherein said resin (X) has:
   (X-i): a melt flow rate (MFR) of 0.1 to 30.0 g/10 minutes,
   (X-ii): a molecular weight distribution Mw/Mn of 3.0 to 10.0 measured by GPC and Mz/Mw of 2.5 to 10.0,
   (X-iii): a melt tension (MT) (unit: g) where $\log(MT) \geq -0.9 \times \log(MFR) + 0.7$, or $MT \geq 15$

TABLE 6

| | | | Comparative Examples | | | | | | | | | | |
|---|---|---|---|---|---|---|---|---|---|---|---|---|---|
| | | Unit | 1 | 2 | 3 | 4 | 5 | 6 | 7 | 8 | 9 | 10 | 11 |
| Component (X) | Type | | — | X2 (PP-2) | X2 (PP-2) | X2 (PP-2) | X2 (PP-2) | X2 (PP-2) | X2 (PP-2) | X2 (PP-2) | X2 (PP-2) | X2 (PP-2) | X2 (PP-2) |
| | Ratio | Parts by weight | 0 | 100 | 3 | 50 | 50 | 50 | 50 | 50 | 50 | 50 | 50 |
| Component (Y) | Type | | Y1 | — | Y7 | Y4c | Y5c | Y8c | Y9c | Y10c | Y11c | Y12c | Y13c |
| | Ratio | Parts by weight | 100 | 0 | 97 | 50 | 50 | 50 | 50 | 50 | 50 | 50 | 50 |
| Blowing agent | Type | | Chemical blowing agent | Chemical blowing agent | Chemical blowing agent | Chemical blowing agent | Chemical blowing agent | Chemical blowing agent | Chemical blowing agent | Chemical blowing agent | Chemical blowing agent | Chemical blowing agent | Chemical blowing agent |
| | Amount | Parts by weight | 4.0 | 4.0 | 4.0 | 4.0 | 4.0 | 4.0 | 4.0 | 4.0 | 4.0 | 4.0 | 4.0 |
| Foamed sheet | Composition for non-foamed layer | Type | — | — | — | — | — | — | — | — | — | — | — |
| | Density of foam | g/cm³ | 0.50 | 0.36 | 0.36 | 0.37 | 0.45 | 0.36 | 0.44 | 0.39 | 0.40 | 0.37 | 0.38 |
| | Expansion ratio | | 1.8 | 2.5 | 2.5 | 2.4 | 2.0 | 2.5 | 2.0 | 2.3 | 2.3 | 2.4 | 2.4 |
| | Layer construction | | Monolayer | Monolayer | Monolayer | Monolayer | Monolayer | Monolayer | Monolayer | Monolayer | Monolayer | Monolayer | Monolayer |
| | Evaluation of extendability and sheet appearance | | X | Δ | Δ | Δ | X | Δ | X | Δ | Δ | Δ | Δ |
| | Thickness of sheet | (mm) | 1.5 | 1.5 | 1.5 | 1.5 | 1.4 | 1.5 | 1.5 | 1.5 | 1.5 | 1.5 | 1.5 |
| | Cell size of the foamed layer | (μm) | 160 | 70 | 110 | 100 | 100 | 100 | 100 | 110 | 90 | 120 | 100 |
| | Open cell content of the foamed layer | (%) | 25 | 20 | 22 | 24 | 30 | 27 | 40 | 26 | 33 | 20 | 42 |
| Thermoformability | Drawdown resistance | | Δ | ○ | X | ○ | Δ | ○ | Δ | Δ | Δ | ○ | X |

(X-iv): a content of p-xylene soluble components (CXS) at 25° C. of less than 5% by weight based on the total amount of said resin (X), and wherein said block copolymer (Y) has:

(Y-i): a weight ratio of 50 to 99% of (Y-1) and 1 to 50% of (Y-2) where said ratio is calculated based on the total weight of said block copolymer (Y) regarded as 100% by weight, and (Y-ii): an MFR of said block copolymer (Y) of 0.1 to 200.0 g/10 minutes, (Y-iii): a melting point of said block copolymer (Y) of more than 155° C., (Y-iv): an ethylene content of said (Y-2) of 11.0% or more and less than 60.0% by weight, wherein said ethylene content is calculated based on the total weight of monomers comprising (Y-2) regarded as 100% by weight, and (Y-v): the intrinsic viscosity [η] of said (Y-2) measured at 135° C. in decalin is greater than or equal to 5.3 dl/g when said ethylene content of said (Y-2) is 11.0% or more and 38.0% or less by weight, or greater than or equal to 7.3 dl/g when said ethylene content of said (Y-2) is greater than 38.0% and less than 60.0% by weight.

2. The polypropylene-based resin foamed sheet of claim 1, wherein said resin (X) has (X-v): a branching index g' of 0.30 or more and less than 1.00 at the absolute molecular weight $M_{abs}$ of 1,000,000.

3. The polypropylene-based resin foamed sheet of claim 2, wherein said resin (X) has (X-vi): an mm fraction of 95% or more in the propylene unit triads measured by $^{13}$C-NMR.

4. A polypropylene-based resin multi-layer foamed sheet obtained by co-extruding the foamed sheet of claim 1 and a non-foamed layer comprising a thermoplastic resin composition.

5. The multi-layer foamed sheet according to claim 4, wherein said thermoplastic resin composition comprises:
100 parts by weight of a thermoplastic resin, and
50 parts by weight or less of an inorganic filler.

6. A molded article obtained by thermoforming the foamed sheet of claim 1.

7. The polypropylene-based resin foamed sheet of claim 1, further-comprising
(Z) greater than 0 parts by weight and less than or equal to 1000 parts by weight of another resin (Z) based on 100 parts of the foam molding resin, wherein said resin (Z) does not have properties X-i, X-ii, X-iv, Y-i, Y-ii, Y-iv, and Y-v.

8. The propylene-based resin foamed sheet according to claim 7, wherein said resin (Z) is a polypropylene-based resin.

9. The polypropylene-based resin foamed sheet according to claim 1, wherein
(X) is present in an amount greater than or equal to 15% and less than or equal to 80% by weight and
(Y) is present in an amount greater than or equal to 20% and less than or equal to 85% by weight.

10. The propylene-based resin foamed sheet according to claim 7, wherein said resin (Z) is present in an amount greater than 10 parts by mass and less than or equal to 300 parts by mass.

11. The propylene-based resin foamed sheet according to claim 10, wherein said resin (Z) is a polypropylene-based resin.

12. A molded article obtained by thermoforming the multi-layer foamed sheet of claim 5.

* * * * *